United States Patent
May et al.

(10) Patent No.: US 11,560,794 B2
(45) Date of Patent: Jan. 24, 2023

(54) SOLVENT-STABILIZED COLORIMETRIC DETECTION OF AMINE-BASED ADDITIVES

(71) Applicant: Halliburton Energy Services, Inc., Houston, TX (US)

(72) Inventors: Preston Andrew May, Porter, TX (US); Emily Cummings Hart, Spring, TX (US); Jay Paul Deville, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 403 days.

(21) Appl. No.: 16/900,437

(22) Filed: Jun. 12, 2020

(65) Prior Publication Data
US 2021/0388719 A1    Dec. 16, 2021

(51) Int. Cl.
*E21B 47/135* (2012.01)
*G01N 21/78* (2006.01)
(Continued)

(52) U.S. Cl.
CPC ............ *E21B 49/08* (2013.01); *C09K 8/035* (2013.01); *E21B 21/00* (2013.01); *E21B 21/06* (2013.01);
(Continued)

(58) Field of Classification Search
CPC ........ E21B 49/08; E21B 47/135; E21B 21/00; E21B 21/06; C09K 8/035; C09K 2208/12;
(Continued)

(56) References Cited

U.S. PATENT DOCUMENTS 6,194,216 B1 * 2/2001 Walker .............. G01N 33/2835
436/27
7,858,376 B2 12/2010 Schulz et al.
(Continued)

FOREIGN PATENT DOCUMENTS

WO 2009005936 A1 1/2009
WO 2017209740 A1 12/2017
WO WO-2017209740 A1 * 12/2017 .............. C09K 8/54

OTHER PUBLICATIONS

Foreign Communication from Related Application—International Search Report and Written Opinion of the International Searching Authority, International Application No. PCT/US2020/038439, dated Mar. 3, 2021, 11 pages.
(Continued)

*Primary Examiner* — Jennifer Wecker
*Assistant Examiner* — Ali Husain Faraz
(74) *Attorney, Agent, or Firm* — Conley Rose, P.C.; Rodney B. Carroll

(57) ABSTRACT

A method of detecting an amine-based additive in a wellbore servicing fluid (WSF) comprising contacting an aliquot of WSF with an amine detector compound and an aqueous salt solution to form a detection solution; wherein the aqueous salt solution comprises an inorganic salt and organic carboxylate salt; wherein the WSF comprises the amine-based additive; and wherein the detection solution is characterized by at least one absorption peak wavelength in the range of 380-760 nm; detecting an absorption intensity for detection solution at a wavelength within about ±20% of the at least one absorption peak wavelength; comparing the absorption intensity of detection solution at the wavelength within about ±20% of the at least one absorption peak wavelength with a target absorption intensity of amine-based additive to determine the amount of amine-based additive in WSF; and
(Continued)

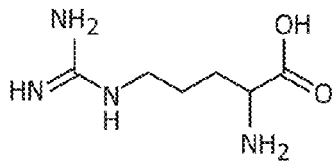

ARGININE INHIBITOR

ARGININE IN WATER

ARGININE + *NINHYDRIN* + *HEAT*
(Color generated; Positive reaction)

comparing the amount of amine-based additive in WSF with a target amount of amine-based additive.

19 Claims, 9 Drawing Sheets

(51) Int. Cl.
| | |
|---|---|
| *E21B 49/08* | (2006.01) |
| *G01N 21/77* | (2006.01) |
| *C09K 8/035* | (2006.01) |
| *G01N 21/31* | (2006.01) |
| *E21B 21/00* | (2006.01) |
| *E21B 21/06* | (2006.01) |

(52) U.S. Cl.
CPC ......... *E21B 47/135* (2020.05); *G01N 21/314* (2013.01); *G01N 21/77* (2013.01); *G01N 21/78* (2013.01); *C09K 2208/12* (2013.01); *G01N 2021/3155* (2013.01)

(58) Field of Classification Search
CPC ...... G01N 21/314; G01N 21/77; G01N 21/78; G01N 2021/3155
See application file for complete search history.

(56) References Cited

U.S. PATENT DOCUMENTS

| | | | |
|---|---|---|---|
| 8,268,063 B2 | 9/2012 | Nalewajek et al. | |
| 9,250,191 B2 | 2/2016 | Pitts et al. | |
| 9,587,159 B2 | 3/2017 | Dhulipala et al. | |
| 11,401,805 B2* | 8/2022 | May | C07C 49/733 |
| 2004/0098202 A1* | 5/2004 | McNeil, III | G01N 33/2823 702/6 |
| 2012/0149604 A1* | 6/2012 | Lawrence | G01N 21/3577 507/119 |
| 2013/0032344 A1 | 2/2013 | Freese et al. | |
| 2014/0141519 A1 | 5/2014 | Pitts et al. | |
| 2015/0160184 A1 | 6/2015 | Hanyuda et al. | |
| 2016/0160105 A1 | 6/2016 | Dhulipala et al. | |
| 2016/0208158 A1 | 7/2016 | Monahan et al. | |
| 2016/0349186 A1 | 12/2016 | Locklear et al. | |
| 2017/0212029 A1 | 7/2017 | Scharmach | |
| 2019/0119563 A1 | 4/2019 | He et al. | |
| 2021/0389253 A1* | 12/2021 | May | C09B 67/0083 |

OTHER PUBLICATIONS

Foreign Communication from Related Application—International Search Report and Written Opinion of the International Searching Authority, International Application No. PCT/US2020/038436, dated Mar. 11, 2021, 9 pages.

Filing Receipt, Specification and Drawings for U.S. Appl. No. 16/900,442, filed Jun. 12, 2020, entitled "Polymer-Enhanced Colorimetric Detection of Amine-Based Additives," 110 pages.

Electronic Acknowledgement Receipt, Specification and Drawings for International Application No. PCT/US2019/040066, filed Jul. 1, 2019, entitled "Colorimetric Detection of Amine-Based Shale Inhibitors," 46 pages.

Harding, V. J. et al., "The Ninhydrin Reaction with Amines and Amides," The Journal of Biological Chemistry, 1916, pp. 337-350, vol. 25.

Friedman, M., "Applications of the Ninhydrin Reaction for Analysis of Amino Acids, Peptides, and Proteins to Agricultural and Biomedical Sciences," Journal of Agricultural and Food Chemistry, 2004, pp. 385-406, vol. 52, American Chemical Society.

Foreign Communication from Related Application—International Search Report and Written Opinion of the Internationa Searching Authority, International Application No. PCT/US2019/040066, dated Apr. 1, 2020, 15 pages.

Electronic Acknowledgement Receipt, Specification and Drawings for International Application No. PCT/US2020/038439, filed Jun. 18, 2020, entitled "Polymer-Enhanced Colorimetric Detection of Amine-based Additives," 92 pages.

Electronic Acknowledgement Receipt, Specification and Drawings for International Application No. PCT/US2020/038436, filed Jun. 18, 2020, entitled "Solvent-Stabilized Colorimetric Detection of Amine-Based Additives," 91 pages.

* cited by examiner

ARGININE INHIBITOR

ARGININE IN WATER

ARGININE + *NINHYDRIN* + *HEAT*
(Color generated; Positive reaction)

US 11,560,794 B2

SOLVENT-STABILIZED COLORIMETRIC DETECTION OF AMINE-BASED ADDITIVES

BACKGROUND

This disclosure relates to methods of servicing a wellbore. More specifically, it relates to methods of detecting amine-based additives in wellbore servicing fluids.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Amine-based compounds are ubiquitous shale inhibitors, as well as corrosion inhibitors in drilling fluids. Amine-based additives have predetermined concentrations in drilling fluids that are meant to prevent problems during the drilling process, such as viscosity build-up, bit balling, wellbore caving and ballooning, corrosion, etc. However, during the drilling process, amine-based additives can be lost to the formation. The inability to accurately identify the active concentration of amine-based additives in drilling fluids in real-time can result in economic losses (e.g., increased incidence of non-productive time, increased corrosion, etc.). Thus, an ongoing need exists for real-time quantitative detection of amines in wellbore servicing fluids, such as drilling fluids.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
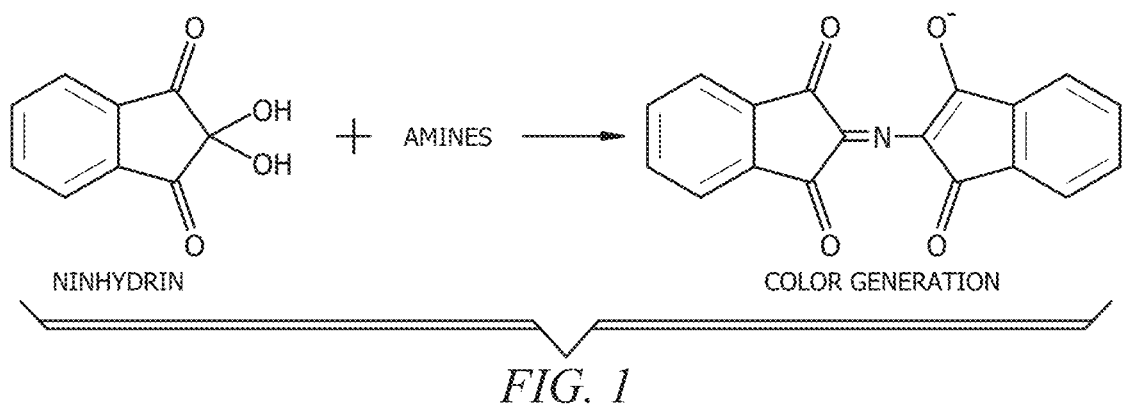
FIG. 1 depicts a schematic of a chemical reaction between ninhydrin and amines.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are methods of detecting amine-based additives in wellbore servicing fluids or compositions (collectively referred to herein as WSFs). The amount (e.g., concentration) of amine-based additives can be determined by reacting the additives with an amine detector compound, which may result in highly conjugated molecules that display color (e.g., visual color); wherein such highly conjugated molecules can absorb light in the ultraviolet-visible (UV-VIS) range; and wherein the absorption intensity can be used to derive the amount of the amine-based additives in the WSF.

In an aspect, a method of detecting an amine-based additive (e.g., amine-based shale inhibitor; amine-based corrosion inhibitor) in a WSF can include (a) contacting an aliquot of the WSF with an amine detector compound to form a detection solution; wherein the WSF includes the amine-based additive; and wherein the detection solution is characterized by at least one absorption peak wavelength in the range of from about 380 nanometers (nm) to about 760 nm; (b) detecting an absorption intensity for the detection solution at a wavelength within about ±20% of the at least one absorption peak wavelength; (c) comparing the absorption intensity of the detection solution at the wavelength within about ±20% of the at least one absorption peak wavelength with a target absorption intensity of the amine-based additive to determine the amount of amine-based additive in the WSF; and (d) comparing the amount of amine-based additive in the WSF with a target amount of the amine-based additive. The detection solution can be characterized by a visible color. In some aspects, the aliquot of the WSF can be further characterized by a visible color, wherein the visible color and/or color intensity of the detection solution is different from the visible color and/or color intensity of the aliquot of the WSF. In other aspects, the aliquot of the WSF can be colorless, for example the aliquot of the WSF can be a clear liquid.

In another aspect, a method of detecting an amine-based additive in a WSF can include (a) contacting an aliquot of the WSF with an amine detector compound and an aqueous salt solution to form a detection solution; wherein the aqueous salt solution includes an inorganic salt and an organic carboxylate salt; wherein the WSF includes the amine-based additive; and wherein the detection solution is characterized by at least one absorption peak wavelength in the range of from about 380 nanometers (nm) to about 760 nm; (b) detecting an absorption intensity for the detection solution at a wavelength within about ±20% of the at least one absorption peak wavelength; (c) comparing the absorption intensity of the detection solution at the wavelength within about ±20% of the at least one absorption peak wavelength with a target absorption intensity of the amine-based additive to determine the amount of amine-based additive in the WSF; and (d) comparing the amount of amine-based additive in the WSF with a target amount of the amine-based additive. In such aspect, the amine-based additive can include an amine-based shale inhibitor and/or an amine-based corrosion inhibitor. In some aspects, the WSF can be a drilling fluid.

In yet another aspect, a method of detecting an amine-based additive in a WSF can include (a) contacting an aliquot of the WSF with an amine detector reagent and an aqueous medium to form a detection solution; wherein the amine detector reagent includes an amine detector compound and a polar organic solvent (POS); wherein the POS is characterized by a flash point at ambient pressure of equal to or greater than about 105° C.; wherein the WSF includes the amine-based additive; and wherein the detection solution is characterized by at least one absorption peak wavelength in the range of from about 380 nanometers (nm) to about 760 nm; (b) detecting an absorption intensity for the detection solution at a wavelength within about ±20% of the at least one absorption peak wavelength; (c) comparing the absorption intensity of the detection solution at the wavelength within about ±20% of the at least one absorption peak wavelength with a target absorption intensity of the amine-based additive to determine the amount of amine-based additive in the WSF; and (d) comparing the amount of amine-based additive in the WSF with a target amount of the amine-based additive. In such aspect, the amine-based additive can include an amine-based shale inhibitor and/or an amine-based corrosion inhibitor. In some aspects, the WSF can be a drilling fluid. The aqueous medium can be any suitable aqueous fluid, such as an aqueous salt solution, wherein the aqueous salt solution includes an inorganic salt and an organic carboxylate salt.

Further disclosed herein are methods of servicing a wellbore in a subterranean formation including the real-time detection of amine-based additives in WSF used in the wellbore and/or subterranean formation.

In an aspect, a method of servicing a wellbore in a subterranean formation can include preparing a WSF including a base fluid and an amine-based additive, wherein the amine-based additive is present in the WSF in a target amount.

In an aspect, the WSF suitable for use in the present disclosure may include any suitable WSF. As used herein, a "servicing fluid" or "treatment fluid" refers generally to any fluid that may be used in a subterranean application in conjunction with a desired function and/or for a desired purpose, including but not limited to fluids used to drill, complete, work over, fracture, repair, clean, or in any way prepare a wellbore for the recovery of materials residing in a subterranean formation penetrated by the wellbore. The servicing fluid is for use in a wellbore that penetrates a subterranean formation. It is to be understood that "subterranean formation" encompasses both areas below exposed earth and areas below earth covered by water such as ocean or fresh water. In an aspect, the WSF including an amine-based additive (e.g., amine-based shale inhibitor; amine-based corrosion inhibitor) as disclosed herein can be a drilling fluid or a completion fluid. In an aspect, the WSF including an amine-based additive as disclosed herein can be a drilling fluid.

In an aspect, the WSF includes a base fluid. In some aspects, the base fluid is an aqueous fluid. In other aspects, the base fluid includes an emulsion.

In an aspect, the base fluid includes an aqueous fluid. Aqueous fluids that may be used in the WSF include any aqueous fluid suitable for use in subterranean applications, provided that the aqueous fluid is compatible with the amine-based additive used in the WSF. For example, the aqueous fluid may include water or a brine. In an aspect, the aqueous fluid includes an aqueous brine. In such aspect, the aqueous brine generally includes water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, liquids including water-miscible organic compounds, and combinations thereof. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the solution. In an aspect, the salt or salts in the water may be present within the base fluid in an amount sufficient to yield a saturated brine. As will be appreciated by one of skill in the art, and with the help of this disclosure, the type and concentration of salt solutions utilized as a base fluid is dependent on the WSF density (e.g., drilling fluid density, completion fluid density, etc.), which may range from about 8 lb/gallon to about 20 lb/gallon, alternatively from about 10 lb/gallon to about 18 lb/gallon, or alternatively from about 12 lb/gallon to about 16 lb/gallon.

Nonlimiting examples of aqueous brines suitable for use in the present disclosure include chloride-based, bromide-based, phosphate-based, or formate-based brines containing monovalent and/or polyvalent cations, salts of alkali and alkaline earth metals, or combinations thereof. Additional examples of suitable brines include, but are not limited to brines including NaCl, KCl, NaBr, $CaCl_2$, $CaBr_2$, $MgCl_2$, $MgBr_2$, $ZnBr_2$, $ZnCl_2$, acetate salts, sodium acetate, potassium acetate, potassium phosphate, sodium formate, potassium formate, cesium formate, or combinations thereof. In an aspect, the base fluid includes a brine.

In an aspect, the base fluid includes an emulsion. In such aspect, the emulsion is an oil-in-water emulsion including a non-oleaginous (e.g., an aqueous fluid of the type previously described herein) continuous phase and an oleaginous (e.g., an oil-based fluid, such as for example an oleaginous fluid) discontinuous phase. Oleaginous fluids that may be used in the WSF include any oleaginous fluid suitable for use in subterranean applications, provided that the oleaginous fluid is compatible with the amine-based additive used in the WSF. Examples of oleaginous fluids suitable for use in a WSF include, but are not limited to, petroleum oils, natural oils, synthetically-derived oils, oxygenated fluids, or combinations thereof. In an aspect, the oleaginous fluid includes diesel oil, kerosene oil, mineral oil, synthetic oils, aliphatic hydrocarbons, polyolefins (e.g., alpha olefins, linear alpha olefins and/or internal olefins), paraffins, silicone fluids, polydiorganosiloxanes, oxygenated solvents, esters, diesters of carbonic acid, alcohols, alcohol esters, ethers, ethylene glycol, ethylene glycol monoalkyl ether, ethylene glycol dialkyl ether, or combinations thereof, wherein the alkyl groups are methyl, ethyl, propyl, butyl, and the like.

The base fluid may be present within the WSF in any suitable amount. For example, the base fluid may be present within the WSF in an amount of from about 10 wt. % to about 99 wt. %, alternatively from about 20 wt. % to about 95 wt. %, or alternatively from about 40 wt. % to about 90 wt. %, based on the total weight of the WSF. Alternatively, the base fluid may include the balance of the WSF after considering the amount of the other components used. As will be appreciated by one of skill in the art, and with the help of this disclosure, the amount of base fluid (e.g., aqueous base fluid) in the WSF depends on the desired density of the WSF.

In an aspect, the WSF suitable for use in the present disclosure may include any suitable amine-based additive, such as an amine-based shale inhibitor and/or an amine-based corrosion inhibitor. In some aspects, the WSF suitable for use in the present disclosure may include any suitable amine-based shale inhibitor. In other aspects, the WSF suitable for use in the present disclosure may include any suitable amine-based corrosion inhibitor. In yet other aspects, the WSF suitable for use in the present disclosure may include any suitable amine-based shale inhibitor and any suitable amine-based corrosion inhibitor.

In an aspect, the WSF suitable for use in the present disclosure may include any suitable amine-based shale inhibitor.

Shale is a clay-rich sedimentary rock, wherein the shale includes at least about 5 wt. % clay material, based on the total weight of the shale. When shale is exposed to water (e.g., an aqueous fluid; an aqueous-base fluid; a water-containing fluid, such as an emulsion; etc.), the clay in the shale can adsorb water and swell, thereby resulting in potential problems during drilling and/or completion processes, such as viscosity build-up, bit balling, wellbore caving, wellbore ballooning, subterranean formation integrity loss, collapse of subterranean formation, etc.

Generally, an amine-based shale inhibitor refers to an amine-based chemical compound having the ability to inhibit water-reactive formations (e.g., water-reactive subterranean formations; subterranean formations having water-reactive minerals) from collapsing or losing integrity when the formations come in contact with a water-containing fluid (e.g., an aqueous fluid; an aqueous-base fluid; a water-containing fluid, such as an emulsion; etc.); for example by limiting water uptake by such formations. For purposes of the disclosure herein, the term "water-reactive" refers to formations (e.g., subterranean formations) and/or minerals thereof that can absorb water, uptake water, react with water, and the like, or combinations thereof. Water-reactive formations can encompass any subterranean formations containing clay or clay-based materials, such as shale. For purposes of the disclosure herein, the terms "shale inhibitor" and "clay inhibitor" can be used interchangeably and refer to chemical compounds having the ability to inhibit water uptake by clay-containing subterranean formations (i.e., water-reactive subterranean formations). Without wishing to be limited by theory, clay contains hydrous aluminum silicates having hydroxyl ions that are capable of forming hydrogen bonds. Further, without wishing to be limited by theory, shale inhibitors are chemical compounds having functional groups (e.g., amine functional groups, protonated amine functional groups) that can form hydrogen bonds with the clay (i.e., with the water and/or hydroxyl groups present in the clay), thereby inhibiting water adsorption by the clay material, for example by blocking sites available for hydrogen bonding and rendering such sites unavailable for hydrogen bonding with water molecules. Furthermore, and without wishing to be limited by theory, the amine-based shale inhibitor may interact with the subterranean formation via a variety of physical bonds, such as hydrogen bonds, electrostatic interactions, van der Waals interactions, ionic interactions, dipole-dipole interactions, and the like, or combinations thereof.

In an aspect, the amine-based shale inhibitor can include an amine functional group, (e.g., a primary amine functional group, a secondary amine functional group, a tertiary amine functional group, or combinations thereof) and/or a protonated amine functional group (e.g., a protonated primary amine functional group, a protonated secondary amine functional group, a protonated tertiary amine functional group, or combinations thereof). Without wishing to be limited by theory, amine functional groups and/or protonated amine functional groups in the amine-based shale inhibitor can form hydrogen bonds with the clay (i.e., with the water and/or hydroxyl groups present in the clay), thereby inhibiting water adsorption by the clay material, for example by blocking sites available for hydrogen bonding and rendering such sites unavailable for hydrogen bonding with water molecules. Further, without wishing to be limited by theory, an amine-based shale inhibitor may minimize shale or clay hydration and thus prevent or reduce the adsorption of water by downhole water-reactive formations to prevent or reduce a loss of wellbore and/or subterranean formation stability.

Nonlimiting examples of amine-based shale inhibitors suitable for use in the present disclosure in the WSF include arginine, lysine, polylysine, guanidine, ethoxylated amines, polyoxyalkylene amines, polyoxyethylene amines, polyoxypropylene amines, polyoxyalkylene tallow amines, polyoxyethylene tallow amines, polyoxypropylene tallow amines, polyoxyalkylene amidoamines, polyoxypropylene amidoamine, polyether amines, polyether diamine, alkyl amines, aryl amines, cyclic amines, heterocyclic amines, and the like, or combinations thereof.

Nonlimiting example of commercially available amine-based shale inhibitors suitable for use in the present disclosure include CLAYSEAL PLUS shale stabilizer, which is available from Halliburton; CLAYSEAL shale stabilizer, which is available from Halliburton; BDF-677 shale stabilizer, which is available from Halliburton; BARASURE W-674 shale stabilizer, which is available from Halliburton; and the like, or combinations thereof.

In an aspect, an amine-based shale inhibitors suitable for use in the present disclosure can display properties similar to the properties in Table 1. For example, the amine-based shale inhibitors suitable for use in the present disclosure can be a product such as CLAYSEAL PLUS shale stabilizer.

TABLE 1

| Property | |
|---|---|
| Appearance | Transparent yellow liquid |
| Flash Point | 200° F. (93° C.) |
| pH | 6 to 8 |
| Specific Gravity | 1.04 |

In an aspect, an amine-based shale inhibitors suitable for use in the present disclosure can display properties similar to the properties in Table 2. For example, the amine-based shale inhibitors suitable for use in the present disclosure can be a product such as BDF-677 shale stabilizer.

TABLE 2

| Property | |
|---|---|
| Appearance | White powder |
| Purity | >99% |
| Specific Gravity | 1.3 |
| Bulk Density at 20° C. | 96 lb/ft$^3$ |
| Moisture Content | <0.5% |
| pH of 5% Solution | 4-6.5 (approx.) |

In an aspect, an amine-based shale inhibitors suitable for use in the present disclosure can display properties similar to the properties in Table 3. For example, the amine-based shale inhibitors suitable for use in the present disclosure can be a product such as BARASURE W-674 shale stabilizer.

TABLE 3

| Property | |
|---|---|
| Appearance | Liquid |
| Specific Gravity | 1.0-1.1 |
| Pour Point | <23° F. (<−5° C.) |
| pH of 5% Solution | 9.5 (approx.) |

In an aspect, an amine-based shale inhibitor may be included within the WSF in a suitable or effective amount (e.g., an amount effective to provide desired shale inhibitory properties to the WSF). The resultant amount of amine-based shale inhibitor that is necessary to impart desired shale inhibitory properties to a WSF may be dependent upon a variety of factors such as the composition of the WSF; the presence or absence of various additives in the WSF; the intended formation location where the WSF is expected to be used to inhibit water uptake; the composition of the formation; the pressure of the formation; the temperature of the formation; the diameter of the hole; and the like; or combinations thereof.

In an aspect, an amine-based shale inhibitor may be present within the WSF in an amount (e.g., target amount) of from about 0.01 wt. % to about 5 wt. %, alternatively from about 0.02 wt. % to about 4 wt. %, or alternatively from about 0.03 wt. % to about 3 wt. %, based on the total weight of the WSF. For purposes of the disclosure herein, the target amount of amine-based shale inhibitor in the WSF refers to the desired amount of amine-based shale inhibitor in the WSF; e.g., the amount of amine-based shale inhibitor effective to provide desired shale inhibitory properties to the WSF.

In an aspect, the WSF suitable for use in the present disclosure may include any suitable amine-based corrosion inhibitor. WSFs may come in contact with a variety of metal surfaces during drilling and completion operations (e.g., metal surfaces of drillpipe, casing and other tubulars in drilling and completion systems), wherein the ions present in the WSF may induce corrosion of such metal surfaces.

Generally, an amine-based corrosion inhibitor refers to an amine-based chemical compound having the ability to inhibit or minimize the extent of corrosion of metal surfaces that come in contact with corrosive species, such as various ions present in the WSF (e.g., aqueous WSF, or water-containing WSF). Without wishing to be limited by theory, when an amine-based corrosion inhibitor is present in the WSF, the amine-based corrosion inhibitor may form a protective film on the metal surfaces that the WSF comes in contact with (e.g., metal surfaces of drillpipe, casing and other tubulars in drilling and completion systems), wherein the protective film is hydrophobic, thereby enhancing the hydrophobicity of such metal surfaces. Hydrophobic amine-based films formed on metal surfaces can effectively isolate the metal surfaces from coming in direct contact with the water in the WSF. Further, and without wishing to be limited by theory, the amine-based corrosion inhibitor may interact with metal surfaces via a variety of chemical and/or physical bonds, such as covalent bonds, ionic bonds, hydrogen bonds, electrostatic interactions, van der Waals interactions, ionic interactions, dipole-dipole interactions, and the like, or combinations thereof.

In an aspect, the amine-based corrosion inhibitor can include an amine functional group (e.g., a primary amine functional group, a secondary amine functional group, a tertiary amine functional group, or combinations thereof) and/or a protonated amine functional group (e.g., a protonated primary amine functional group, a protonated secondary amine functional group, a protonated tertiary amine functional group, or combinations thereof). Without wishing to be limited by theory, amine functional groups and/or protonated amine functional groups in the amine-based corrosion inhibitor can adsorb onto metal surfaces via chemical and/or physical bonds, thereby inhibiting or minimizing the ability of water and ionic species in the WSF to come in contact with the metal surface and corrode it.

Nonlimiting examples of amine-based corrosion inhibitors suitable for use in the present disclosure in the WSF include imidazole, benzimidazole, monoethanolamine, diethanolamine, triethanolamine, morpholine, derivatives thereof, and the like, or combinations thereof.

A nonlimiting example of a commercially available amine-based corrosion inhibitor suitable for use in the present disclosure includes BARACOR 95 corrosion inhibitor, which is an amine-based and water soluble corrosion inhibitor available from Halliburton.

In an aspect, an amine-based corrosion inhibitor suitable for use in the present disclosure can display properties similar to the properties in Table 4. For example, the amine-based corrosion inhibitor suitable for use in the present disclosure can be a product such as BARACOR 95 corrosion inhibitor.

TABLE 4

| Property | |
| --- | --- |
| Appearance | Clear liquid |
| Flash Point | 205° F. (96° C.) |
| pH (1% aqueous) | 12 |
| Specific Gravity | 1.02 |

In an aspect, an amine-based corrosion inhibitor may be included within the WSF in a suitable or effective amount (e.g., an amount effective to provide desired corrosion inhibitory properties to the WSF). The resultant amount of amine-based corrosion inhibitor that is necessary to impart desired corrosion inhibitory properties to a WSF may be dependent upon a variety of factors such as the composition of the WSF; the presence or absence of various additives in the WSF; the type of metal (e.g., type of alloy, type of steel, etc.) used in the metal surfaces that come in contact with the WSF; and the like; or combinations thereof.

In an aspect, an amine-based corrosion inhibitor may be present within the WSF in an amount (e.g., target amount) of from about 0.1 wt. % to about 10 wt. %, alternatively from about 0.25 wt. % to about 5 wt. %, or alternatively from about 0.5 wt. % to about 3 wt. %, based on the total weight of the WSF. For purposes of the disclosure herein, the target amount of amine-based corrosion inhibitor in the WSF refers to the desired amount of amine-based corrosion inhibitor in the WSF; e.g., the amount of amine-based corrosion inhibitor effective to provide desired corrosion inhibitory properties to the WSF.

In an aspect, an amine-based additive (e.g., amine-based shale inhibitor and/or amine-based corrosion inhibitor) may be present within the WSF in an amount (e.g., target amount) of from about 0.01 wt. % to about 15 wt. %, alternatively from about 0.25 wt. % to about 10 wt. %, or alternatively from about 0.5 wt. % to about 6 wt. %, based on the total weight of the WSF. For purposes of the disclosure herein, the target amount of amine-based additive in the WSF refers to the desired amount of amine-based additive in the WSF; e.g., the amount of amine-based additive to provide desired properties to the WSF (e.g., desired shale inhibitory and/or corrosion inhibitory properties).

The WSF may further include additional additives (additives other than the amine-based additives) as deemed appropriate for improving the properties of the fluid. Such additives may vary depending on the intended use of the fluid in the wellbore. Examples of such additives include, but are not limited to suspending agents, density reducing additives, settling prevention agents, expansion additives, clays, salts, accelerants, set retarders, lignosulfonates, defoamers, surfactants, dispersing agents, fluid loss control agents, weighting materials, dispersants, fillers, zeolites, barite, calcium sulfate, silica flour, sand, slag, vitrified shale, fly ash, pozzolanic ash, lime, formation conditioning agents, fluid absorbing materials, resins, aqueous superabsorbers, viscosifying agents, gelling agents, crosslinkers, mechanical property modifying additives, elastomers, styrene-butadiene copolymers, conventional reinforcing materials, carbon fibers, glass fibers, metal fibers, minerals fibers, and the like, or combinations thereof. These additives may be introduced singularly or in combination using any suitable methodology and in amounts effective to produce the desired improvements in the properties of the WSF. As will be appreciated by one of skill in the art with the help of this disclosure, any of the components and/or additives used in the WSF have to be compatible with the amine-based additive (e.g., amine-based shale inhibitor; amine-based corrosion inhibitor) used in the WSF composition.

In an aspect, the WSF including the amine-based additive (e.g., amine-based shale inhibitor; amine-based corrosion inhibitor) as disclosed herein may be prepared by using any suitable method or process. The components of the WSF (e.g., amine-based additive, base fluid, additives other than the amine-based additive, etc.) may be combined and mixed in by using any mixing device compatible with the composition, e.g., a mixer, a batch mixer, a batch mixer with impellers and/or paddles, a blender, a batch blender, single ribbon type blenders, double ribbon type blenders, horizontal blenders, vertical blenders, inclined blenders, single or double ribbon type blenders which could further be horizontal, vertical or inclined, mixing eductors, dry powder eductors, dry powder eductor with centrifugal pump followed by circulation loop, cyclone-type dry to liquid mixer, inline static mixers, and the like, or any suitable combination thereof.

In an aspect, the components of the WSF are combined at the well site; alternatively, the components of the WSF are combined off-site and are transported to and used at the well site. The resulting WSF may be pumped downhole where it may function as intended (e.g., prevent and/or reduce water uptake by water-reactive formations; prevent and/or reduce corrosion of metal surfaces, such as surfaces of drillpipe, casing and other tubulars in drilling and completion systems).

As will be appreciated by one of skill in the art, and with the help of this disclosure, a WSF including an amine-based additive (e.g., amine-based shale inhibitor; amine-based corrosion inhibitor) as disclosed herein may be used for (i) preventing and/or reducing water uptake by water-reactive formations; (ii) preventing and/or reducing corrosion of metal surfaces, such as surfaces of drillpipe, casing and other tubulars; etc., in any suitable stage of a wellbore's life, such as for example, during a drilling operation, completion operation, etc.

In an aspect, a method of servicing a wellbore in a subterranean formation can include detecting an amine-based additive (e.g., amine-based shale inhibitor; amine-based corrosion inhibitor) in a WSF (e.g., testing the WSF for the presence and/or amount of amine-based additive in the WSF).

In some aspects, the amine-based additive (e.g., amine-based shale inhibitor; amine-based corrosion inhibitor) may be detected in a WSF prior to using the WSF in a wellbore servicing operation (e.g., a first amount or concentration that is determined prior to placing the WSF in the wellbore and/or subterranean formation, prior to circulating the WSF in the wellbore and/or subterranean formation); as will be discussed in more detail later herein. In such aspects, the amine-based additive may be detected in a WSF at any suitable time between preparing the WSF and placing the WSF in the wellbore and/or subterranean formation. In such aspects, the WSF can be placed in the wellbore and/or subterranean formation subsequent to determining the amount of amine-based additive in the WSF (e.g., post-testing of the WSF for the presence and/or amount of amine-based additive in the WSF).

As will be appreciated by one of skill in the art, and with the help of this disclosure, determining the concentration (e.g., a first concentration) of the amine-based additive (e.g., amine-based shale inhibitor; amine-based corrosion inhibitor) in the WSF subsequent to adding a known amount (e.g., target amount) of amine-based additive to the WSF (and prior to use thereof via placement in a wellbore) may provide validation of the detection method and/or may allow for calibrating the detection method by reconciling the known amount (e.g., target amount) of amine-based additive added to the WSF with the detected amount. In aspects where the known amount (e.g., target amount) of amine-based additive added to the WSF and the detected amount are the same, no action is needed (e.g., no reconciliation is necessary). In aspects where the known amount (e.g., target amount) of amine-based additive added to the WSF and the detected amount are different, a correction factor can be employed to reconcile (e.g., correlate) the known amount (e.g., target amount) of amine-based additive added to the WSF with the detected amount. As will be appreciated by one of skill in the art, and with the help of this disclosure, the method of detecting the amount of amine-based additive in the WSF might either overestimate or underestimate the actual amount (e.g., known amount, target amount) of amine-based additive added to the WSF. For example, a correction factor could be calculated by dividing the detected (e.g., measured, calculated) amount of amine-based additive in the WSF by the actual amount (e.g., known amount, target amount) of amine-based additive added to the WSF; or by dividing the actual amount (e.g., known amount, target amount) of amine-based additive added to the WSF by the detected (e.g., measured, calculated) amount of amine-based additive in the WSF. The correction factor (e.g., correlation factor) can be used to correlate the known amount (e.g., target amount) of amine-based additive added to the WSF with the detected amount. The correction factor (e.g., correlation factor) can be further used throughout testing of the WSF (e.g., subsequent to placing the WSF in a wellbore and/or subterranean formation) to provide for a more accurate determination of the amount of amine-based additive in the WSF.

In other aspects, the amine-based additive (e.g., amine-based shale inhibitor; amine-based corrosion inhibitor) may be detected in a WSF subsequent to using the WSF in a wellbore servicing operation (e.g., a second amount or concentration that is determined subsequent to placing the WSF in the wellbore and/or subterranean formation, subsequent to circulating the WSF in the wellbore and/or subterranean formation); as will be discussed in more detail later herein. In such aspects, the WSF may be placed in the wellbore and/or subterranean formation pre-testing of the WSF for the presence and/or amount of amine-based additive in the WSF.

In an aspect, the WSF including the amine-based additive (e.g., amine-based shale inhibitor; amine-based corrosion inhibitor) may be utilized in a drilling and completion operation.

In an aspect, the WSF including the amine-based additive (e.g., amine-based shale inhibitor; amine-based corrosion inhibitor) is a drilling fluid. A drilling fluid, also known as a drilling mud or simply "mud," is a fluid that is circulated through a wellbore to yield a circulated drilling fluid, while the wellbore is being drilled to facilitate the drilling operation. Generally, a circulated drilling fluid can carry cuttings up from downhole and around a drill bit, transport them up an annulus, and allow their separation, followed by recycling the drilling fluid to the drilling operation. Further, a drilling fluid can cool and lubricate the drill bit, as well as reduce friction between a drill string and the sides of the wellbore hole. Furthermore, the drilling fluid aids in support of a drill pipe and drill bit, and provides a hydrostatic pressure necessary to maintain the integrity of the wellbore walls and prevent well blowouts. When present, the amine-based shale inhibitor in the drilling fluid may contact the subterranean formation, and, when the subterranean formation includes clay and/or shale, at least a portion of the amine-based shale inhibitor may interact with the subterranean formation to prevent and/or reduce water uptake by such water-reactive formation (for example, and without wishing to be limited by theory, by forming a physical bond such as a hydrogen bond with the clay), wherein at least a portion of the amine-based shale inhibitor may be retained by the subterranean formation, thereby depleting (e.g., reducing the amount of) the amine-based shale inhibitor in the drilling fluid. When present, the amine-based corrosion inhibitor in the drilling fluid may interact with metal surfaces that the drilling fluid is in contact with; wherein at least a portion of the amine-based corrosion inhibitor may be retained as a protective film on the metal surfaces, for example via a chemical bond and/or physical bond, thereby depleting (e.g., reducing the amount of) the amine-based corrosion inhibitor in the drilling fluid. Depending on the amount of amine-based additive (e.g., amine-based shale inhibitor; amine-based corrosion inhibitor) detected in the circulated drilling fluid, the amount of amine-based additive in the drilling fluid may be adjusted as necessary, as will be discussed in more detail later herein.

In an aspect, the WSF including the amine-based additive (e.g., amine-based shale inhibitor; amine-based corrosion inhibitor) is a completion fluid. In an aspect, when desired (for example, upon the cessation of drilling operations and/or upon reaching a desired depth), the wellbore or a portion thereof may be prepared for completion. In an aspect, the method of using a WSF including amine-based additive (e.g., a completion fluid including an amine-based additive) may include completing the wellbore. Typically, completion fluids are free of solids. Generally, a completion fluid is placed in the well to facilitate final operations prior to initiation of production, such as setting screens, production liners, packers, downhole valves, etc. The wellbore, or a portion thereof, may be completed by providing a casing string within the wellbore and cementing or otherwise securing the casing string within the wellbore. In such an aspect, the casing string may be positioned (e.g., lowered into) the wellbore to a desired depth prior to, concurrent with, or following provision of the completion fluid including the amine-based additive. The completion fluid may be displaced from the wellbore by pumping a flushing fluid, a spacer fluid, and/or a suitable cementitious slurry downward through an interior flowbore of the casing string and into an annular space formed by the casing string and the wellbore walls. When the cementitious slurry has been positioned, the cementitious slurry may be allowed to set. When present, the amine-based shale inhibitor in the completion fluid may contact the subterranean formation, and, when the subterranean formation includes clay and/or shale, at least a portion of the amine-based shale inhibitor may interact with the subterranean formation to prevent and/or reduce water uptake by such water-reactive formation (for example, and without wishing to be limited by theory, by forming a physical bond such as a hydrogen bond with the clay), wherein at least a portion of the amine-based shale inhibitor may be retained by the subterranean formation, thereby depleting (e.g., reducing the amount of) the amine-based shale inhibitor in the completion fluid. When present, the amine-based corrosion inhibitor in the completion fluid may interact with metal surfaces that the completion fluid is in contact with (e.g., casing string surface; casing surface);

wherein at least a portion of the amine-based corrosion inhibitor may be retained as a protective film on the metal surfaces, for example via a chemical bond and/or physical bond, thereby depleting (e.g., reducing the amount of) the amine-based corrosion inhibitor in the completion fluid. Depending on the amount of amine-based additive detected in the displaced completion fluid, the amount of amine-based additive introduced to the subterranean formation (for example via a flushing fluid, a spacer fluid, and/or a suitable cementitious slurry used to displace the completion fluid) may be adjusted as necessary, as will be discussed in more detail later herein.

In an aspect, a method of detecting an amine-based additive (e.g., amine-based shale inhibitor; amine-based corrosion inhibitor) in a WSF can include contacting an aliquot of the WSF with an amine detector compound to form a detection solution. For purposes of the disclosure herein, an aliquot of a liquid (e.g., WSF) refers to an amount of the liquid that is sufficient for allowing the detection of an amine-based additive. For example, an aliquot of the WSF can be equal to or greater than about 0.001 milliliters (mL), alternatively equal to or greater than about 0.01 mL, alternatively equal to or greater than about 0.1 mL, alternatively equal to or greater than about 1 mL, alternatively equal to or greater than about 5 mL, alternatively equal to or greater than about 10 mL, or alternatively equal to or greater than about 25 mL.

In aspects where the WSF is substantially solids-free, an aliquot of the WSF can be contacted with the amine detector compound without any further processing. For purposes of the disclosure herein, a liquid is considered substantially solids-free when the amount of solids in the WSF does not interfere with the detection of the amine-based amine-based additive (e.g., amine-based shale inhibitor; amine-based corrosion inhibitor). As will be appreciated by one of skill in the art, and with the help of this disclosure, whether solids present in the WSF interfere with the detection of the amine-based additive is dependent upon a variety of factors, such as the amount of solids, the size and/or size distribution of solids, the light absorbing properties of the solids, the light diffraction properties of the solids, etc. For example, a substantially solids-free WSF may include solids in an amount of less than about 1 wt. %, alternatively less than about 0.1 wt. %, alternatively less than about 0.01 wt. %, alternatively less than about 0.001 wt. %, or alternatively less than about 0.0001 wt. %, based on the total weight of the WSF.

In aspects where the WSF includes solids (e.g., the WSF includes solids that may interfere with the detection of the amine-based additive), at least a portion of the WSF may be subjected to a solids removal procedure to yield a substantially solids-free WSF. The solids in the WSF can be debris, mud, WSF additives, drill cuttings, and the like, or combinations thereof. In an aspect, the solids removal procedure can be selected from the group that includes at least filtration, sedimentation, decantation, centrifugation, screening, chemical dissolution, and combinations thereof. For example, at least a portion of the WSF including an undesirable amount of solids (e.g., solids that may interfere with the detection of the amine-based additives) may be filtered (e.g., via any suitable filter, such as a syringe filter) to yield a filtrate (passing through a filter) and solids (retained onto a filter), wherein the filtrate is the substantially solids-free WSF and may be further subjected to amine detection as disclosed herein. As another example, at least a portion of the WSF including an undesirable amount of solids (e.g., solids that may interfere with the detection of the amine-based additive) may be contacted with a chemical compound that may convert the solids into soluble compounds (e.g., acid soluble particles could be dissolved with an acid), thereby yielding the substantially solids-free WSF which may be further subjected to amine detection as disclosed herein. An aliquot of the substantially solids-free WSF (e.g., an aliquot of the filtrate) can be contacted with an amine detector compound to form the detection solution.

In some aspects, the WSF may be subjected to more than one solids removal procedure to yield a substantially solids-free WSF. For example, a circulated drilling fluid may be subjected to centrifugation or screening for the removal of cuttings, wherein the resulting WSF is not solids-free and may be recycled to circulating in the wellbore and/or subterranean formation; and wherein an aliquot of the resulting WSF may be subjected to an additional solids removal procedure, such as filtration, to yield an aliquot of the WSF that is substantially solids-free and may be further subjected to amine detection as disclosed herein.

As will be appreciated by one of skill in the art, and with the help of this disclosure, the amount of WSF subjected to a solids removal procedure to yield a substantially solids-free WSF can be greater than the aliquot of the substantially solids-free WSF contacted with an amine detector compound to form the detection solution, for example to allow for more than one aliquot to be subjected to the amine detection method. Alternatively, the amount of WSF subjected to a solids removal procedure to yield a substantially solids-free WSF can be about the same as the aliquot of the substantially solids-free WSF contacted with an amine detector compound to form the detection solution.

In an aspect, the amine detector compound can include any suitable compound that can undergo a chemical reaction with the amine-based additive (e.g., amine-based shale inhibitor; amine-based corrosion inhibitor) and produce a colored reaction product that has the ability to impart a color and/or color intensity to the detection solution that is different from the color and/or color intensity, respectively, of the aliquot of the WSF subjected to amine detection as disclosed herein. As will be appreciated by one of skill in the art, and with the help of this disclosure, if the amine detector compound is colored, the color and/or color intensity of the detection solution is different from the color and/or color intensity, respectively, of the amine detector compound.

Nonlimiting examples of amine detector compounds suitable for use in the present disclosure include ninhydrin, indane-1,2,3-trione, hydrindantin, quinhydrone, Dragendorff reagent, chloranil, N-halosuccinimide, N-bromosuccinimide, N-iodosuccinimide, a hydrazo compound, a diazonium salt, fluorescein, fluorescein halide, fluorescein chloride, and the like, or combinations thereof. Generally, Dragendorff reagent (potassium bismuth iodide) can be prepared as a solution by combining a bismuth nitrate (e.g., bismuth nitrate; bismuth subnitrate or bismuth(III) oxynitrate), an acid (e.g., acetic acid, tartaric acid, etc.), water, and potassium iodide. In an aspect, the amine detector compound includes ninhydrin. In another aspect, the amine detector compound includes hydrindantin.

In some aspects, hydrindantin can be prepared or obtained ex situ and used for making the detection solution as disclosed herein (e.g., hydrindantin may be synthesized outside the detection solution, and then hydrindantin may be combined with the aliquot of the WSF and an aqueous medium to form the detection solution).

In other aspects, hydrindantin can be prepared in situ (e.g., hydrindantin may be synthesized in the detection solution). For example, and without wishing to be limited by theory, a reducing agent can be introduced to a detection solution including ninhydrin, wherein the reducing agent may interact with the ninhydrin to yield hydrindantin. Non-limiting examples of reducing agents suitable for use in the present disclosure include erythorbic acid; an erythorbate, sodium erythorbate, potassium erythorbate, calcium erythorbate; ascorbic acid; an ascorbate, lithium ascorbate, sodium ascorbate, potassium ascorbate, calcium ascorbate, magnesium ascorbate; an inorganic sulfite, $Li_2SO_3$, $Na_2SO_3$, $K_2SO_3$, $CaSO_3$; an inorganic bisulfite, $NaHSO_3$, $KHSO_3$, $Ca(HSO_3)_2$, $Mg(HSO_3)_2$; formic acid; a formate, lithium formate, sodium formate, potassium formate, cesium formate; citric acid; a citrate, lithium citrate, sodium citrate, potassium citrate, calcium citrate; sodium borohydride; and the like; or combinations thereof. As will be appreciated by one of skill in the art, and with the help of this disclosure, and without wishing to be limited by theory, when inorganic salts and/or organic carboxylate salts used in the aqueous salt solution as disclosed herein are reducing agents (e.g., an inorganic sulfite, a formate, a citrate, etc.) and when ninhydrin is present in the detection solution, such inorganic salts and/or organic carboxylate salts may interact with ninhydrin and form hydrindantin in situ (e.g., hydrindantin is synthesized in the detection solution).

The amine detector compounds as disclosed herein, when combined with an amine (e.g., amine-based additive, such as amine-based shale inhibitor, amine-based corrosion inhibitor, etc.) undergo a chemical reaction with the amine-based additive and produce a colored reaction product.

For example, and without wishing to be limited by theory, a general reaction scheme is displayed in FIG. 1, detailing the reaction of ninhydrin with amines; which results in a Schiff base compound that has a characteristic purple color. Further, and without wishing to be limited by theory, the Schiff base in FIG. 1 can be formed by extracting the nitrogen from an amine group in an amine-based additive (e.g., amine-based shale inhibitor; amine-based corrosion inhibitor). Generally, the purple Schiff base forms by reaction of ninhydrin with primary amines. Ninhydrin can be used to detect secondary amines as well, wherein the secondary amines can form an yellow-orange iminium salt with the ninhydrin. However, in some instances, all amines (e.g., primary amines, protonated primary amines, secondary amines, protonated secondary amines, tertiary amines, protonated tertiary amines) can be detected with ninhydrin, wherein secondary amine functional groups, protonated secondary amine functional groups, tertiary amine functional groups, protonated tertiary amine functional groups, or combinations thereof may be converted during heating the reaction mixture to primary amine functional groups, protonated primary amine functional groups, secondary amine functional groups, protonated secondary amine functional groups, or combinations thereof, thereby allowing for the detection with ninhydrin. For example, certain secondary amines can yield the purple color characteristic of the Schiff base when reacted with ninhydrin.

As another example, Dragendorff reagent can react with amines and yield a reaction product displaying a color that varies from orange to red to brown, depending on the detected amine. As yet another example, fluorescein chloride can react with amines and yield a reaction product displaying a red color.

In an aspect, the amine detector compound can be contacted in any suitable amount with an aliquot of the WSF to yield the detection solution. For example, the amine detector compound can be contacted with an aliquot of the WSF in an amount of from about 0.01 mmol/liter to about 200 mmol/liter, alternatively from about 0.1 mmol/liter to about 150 mmol/liter, alternatively from about 1 mmol/liter to about 100 mmol/liter, or alternatively from about 1 mmol/liter to about 50 mmol/liter amine detector compound, based on the total volume of the detection solution.

In aspects where the WSF includes either an amine-based shale inhibitor or an amine-based corrosion inhibitor (but not both), the amine detector compounds allows for the detection of the amine-based shale inhibitor or the amine-based corrosion inhibitor, respectively.

In some aspects where the WSF includes both an amine-based shale inhibitor and an amine-based corrosion inhibitor, the amine detector compound employed for amine detection in the WSF may include a first amine detector compound tailored to selectively react with and specifically detect the amine-based shale inhibitor, and a second amine detector compound tailored to selectively react with and specifically detect the amine-based corrosion inhibitor. In such aspects, the first amine detector compound and the second amine detector compound may selectively react with the amine-based shale inhibitor and the amine-based corrosion inhibitor, respectively, thus providing for different absorption peaks (e.g., different colors) based on which amine-based additive is detected.

In other aspects where the WSF includes both an amine-based shale inhibitor and an amine-based corrosion inhibitor, the amine detector compound employed for amine detection in the WSF may detect the cumulative amount of amine-based additive, thus accounting for both the amine-based shale inhibitor and the amine-based corrosion inhibitor at the same time.

In some aspects, the amine detector compound can be contacted "as is" with an aliquot of the WSF to yield the detection solution. For example, solid ninhydrin can be contacted with the aliquot of the WSF to yield the detection solution; wherein the ninhydrin is not placed in solution prior to contacting the ninhydrin with the aliquot of the WSF. As another example, the liquid Dragendorff reagent can be contacted with the aliquot of the WSF to yield the detection solution; wherein the liquid Dragendorff reagent is not mixed with a solvent prior to contacting the liquid Dragendorff reagent with the aliquot of the WSF.

In other aspects, the amine detector compound can be placed in solution prior to contacting the amine detector compound with the aliquot of the WSF. For example, the amine detector compound can be contacted with a solvent (e.g., a liquid solvent, such as a polar organic solvent (POS)) to form an amine detector reagent (e.g., a liquid amine detector reagent, such as a liquid ninhydrin reagent), wherein the amine detector reagent can be contacted with an aliquot of the WSF to yield the detection solution. The components of the amine detector reagent may be combined on site or on location (e.g., the location where it is intended to use the amine detector reagent); for example, the components of the amine detector reagent may be combined at the well site. Alternatively, the amine detector reagent may be prepared off site, followed by transporting the amine detector reagent to the location where it is intended to use the amine detector reagent, such as the well site.

In an aspect, the amine detector reagent can include the amine detector compound as disclosed herein and a POS. Generally, a POS can be a polar compound (as opposed to a non-polar compound) that contains carbon (C) and has the ability to solubilize other compounds and form solutions (e.g., liquid solutions). Without wishing to be limited by theory, a polar compound is a compound in which the electric charge is not symmetrically distributed, so that there is a molecular dipole, owing to the presence of atoms with different electronegativities in the molecule, such as oxygen, nitrogen, etc. Further, and without wishing to be limited by theory, polar solvents can generally solubilize polar compounds, but may also form solutions with non-polar compounds.

The POS suitable for forming the amine detector reagent as disclosed herein is a liquid under ambient conditions, such as ambient pressure (e.g., atmospheric pressure, a pressure of from about 0.9 atm to about 1.1 atm) and/or ambient temperature (e.g., room temperature, a temperature of from about 15° C. to about 30° C.).

Nonlimiting examples of a POS suitable for use in the present disclosure include ethylene glycol; ethylene glycol monobutyl ether; diethylene glycol; diethylene glycol butyl ether; a polyethylene glycol characterized by the formula

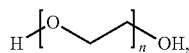

wherein n is an integer from about 3 to about 25, alternatively from about 5 to about 22, or alternatively from about 8 to about 20; glycerin; hexamethylphosphoramide; propylene carbonate; sulfolane; derivatives thereof, and the like; or combinations thereof.

In some aspects, the POS suitable for forming the amine detector reagent may include ethylene carbonate and/or a polyethylene glycol characterized by the formula

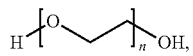

wherein n is an integer greater than about 25, alternatively greater than about 30, or alternatively greater than about 50 (e.g., a polyethylene glycol that is a solid under ambient conditions); in combination with another POS, provided that the ethylene carbonate and/or a polyethylene glycol combination with another POS is a liquid under ambient conditions (e.g., ambient pressure, ambient temperature).

In an aspect, the POS suitable for forming the amine detector reagent can include a polyethylene glycol characterized by a molecular weight of less than about 1,100 g/mol, alternatively less than about 1,050 g/mol, alternatively less than about 1,000 g/mol, alternatively less than about 950 g/mol, or alternatively less than about 900 g/mol.

The POS as disclosed herein may be characterized by a relatively high boiling point, e.g., a boiling point that is greater than the boiling point of water under ambient conditions (e.g., ambient pressure), such as a boiling point that is greater than about 100° C. In some aspects, the detection solution may be heated (e.g., boiled) prior to detecting an absorption intensity for the detection solution, and it is advantageous for the POS to remain in the detection solution during and subsequent to heating (e.g., boiling) the detection solution (as opposed to the POS leaving the detection solution, the POS evaporating from the detection solution, the POS boiling off out of the detection solution, etc.). In an aspect, the POS can be characterized by a boiling point at ambient pressure of equal to or greater than about 105° C., alternatively equal to or greater than about 110° C., alternatively equal to or greater than about 115° C., alternatively equal to or greater than about 120° C., alternatively equal to or greater than about 125° C., alternatively equal to or greater than about 130° C., alternatively equal to or greater than about 140° C., alternatively equal to or greater than about 150° C., alternatively equal to or greater than about 160° C., or alternatively equal to or greater than about 170° C. As will be appreciated by one of skill in the art, and with the help of this disclosure, and without wishing to be limited by theory, in some aspects, a POS suitable for use in the present disclosure may have a boiling point at ambient pressure of less than about 105° C., wherein the POS may form an azeotrope with one or more components of the solution containing of the POS (e.g., amine detector reagent, aqueous salt solution, detection solution, etc.), wherein such azeotrope can be characterized by a boiling point at ambient pressure of equal to or greater than about 105° C. Further, and without wishing to be limited by theory, even if the POS can have a boiling point at ambient pressure of less than about 105° C., it may be advantageous for such POS to be characterized by a flash point at ambient pressure of equal to or greater than about 105° C.

The POS as disclosed herein may be characterized by a relatively low volatility, i.e., a relatively low vapor pressure under ambient conditions. Generally, volatility of a substance refers to the tendency of a substance to vaporize, wherein at a given temperature, a substance with a higher vapor pressure will vaporize more readily than a substance with a lower vapor pressure (i.e., the less volatile the substance, the lower the vapor pressure). As disclosed herein, it is advantageous for the POS to remain in the detection solution during and subsequent to heating (e.g., boiling) the detection solution (as opposed to the POS leaving the detection solution, the POS evaporating from the detection solution, the POS boiling off out of the detection solution, etc.). In an aspect, the POS can be characterized by a vapor pressure at ambient temperature of less than about 0.01 mm Hg, or alternatively less than about 0.007 mmHg.

The POS as disclosed herein may be characterized by a relatively high flash point, e.g., a flash point that is greater than the boiling point of water under ambient conditions (e.g., ambient pressure), such as a flash point that is greater than about 100° C. Generally, the flash point of a compound refers to the lowest temperature at which a substance will give off a vapor that will flash or burn momentarily when ignited. In some aspects, the detection solution may be heated (e.g., boiled) prior to detecting an absorption intensity for the detection solution, and it is advantageous for the POS to not reach its flash point while heating (e.g., boiling) the detection solution, as the detection solution and/or vapors may ignite and cause unsafe operating conditions, as well as compromise the detection solution. In an aspect, the POS can be characterized by a flash point at ambient pressure of equal to or greater than about 105° C., alternatively equal to or greater than about 110° C., alternatively equal to or greater than about 115° C., alternatively equal to or greater than about 120° C., alternatively equal to or greater than about 125° C., alternatively equal to or greater than about 130° C., alternatively equal to or greater than about 140° C., alternatively equal to or greater than about 150° C., alternatively equal to or greater than about 160° C., or alternatively equal to or greater than about 170° C.

In an aspect, the use of an amine detector reagent (as opposed to an amine detector compound that is not part of an amine detector reagent) may advantageously provide for increased control of the amount of amine detector compound placed in the detection solution, thereby providing for an increased accuracy and/or repeatability of absorbance measurements. Generally, the term "accuracy" refers to the closeness of the agreement between the result of a measurement and a true value of the measured quantity (e.g., measured absorbance). For example, accuracy could be concluded if an observed absorbance measurement is within +5% of a known absorbance value. Generally, the term "repeatability" refers to the closeness of agreement between independent results obtained by the same person (same operator) with the same method on identical test samples, under the same conditions (same apparatus, same laboratory or work space, etc.). For example, repeatability could be concluded if a series of measurements are taken, and then a mean absorbance value obtained from the taken measurements is within +5% of a known mean value. Further, and without wishing to be limited by theory, statistical tests such as a t-test, a gage repeatability and reproducibility (R&R) test, etc. can be performed to determine accuracy and repeatability. Generally, "reproducibility" refers to the closeness of agreement between independent results obtained by different people (different operators) with the same method on identical test samples, under the same conditions (same apparatus, same laboratory or work space, etc.). As will be appreciated by one of skill in the art, and with the help of this disclosure, the use of a liquid reagent (as opposed to a solid compound) can provide for easier dosing of the detection solution with a desired amount of amine detector compound. Furthermore, and as will be appreciated by one of skill in the art, and with the help of this disclosure, measuring a liquid (e.g., with a syringe) may be in certain instances a more accurate way of dosing of the detection solution with a desired amount of amine detector compound, when compared to weighing a solid and transferring the solid in the detection solution. Additionally, using a provided liquid reagent may give a means of traceability, if a liquid reagent (e.g., amine detector reagent; such as a liquid amine detector reagent, a liquid ninhydrin reagent) is prepared and certified prior to transfer to the field (e.g., the liquid reagent may contain a specific known authentication marker).

In an aspect, and without wishing to be limited by theory, the presence of POS in the detection solution (whether the POS originates in the amine detector reagent and/or in the aqueous salt solution, as will be described in more detail later herein) can lead to an increased rate of reaction between the amine detector compound and the amine-based additive (e.g., amine-based shale inhibitor; amine-based corrosion inhibitor), thereby producing more quickly a colored compound measurable by ultraviolet-visible (UV-VIS) spectroscopy and/or colorimetry. Without wishing to be limited by theory, the POS may act in a manner similar to a phase transfer agent or catalyst, thereby allowing for a better contact between the amine detector compound and the amine-based additive, which in turn may increase the rate of reaction between the amine detector compound and the amine-based additive.

In an aspect, the amine detector compound may be present in the amine detector reagent in an amount of from about 1 mmol/liter to less than about a saturation concentration of the amine detector compound in the amine detector reagent, alternatively from about 1 mmol/liter to about 1 mol/liter, alternatively from about 5 mmol/liter to about 500 mmol/liter, or alternatively from about 10 mmol/liter to about 250 mol/liter, based on the total volume of the amine detector reagent.

In an aspect, the amine detector reagent and the aliquot of the WSF may be contacted with each other in any suitable ratio that is effective to provide for a desired concentration of the amine detector compound in the detection solution. For example, the amine detector reagent may be contacted with the aliquot of the WSF in an amount effective to provide for a concentration of the amine detector compound in the detection solution of from about 0.01 mmol/liter to about 200 mmol/liter, alternatively from about 0.1 mmol/liter to about 150 mmol/liter, alternatively from about 1 mmol/liter to about 100 mmol/liter, or alternatively from about 1 mmol/liter to about 50 mmol/liter amine detector compound, based on the total volume of the detection solution.

In an aspect, the amine detector reagent and the aliquot of the WSF may be contacted with each other at a volumetric ratio of amine detector reagent to WSF of from about 50:1 to about 1:5, alternatively from about 25:1 to about 1:2, or alternatively from about 15:1 to about 1:1.

In an aspect, a method of detecting an amine-based additive (e.g., amine-based shale inhibitor; amine-based corrosion inhibitor) in a WSF can include contacting an aliquot of the WSF with (i) an amine detector compound or an amine detector reagent and (ii) an aqueous medium to form the detection solution. In such aspect, the aqueous medium can include fresh water, tap water, potable water, non-potable water, untreated water, partially treated water, treated water, produced water, city water, well-water, surface water, an aqueous solution, an aqueous salt solution, sea water, and the like, or combinations thereof.

In an aspect, the aqueous medium excludes the amine detector compound. In an aspect, the aqueous medium is substantially free of the amine detector compound. For example, the aqueous medium may include the amine detector compound in an amount of less than about 0.1 wt. %, alternatively less than about 0.01 wt. %, alternatively less than about 0.001 wt. %, or alternatively less than about 0.0001 wt. %, based on the total weight of the aqueous medium.

In an aspect, the aqueous salt solution excludes the amine detector compound. In an aspect, the aqueous salt solution is substantially free of the amine detector compound. For example, the aqueous salt solution may include the amine detector compound in an amount of less than about 0.1 wt. %, alternatively less than about 0.01 wt. %, alternatively less than about 0.001 wt. %, or alternatively less than about 0.0001 wt. %, based on the total weight of the aqueous salt solution.

In an aspect, the aqueous salt solution excludes ninhydrin. In an aspect, the aqueous salt solution is substantially free of ninhydrin. For example, the aqueous salt solution may include ninhydrin in an amount of less than about 0.1 wt. %, alternatively less than about 0.01 wt. %, alternatively less than about 0.001 wt. %, or alternatively less than about 0.0001 wt. %, based on the total weight of the aqueous salt solution.

In an aspect, the (i) amine detector compound or amine detector reagent, (ii) aqueous medium (e.g., aqueous salt solution), and (iii) aliquot of the WSF may be contacted (e.g., combined) with each other in any suitable order. For example, the (i) amine detector compound or amine detector reagent, (ii) aqueous medium (e.g., aqueous salt solution), and (iii) aliquot of the WSF may be contacted (e.g., combined) with each other at substantially the same time. As another example, the amine detector compound and/or amine detector reagent may be first contacted with the aqueous medium (e.g., aqueous salt solution), wherein the resulting intermediate solution may be then contacted with the aliquot of the WSF to form the detection solution. As yet another example, the aliquot of the WSF may be first contacted with the aqueous medium (e.g., aqueous salt solution), wherein the resulting intermediate solution may be then contacted with the amine detector compound and/or amine detector reagent to form the detection solution. As still yet another example, the aliquot of the WSF may be first contacted with the amine detector compound and/or amine detector reagent, wherein the resulting intermediate solution may be then contacted with the aqueous medium (e.g., aqueous salt solution) to form the detection solution.

In an aspect, contacting an aliquot of the WSF with an amine detector compound to form a detection solution can further include agitating the detection solution; wherein agitating includes stirring, magnetic stirring, shaking, blending, mixing, gas bubbling, and the like, or combinations thereof. The ingredients or components of the detection solution may be contacted (e.g., combined) with each other in any suitable order under agitation; or alternatively the ingredients or components of the detection solution may be first contacted (e.g., combined) with each other, and then the resulting solution may be agitated to form the detection solution. In some aspects, intermediate solutions formed in the process of making the detection solution may be independently agitated, wherein the detection solution may or may not be agitated. Further, the detection solution may be heated, as described in more detail later herein. In aspects where the detection solution is boiled, the boiling of the detection solution may provide for further agitating the detection solution.

In an aspect, a method of detecting an amine-based additive (e.g., amine-based shale inhibitor; amine-based corrosion inhibitor) in a WSF can include contacting an aliquot of the WSF with (i) an amine detector compound or an amine detector reagent and (ii) an aqueous salt solution to form the detection solution; wherein the aqueous salt solution includes an inorganic salt and an organic carboxylate salt. Generally, a salt is a chemical compound including an assembly of cations and anions, wherein the anions in an inorganic salt are derived from inorganic acids (such as hydrochloric acid, phosphoric acid, sulfuric acid, nitric acid, etc.), and wherein the anions in an organic carboxylate salt are derived from organic carboxylic acids (such as acetic acid, citric acid, formic acid, etc.).

Nonlimiting examples of inorganic salts suitable for use in the aqueous salt solution of the present disclosure include an inorganic halide; an inorganic chloride, LiCl, NaCl, KCl, $CaCl_2$, $MgCl_2$, $ZnCl_2$; an inorganic bromide, LiBr, NaBr, KBr, $CaBr_2$, $MgBr_2$, $ZnBr_2$; an inorganic phosphate, $LiH_2PO_4$, $Li_2HPO_4$, $NaH_2PO_4$, $Na_2HPO_4$, $Na_3PO_4$, $KH_2PO_4$, $K_2HPO_4$, $K_3PO_4$, $Ca_3(PO_4)_2$, $Mg(H_2PO_4)_2xH_2O$, $MgHPO_4xH_2O$, $Mg_3(PO_4)_2xH_2O$; an inorganic nitrate, $LiNO_3$, $NaNO_3$, $KNO_3$, $Ca(NO_3)_2$, $Mg(NO_3)_2$; an inorganic nitrite, $LiNO_2$, $NaNO_2$, $KNO_2$, $(Ca(NO_2)_2$, $Mg(NO_2)_2)$; an inorganic sulfate, $Li_2SO_4$, $Na_2SO_4$, $K_2SO_4$, $CaSO_4$, $MgSO_4$; an inorganic sulfite, $Li_2SO_3$, $Na_2SO_3$, $K_2SO_3$, $CaSO_3$; an inorganic sulfide, $Li_2S$, $Na_2S$, $K_2S$, CaS; an inorganic carbonate, $Na_2CO_3$, $K_2CO_3$; an inorganic bicarbonate, $NaHCO_3$, $KHCO_3$, $Mg(HCO_3)_2$, $Ca(HCO_3)_2$; and the like; or combinations thereof.

In an aspect, the aqueous salt solution as disclosed herein may provide for decreasing absorption intensity variations between different WSFs that contain substantially the same amount of the amine-based shale inhibitor; wherein the different WSFs are characterized by different salinity when compared to each other. Without wishing to be limited by theory, the inorganic salt in the aqueous salt solution may stabilize the influence of the WSF salinity on the absorbance intensity of the detection solution (e.g., the influence of the WSF salinity on the color and/or color intensity of the detection solution). In other words, and without wishing to be limited by theory, the inorganic salt in the aqueous salt solution may "drown" or "mask" any interference on the absorbance intensity of the detection solution (e.g., on the color and/color intensity of the detection solution) that could be caused by the WSF salinity; wherein the salinity of the aqueous salt solution is relatively high, such that any added salinity via the aliquot of WSF does not account for a significant difference between the salinity of the aqueous salt solution and the salinity of the detection solution.

In an aspect, the inorganic salt may be present in the aqueous salt solution in an amount of from about 0.1 wt. % to less than about a saturation concentration of the inorganic salt in the aqueous salt solution, alternatively from about 0.1 wt. % to about 27.5 wt. %, or alternatively from about 0.5 wt. % to about 25 wt. %, based on the total weight of the aqueous salt solution. As will be appreciated by one of skill in the art, and with the help of this disclosure, the amount of the inorganic salt in the detection solution depends on a variety of factors, such as the presence of or absence of the inorganic salt of the aqueous salt solution in the aliquot of the WSF; if present in the WSF, the concentration of the inorganic salt of the aqueous salt solution in the aliquot of the WSF; the volumetric ratio at which the aqueous salt solution is contacted with the aliquot of the WSF; any volumetric contribution of the amine detector compound (for example when used as a liquid amine detector reagent) to the detection solution; etc. While the current disclosure is discussed in detail in the context of the inorganic salt being added to the detection solution via the aqueous salt solution, it should be understood that the inorganic salt can be introduced to the detection solution via any suitable reagent, e.g., via a solid reagent including the inorganic salt.

Nonlimiting examples of organic carboxylate salts suitable for use in the aqueous salt solution of the present disclosure include an acetate, lithium acetate, sodium acetate, potassium acetate, zinc acetate, aluminum acetate, cesium acetate; a formate, lithium formate, sodium formate, potassium formate, cesium formate; a citrate, lithium citrate, sodium citrate, potassium citrate, calcium citrate; a polyacrylate, lithium polyacrylate, sodium polyacrylate, potassium polyacrylate; a lactate, lithium lactate, sodium lactate, potassium lactate, calcium lactate, magnesium lactate; a propionate, sodium propionate, potassium propionate, calcium propionate, magnesium propionate; a butyrate, sodium butyrate, potassium butyrate, calcium butyrate, magnesium butyrate; a hydroxybutyrate, sodium hydroxybutyrate, potassium hydroxybutyrate, calcium hydroxybutyrate, magnesium hydroxybutyrate; a glycolate, sodium glycolate, potassium glycolate, calcium glycolate, magnesium glycolate; derivatives thereof, and the like; or combinations thereof.

In an aspect, the aqueous salt solution may provide for decreasing absorption intensity variations between different WSFs that contain substantially the same amount of the amine-based shale inhibitor; wherein the different WSFs are characterized by different alkalinity (e.g., different pH) when compared to each other. Without wishing to be limited by theory, the organic carboxylate salt in the aqueous salt solution may stabilize the influence of the WSF alkalinity on the absorbance intensity of the detection solution (e.g., the influence of the WSF alkalinity on the color and/color intensity of the detection solution). In other words, and without wishing to be limited by theory, the organic carboxylate salt in the aqueous salt solution may "drown" or "mask" any interference on the absorbance intensity of the detection solution (e.g., on the color and/color intensity of the detection solution) that could be caused by the WSF alkalinity; e.g., by providing a buffering effect in the detection solution.

For example, in some aspects, the WSF may include a drilling fluid, wherein the drilling fluid is characterized by a pH of greater than about 7.5, alternatively greater than about 8.0, alternatively greater than about 8.5, or alternatively greater than about 9.0. In such aspects, the detection solution may be characterized by a pH that is lower than the pH of the drilling fluid, e.g., a pH that is less than about 9.0, alternatively less than about 8.5, alternatively less than about 8.0, alternatively less than about 7.5, alternatively less than about 7.0, alternatively less than about 6.5, alternatively less than about 6.0, or alternatively less than about 5.5.

As another example, in some aspects, two different drilling fluids could be analyzed for the amount of amine-based additive, wherein the two drilling fluids have pH values different from each other (e.g., a first drilling fluid having a pH of 8.0 and a second drilling fluid having a pH of 8.5). In such aspects, the two different detection solutions based on the two different drilling fluids (having pH values different from each other) may have substantially about the same pH as each other (e.g., a pH pf less than about 7.0), although the two different detection solutions were prepared by using different drilling fluids with different pH values.

In an aspect, the organic carboxylate salt may be present in the aqueous salt solution in an amount of from about 0.1 wt. % to less than about a saturation concentration of the organic carboxylate salt in the aqueous salt solution, alternatively from about 0.1 wt. % to about 30 wt. %, alternatively from about 0.5 wt. % to about 25 wt. %, alternatively from about 1 wt. % to about 20 wt. %, or alternatively from about 5 wt. % to about 15 wt. %, based on the total weight of the aqueous salt solution. As will be appreciated by one of skill in the art, and with the help of this disclosure, the amount of the organic carboxylate salt in the detection solution depends on a variety of factors, such as the presence of or absence of the organic carboxylate salt of the aqueous salt solution in the aliquot of the WSF; if present in the WSF, the concentration of the organic carboxylate salt of the aqueous salt solution in the aliquot of the WSF; the volumetric ratio at which the aqueous salt solution is contacted with the aliquot of the WSF; any volumetric contribution of the amine detector compound (for example when used as a liquid amine detector reagent) to the detection solution; etc. While the current disclosure is discussed in detail in the context of the organic carboxylate salt being added to the detection solution via the aqueous salt solution, it should be understood that the POS can be introduced to the detection solution via any suitable reagent, e.g., via an organic carboxylate salt solution including water and the organic carboxylate salt.

In an aspect, the aqueous salt solution further includes a POS. In aspects where an amine detector reagent and an aqueous salt solution including a POS are used for preparing the detection solution, the POS of the amine detector reagent and the POS of the aqueous salt solution may be the same or different. The POS of the aqueous salt solution may include any POS that is suitable for use in the amine detector reagent. Additionally, the POS of the aqueous salt solution may include some polar organic compounds that are solids or semi-solids under ambient conditions; while such polar organic compounds may be unsuitable for use in the amine detector reagent because they are not liquids under ambient conditions. For example, while ethylene carbonate and/or solid polyethylene glycols may not be used by themselves (e.g., without being mixed with another POS that is a liquid under ambient conditions) in amine detector reagents; ethylene carbonate and/or solid polyethylene glycols may be used by themselves (e.g., without being mixed with another POS that is a liquid under ambient conditions) as a POS in aqueous salt solution, provided that the aqueous salt solution including the POS is a liquid under ambient conditions.

In an aspect, the POS may be present in the aqueous salt solution in an amount of from about 1 wt. % to about 50 wt. %, alternatively from about 2 wt. % to about 25 wt. %, or alternatively from about 5 wt. % to about 15 wt. %, based on the total weight of the aqueous salt solution.

In an aspect, the POS may be present in the detection solution in an amount of from about 1 wt. % to about 50 wt. %, alternatively from about 2 wt. % to about 25 wt. %, or alternatively from about 5 wt. % to about 15 wt. %, based on the total weight of the detection solution. The POS in the detection solution may come from the POS in the amine detector reagent, from the POS in the aqueous salt solution, from POS that may be added directly to the detection solution; and the like, or combinations thereof. While the current disclosure is discussed in detail in the context of the POS being added to the detection solution via the amine detector reagent and/or via the aqueous salt solution, it should be understood that the POS can be introduced to the detection solution via any suitable reagent, e.g., via adding POS directly to the detection solution (as opposed to adding POS to the detection solution via the amine detector reagent and/or via the aqueous salt solution).

In aspects where the aqueous medium (e.g., aqueous salt solution) is used for forming the detection solution, the amine detector reagent and/or the amine detector compound may be contacted with the aliquot of the WSF and the aqueous medium in any suitable ratio that is effective to provide for a desired concentration of the amine detector compound in the detection solution. For example, the amine detector reagent and/or the amine detector compound may be contacted with the aliquot of the WSF and the aqueous medium in an amount effective to provide for a concentration of the amine detector compound in the detection solution of from about 0.01 mmol/liter to about 200 mmol/liter, alternatively from about 0.1 mmol/liter to about 150 mmol/liter, alternatively from about 1 mmol/liter to about 100 mmol/liter, or alternatively from about 1 mmol/liter to about 50 mmol/liter amine detector compound, based on the total volume of the detection solution.

In an aspect, the aqueous medium (e.g., aqueous salt solution) and the aliquot of the WSF may be contacted with each other at a volumetric ratio of aqueous salt solution to WSF of from about 500:1 to about 5:1, alternatively from about 250:1 to about 10:1, or alternatively from about 100:1 to about 15:1.

Without wishing to be limited by theory, and as will be appreciated by one of skill in the art, and with the help of this disclosure, color and/or color intensity can be detected by optical detection. For purposes of the disclosure herein, the term "optical detection" refers to detection performed visually by a human subject (e.g., an observation by an operator) and/or detection performed by a machine, for example detection with a spectrometer (e.g., ultraviolet-visible (UV-VIS) spectrometer and/or colorimeter) by using an analytical technique, such as UV-VIS spectroscopy and/or colorimetry, respectively.

Generally, color is associated specifically with electromagnetic radiation (e.g., visible light) of a certain range of wavelengths visible to the human eye, for example electromagnetic radiation with a wavelength between about 380 nanometers (nm) and about 760 nm (visible spectrum). When all wavelengths of visible light are present, the light appears "white" to a human. Colored materials (e.g., compounds, solids, liquids, solutions, gases) are colored because of the absorption of visible light (e.g., visible electromagnetic radiation). The color is a result of the material absorbing a certain color of light, leading to the visual perception of the compound being the complementary color. If any wavelength is removed (absorbed) from the visible light, a human perceives the remaining combination of wavelengths of light as the "complementary" color. For example, when light passes through a liquid (e.g., colored solution), a characteristic portion of wavelengths can be absorbed. If wavelengths of light from a certain region of the spectrum are absorbed by a material, then the materials will appear to be the complementary color to a human operator. For example, if violet light with wavelength of 400 nm is absorbed by a liquid, the liquid will visually appear yellow. As another example, if blue light with wavelength of 450 nm is absorbed by a liquid, the liquid will visually appear orange. As yet another example, if green light with wavelength of 530 nm is absorbed by a liquid, the liquid will visually appear purple.

In an aspect, the detection solution can be characterized by at least one absorption peak wavelength in the range of from about 380 nm to about 760 nm, alternatively from about 390 nm to about 750 nm, alternatively from about 400 nm to about 740 nm, alternatively from about 380 nm to about 460 nm, or alternatively from about 460 nm to about 760 nm. In such aspect, the detection solution is characterized by a visible color (e.g., a color that can be visually perceived by a human upon visual observation of the detection solution), thereby the detection of the amine-based additive (e.g., amine-based shale inhibitor; amine-based corrosion inhibitor) can be performed via optical detection (e.g., visual detection and/or spectroscopic detection). For purposes of the disclosure herein, the terms "absorption peak wavelength," "maximum absorption wavelength," and "wavelength of maximum absorbance" ($\lambda_{max}$) can be used interchangeably, and refer to the wavelength where a specific compound or mixture of compounds displays the highest absorbance (i.e., the highest absorption intensity) at a given concentration. As will be appreciated by one of skill in the art, and with the help of this disclosure, a specific compound or mixture of compounds can be characterized by a local maximum absorbance and/or an absolute maximum absorbance, wherein the local maximum absorbance refers to the maximum absorbance intensity in a given wavelength range (e.g., the maximum absorbance intensity in a wavelength range of from about 500 nm to about 600 nm), and wherein the absolute maximum absorbance refers to the maximum absorbance intensity across the entire investigated wavelength range (e.g., the maximum absorbance intensity across the entire wavelength range of from about 380 nm to about 760 nm). Further, and as will be appreciated by one of skill in the art, and with the help of this disclosure, when a specific compound or mixture of compounds displays a single absorption peak across the entire investigated wavelength range, the local maximum absorbance and the absolute maximum absorbance are the same; and when a specific compound or mixture of compounds displays two or more absorption peaks across the entire investigated wavelength range, the peak with the highest absorption intensity across the entire investigated wavelength range displays the absolute maximum absorbance, while the peaks other than the peak with the highest absorption intensity display local maximum absorbances. Furthermore, and as will be appreciated by one of skill in the art, and with the help of this disclosure, an absorption peak wavelength may correspond to a local maximum absorbance and/or an absolute maximum absorbance. Absorption peak wavelengths are characteristic to each colored compound.

Generally, and without wishing to be limited by theory, colorimetry is an analytical technique (e.g., spectroscopic technique) that can be used to determine the amount (e.g., concentration) of colored compounds in solutions by the application of the Beer-Lambert law, which states that the concentration of a solute is proportional to the absorbance (i.e., absorption intensity). Typically, colorimetry uses the entire visible spectrum (i.e., white light or visible light) or light with a specific wavelength, thereby allowing for the complementary color of the absorbed radiation to be observed as transmitted light. Colorimetry can use a particular wavelength when the compound to be detected is known, and consequently the wavelength at which such compound absorbs is known. Colorimetry does not scan the entire visible light spectrum (as opposed to UV-VIS spectroscopy). Further, colorimetry does not employ a reference sample concurrently with a colored sample for detection. Colorimetry is performed with a colorimeter. A colorimeter may analyze a sample in a laboratory setting. Alternatively, a portable colorimeter may be employed for sample analysis in the field (i.e., on location; in real-time).

In an aspect, a method of detecting an amine-based additive (e.g., amine-based shale inhibitor; amine-based corrosion inhibitor) in a WSF can include detecting an absorption intensity for the detection solution at a wavelength within about ±20%, alternatively within about 110%, alternatively within about ±5%, alternatively within about ±1% of the at least one absorption peak wavelength ($\lambda_{max}$), or alternatively at about the at least one absorption peak wavelength ($\lambda_{max}$). Generally, and without wishing to be limited by theory, across the light spectrum wavelengths, colored compounds absorb radiation via peaks (as opposed to lines), owing to complex electronic transitions within the molecules of the colored compounds. Further, and without wishing to be limited by theory, the absorption intensity can be measured at any wavelength under the absorption peak; however, measuring the absorption intensity at the at least one absorption peak wavelength ($\lambda_{max}$) will yield the greatest detection sensitivity (owing to the steepest slope of a calibration curve relating absorption intensity to concentration). Furthermore, and without wishing to be limited by theory, the absorption intensity is proportional to the amount (e.g., concentration) of colored compound (e.g., colored reaction product formed by the chemical reaction between the amine-based additive and the amine detector compound), in accordance with the Beer-Lambert law. As will be appreciated by one of skill in the art, and with the help of this disclosure, the further the wavelength at which the absorption intensity is measured is from the at least one absorption peak wavelength ($\lambda_{max}$), the greater the error in determining the amount (e.g., concentration) of colored compound (e.g., colored reaction product formed by the chemical reaction between the amine-based additive and the amine detector compound).

In an aspect, detecting an absorption intensity for the detection solution at a wavelength within about ±20% of the at least one absorption peak wavelength ($\lambda_{max}$) can include visually detecting the color intensity of the detection solution. For example, a human (e.g., an operator) can visually detect the color intensity of the solution, such as deep purple versus light purple, mildly deep red versus extremely deep red.

In an aspect, detecting an absorption intensity for the detection solution at a wavelength within about ±20% of the at least one absorption peak wavelength ($\lambda_{max}$) can include spectroscopically detecting an absorption intensity of the detection solution, for example via colorimetry and/or UV-VIS spectroscopy, as disclosed herein.

In an aspect, a method of detecting an amine-based additive (e.g., amine-based shale inhibitor; amine-based corrosion inhibitor) in a WSF can further include heating the detection solution, e.g., heating the detection solution prior to detecting an absorption intensity for the detection solution at a wavelength within about ±20% of the at least one absorption peak wavelength. The detection solution can be heated by using any suitable methodology (e.g., a heater, a heat exchanger, a fired heater, a burner, a heating mantle, a heating element, etc.).

In an aspect, the detection mixture can be heated to a temperature of from about 30° C. to about a boiling point of the detection solution, alternatively from about 30° C. to about 100° C., alternatively from about 35° C. to about 95° C., alternatively from about 40° C. to about 90° C., or alternatively from about 50° C. to about 75° C. Without wishing to be limited by theory, heating the detection solution can speed up (e.g., increase the rate of) the reaction between the amine detector compound and the amine-based shale inhibitor. As will be appreciated by one of skill in the art, and with the help of this disclosure, and without wishing to be limited by theory, colored compounds absorbance generally varies with temperature, and consequently the heated detection solution can be cooled to ambient temperature (e.g., room temperature, a temperature of from about 15° C. to about 30° C.) prior to detecting an absorption intensity for the detection solution at a wavelength within about ±20% of the at least one absorption peak wavelength. For example, the detection solution may be allowed to reach ambient temperature by losing heat to the surrounding environment. As another example, the detection solution can be cooled by using any suitable methodology (e.g., a cooler, a heat exchanger, a cooling bath, an ice bath, a cooling element, etc.).

In an aspect, a method of detecting an amine-based additive (e.g., amine-based shale inhibitor; amine-based corrosion inhibitor) in a WSF can include comparing the absorption intensity of the detection solution at the wavelength within about ±20% of the at least one absorption peak wavelength ($\lambda_{max}$) with a target absorption intensity of the amine-based additive to determine the amount of amine-based additive in the WSF.

In an aspect, comparing the absorption intensity of the detection solution at the wavelength within about ±20% of the at least one absorption peak wavelength ($\lambda_{max}$) with a target absorption intensity of the amine-based additive (e.g., amine-based shale inhibitor; amine-based corrosion inhibitor) includes optically comparing the color and/or color intensity of the detection solution with a target color and/or color intensity, respectively. For purposes of the disclosure herein, the terms "optically comparing" and "optical comparison" refers to a comparison performed visually by a human subject (e.g., an operator) and/or a comparison performed by a machine, such as a computing device (e.g., computer, laptop, calculator, etc.) used in conjunction with (e.g., connected to, networked with, etc.) a spectrometer (e.g., UV-VIS spectrometer and/or colorimeter).

In an aspect, determining the amount of amine-based additive (e.g., amine-based shale inhibitor; amine-based corrosion inhibitor) in the WSF further includes visually comparing a visually observed color and/or color intensity of the detection solution with a reference color chart that correlates color and/or color intensity, respectively, with the amount of the amine-based additive. In an aspect, a reference color chart can be constructed for each amine detector compound, given that each amine detector compound might provide for a detection solution having a different color or a different color hue. For example, it is easier to visually compare a red color to a reference color chart that employs the same red color than it is to compare a red color to a reference color chart that employs a red color having an orange hue. A reference color chart can be constructed for a specific amine detector compound by preparing detection solutions having known concentrations of the amine-based additive, and recording the color corresponding to each concentration, for example by taking a picture of the detection solution, and noting the concentration of the amine-based additive that corresponds to the color and color intensity in the picture. The reference color chart can generally include two or more pictures relating the color and color intensity of the detection solution to corresponding known concentrations of the amine-based additive. As will be appreciated by one of skill in the art, and with the help of this disclosure, and without wishing to be limited by theory, the higher the concentration of the amine-based additive, the more intense (e.g., deeper) the color of the detection solution; and the lower the concentration of the amine-based additive, the less intense (e.g., paler) the color of the detection solution.

As will be appreciated by one of skill in the art, and with the help of this disclosure, when the color of the detection solution changes based on the type of amine-based additive (e.g., amine-based shale inhibitor; amine-based corrosion inhibitor) as well as the amine detector compound (e.g., some amine detector compounds may yield one color for primary amines, and a different color for secondary and/or tertiary amines), it may be necessary to create a reference color chart for a specific amine detector compound used in conjunction (e.g., paired) with a specific amine-based additive. Further, and as will be appreciated by one of skill in the art, and with the help of this disclosure, while as little as two concentrations (e.g., a low concentration and a high concentration) can be used for creating a reference color chart, using more than two, alternatively more than three, alternatively more than four, alternatively more than five, alternatively from three to about twenty, alternatively from about five to about fifteen, or alternatively from about five to about ten concentrations for creating a reference color chart can significantly improve the accuracy of determining the amount of amine-based additive in the WSF.

In some aspects, visually comparing the color and/or color intensity of the detection solution with the reference color chart can include matching the color and/or color intensity of the detection solution with the closest color and/or color intensity, respectively, on the reference color chart, wherein the closest color and/or color intensity determines the amount of the amine-based additive (e.g., amine-based shale inhibitor; amine-based corrosion inhibitor) in the WSF. In other aspects, visually comparing the color and/or color intensity of the detection solution with the reference color chart can include matching the color and/or color intensity of the detection solution with the closest two colors and/or color intensities, respectively, on the reference color chart, followed by estimating the amount of the amine-based additive in the WSF between the amounts corresponding to the closest two colors and/or color intensities, respectively.

In some aspects, the reference color chart can include images or pictures of detection solutions correlated with known concentrations of the amine-based additive (e.g., amine-based shale inhibitor; amine-based corrosion inhibitor) printed on an appropriate substrate, such as paper (e.g., paper reference color chart), cardboard (e.g., cardboard reference color chart), metal (e.g., metal reference color chart), plastic (e.g., plastic reference color chart), and the like, or combinations thereof. In other aspects, the reference color chart including images or pictures of detection solutions correlated with known concentrations of the amine-based additive can be displayed on an electronic screen, such as a computer monitor, a laptop monitor, a phone screen, and the like, or combinations thereof.

In an aspect, comparing the absorption intensity of the detection solution at the wavelength within about ±20% of the at least one absorption peak wavelength ($\lambda_{max}$) with a target absorption intensity of the amine-based additive (e.g., amine-based shale inhibitor; amine-based corrosion inhibitor) includes using a calibration curve that correlates absorption intensity at the wavelength within about ±20% of the at least one absorption peak wavelength ($\lambda_{max}$) with the amount of the amine-based additive (e.g., known amount of the amine-based additive).

In an aspect, a calibration curve can be constructed for each amine detector compound, given that each amine detector compound might provide for a detection solution having a different absorption peak wavelength ($\lambda_{max}$) (e.g., different color or a different color hue). A calibration curve can be constructed for a specific amine detector compound by preparing detection solutions having known concentrations of the amine-based additive (e.g., amine-based shale inhibitor; amine-based corrosion inhibitor); subjecting the detection solutions to spectroscopy (e.g., UV-VIS spectroscopy and/or colorimetry); and plotting the known concentrations of the amine-based additive as a function of the corresponding measured absorption intensity. As will be appreciated by one of skill in the art, and with the help of this disclosure, while the calibration curve can be constructed (e.g., drawn) with as little as two absorption intensity measurements corresponding to two different known concentrations of the amine-based additive, at least three absorption intensity measurements corresponding to three different known concentrations of the amine-based additive should be used for constructing the calibration curve, preferably as many absorption intensity measurements as it is deemed to be statistically significant for any particular case (e.g., any particular amine detector compound, any particular pair of amine detector compound and amine-based additive).

Further, without wishing to be limited by theory, and as will be appreciated by one of skill in the art, and with the help of this disclosure, a calibration curve is generally accompanied by a mathematical equation describing the calibration curve, and the mathematical equation can be used as well for translating the absorption intensity into the amount of amine-based additive (e.g., amine-based shale inhibitor; amine-based corrosion inhibitor) in the WSF, for example by entering into the equation the measured absorption intensity and calculating the corresponding amount of amine-based additive in the WSF.

Furthermore, as will be appreciated by one of skill in the art, and with the help of this disclosure, sometimes spectrometers (e.g., colorimeter, portable colorimeter, UV-VIS spectrometer, portable UV-VIS spectrometer) can display a systematic error or bias, and as such it may be desired to construct the calibration curve with the same spectrometer that is used for measuring the absorption intensity.

In an aspect, a method of detecting an amine-based additive (e.g., amine-based shale inhibitor; amine-based corrosion inhibitor) in a WSF as disclosed herein may be characterized by an enhanced stability of absorption intensity of the detection solution over time.

Generally, when measuring the absorbance intensity of a given solution (e.g., detection solution), if such absorbance intensity is measured substantially at the time of forming the solution ($t_0=0$ minutes), the absorbance at the time $t_0=0$ minutes can be referred to as "initial absorption intensity ($A_0$)." If the absorbance intensity ($A_t$) of the same solution (e.g., detection solution) is measured later, for example at a time t elapsed from the time to of forming the detection solution, the absorbance intensity may display a decay over time. Without wishing to be limited by theory, such absorbance intensity decay may be due to the lack of stability over time of the colored compound that is investigated (e.g., detected).

In an aspect, the presence of the POS in the detection solution may provide for enhanced stability of absorption intensity of the detection solution over time. The POS in the detection solution may stabilize the colored compound formed as a result of the interaction (e.g., chemical reaction) between the amine detector compound and the amine-based additive (e.g., amine-based shale inhibitor; amine-based corrosion inhibitor). Without wishing to be limited by theory, the POS in the detection solution may reduce the fading of the color of the detection solution by decreasing the fading kinetics of the colored test result. For example, using an amine detector reagent including the POS may provide for enhanced stability of absorption intensity of the detection solution over time. As another example, using an aqueous salt solution including a POS may provide for enhanced stability of absorption intensity of the detection solution over time. As yet another example, using both an amine detector reagent including the POS and an aqueous salt solution including a POS may provide for enhanced stability of absorption intensity of the detection solution over time. As will be appreciated by one of skill in the art, and with the help of this disclosure, the detection solution should be a relatively good solvent for the amine detector compound and the amine-based additive, as well as for the colored compound formed as a result of the interaction between the amine detector compound and the amine-based additive. Further, and as will be appreciated by one of skill in the art, and with the help of this disclosure, the colored compound formed as a result of the interaction between the amine detector compound and the amine-based additive may be less polar than the amine detector compound and/or the amine-based additive, and thus, the POS may provide for an enhanced solubility of the colored compound in the detection solution. Furthermore, and as will be appreciated by one of skill in the art, and with the help of this disclosure, and without wishing to be limited by theory, if it weren't for the enhanced solubility of the colored compound in the detection solution (e.g., owing to the POS), the color product could precipitate out (e.g., crash out) of the detection solution, thereby leading to a decreased observed absorption intensity.

In an aspect, the detection solution is characterized by an initial absorption intensity ($A_0$) of the detection solution at the wavelength within about ±20% of the at least one absorption peak wavelength; wherein $A_0$ is defined as the absorption intensity of the detection solution substantially at the time of forming the detection solution ($t_0=0$ minutes); wherein the absorption intensity ($A_t$) of the detection solution at the wavelength within about ±20% of the at least one absorption peak wavelength is measured at a time t elapsed from the time of forming the detection solution; and wherein $A_t$ is within +10%, alternatively within +5%, alternatively within +4%, alternatively within +3%, alternatively within +2%, or alternatively within +1% of $A_O$. In such aspect, the time t can be equal to or greater than about 0.5 minutes, alternatively equal to or greater than about 1 minute, alternatively equal to or greater than about 5 minutes, alternatively equal to or greater than about 10 minutes, alternatively equal to or greater than about 15 minutes, alternatively equal to or greater than about 30 minutes, alternatively equal to or greater than about 45 minutes, alternatively equal to or greater than about 60 minutes, alternatively equal to or greater than about 90 minutes, alternatively equal to or greater than about 2 hours, alternatively equal to or greater than about 4 hours, or alternatively equal to or greater than about 6 hours.

Generally, when preparing an amine detector solution (e.g., an amine detector reagent) from an amine detector compound and a solvent (e.g., a POS) for use in forming and measuring the absorbance intensity of a given solution (e.g., detection solution), the absorbance intensity of a solution formed with the amine detector solution substantially at the same time of preparing the amine detector solution can be referred to as "original absorption intensity" (as opposed to the absorption intensity of a solution formed with the amine detector solution at a time different than the time of preparing the amine detector solution (e.g., later time, subsequent to the time of preparing the amine detector solution)). In other words, when using a freshly prepared amine detector solution (e.g., freshly prepared amine detector reagent) to form a detection solution and measure its absorbance intensity, such absorption intensity may be referred to as "original absorption intensity." Further, if the original absorption intensity is measured substantially at the time of forming the solution by using a freshly prepared amine detector solution (e.g., freshly prepared amine detector reagent), such absorbance can be referred to as "initial original absorption intensity."

Furthermore, the presence of the POS in the amine detector reagent can provide the amine detector reagent with enhanced stability of the amine detector reagent over time, e.g., the POS can provide the amine detector reagent with a relatively increased shelf-life. As an amine detector solution (other than the amine detector reagent) ages with the time passing from the time when the amine detector solution is being prepared, the use of an aged detector solution to form a detection solution and measure its absorbance intensity may lead to recording an absorbance intensity that is lower than the original absorption intensity of an otherwise similar detection solution; wherein, and as will be appreciated by one of skill in the art, and with the help of this disclosure, such a decay in the absorbance intensity may be due to a portion of the amine detector compound degrading over time in the aging amine detector solution, which leads to a relatively short shelf life of the amine detector solution. By contrast, when the amine detector reagent ages with the time passing from the time when the amine detector reagent is being prepared, the use of an aged detector reagent to form a detection solution and measure its absorbance intensity may lead to recording an absorbance intensity that is substantially the same as the original absorption intensity of an otherwise similar detection solution; wherein the POS in the amine detector reagent provides for lowering the degradation rate of the amine detector compound in the amine detector reagent. In an aspect, an amine detector reagent including POS may be characterized by a shelf life that is greater than the shelf life of an otherwise similar amine detector solution that lacks the POS. For purposes of the disclosure herein, the shelf life of an amine detector solution (e.g., amine detector reagent) is defined as the time period over which the amine detector solution (e.g., amine detector reagent) can provide for forming a detection solution with an absorption intensity within ±10% of an original absorption intensity at a wavelength within about ±20% of the at least one absorption peak wavelength. As will be appreciated by one of skill in the art, and with the help of this disclosure, and without wishing to be limited by theory, the POS could potentially slow the rate of degradative processes of the amine detector compound, such as hydrolysis that can occur in solvents other than POS, such as aqueous-based solvents. Additionally, as will be appreciated by one of skill in the art, and with the help of this disclosure, and without wishing to be limited by theory, if the amine detector compound is susceptible to oxidative degradation, the lower level of dissolved oxygen in POS (as compared to solvents other than POS, such as aqueous-based solvents) can improve shelf life.

In an aspect, the amine detector reagent can be characterized by a shelf life of equal to or greater than about 7 days, alternatively equal to or greater than about 14 days, alternatively equal to or greater than about 21 days, alternatively equal to or greater than about 1 month, alternatively equal to or greater than about 1.5 months, alternatively equal to or greater than about 2 months, alternatively equal to or greater than about 4 months, alternatively equal to or greater than about 6 months, or alternatively equal to or greater than about 1 year; wherein the shelf life of the amine detector reagent is defined as the time period over which the amine detector reagent can provide for forming a detection solution with an absorption intensity within +10% of an original absorption intensity at a wavelength within about ±20% of the at least one absorption peak wavelength; and wherein the original absorption intensity is defined as the absorption intensity of an otherwise similar detection solution formed substantially at the same time of preparing the amine detector reagent.

In an aspect, a method of detecting an amine-based additive (e.g., amine-based shale inhibitor; amine-based corrosion inhibitor) in a WSF can include comparing the amount of amine-based additive in the WSF with a target amount of the amine-based additive.

In some aspects, the amount of amine-based additive (e.g., amine-based shale inhibitor; amine-based corrosion inhibitor) in the WSF can be about the same with the target amount of the amine-based additive. In such aspects, the WSF can be placed in the wellbore and/or subterranean formation where it may function as intended (e.g., prevent and/or reduce water uptake by water-reactive formations).

In other aspects, the amount of amine-based additive (e.g., amine-based shale inhibitor; amine-based corrosion inhibitor) in the WSF can be different (e.g., less, lower) than the target amount of the amine-based additive. In such aspects, the determined amount of amine-based additive in the WSF can indicate a variance between the actual amount of the amine-based additive in the WSF and the desired or target amount of the amine-based additive, wherein such variance can range from greater than about 0% (wherein very little amine-based additive has been depleted from the WSF, for example by being lost to the formation and/or by being) to about 100% (wherein substantially all of the amine-based additive has been depleted from the WSF, for example by being lost to the formation and/or by being retained as a protective film on metal surfaces).

In an aspect, the amount of amine-based additive (e.g., amine-based shale inhibitor; amine-based corrosion inhibitor) in the WSF can be lower than the target amount of the amine-based additive. For example, the amount of amine-based additive in the WSF can be equal to or greater than about 1%, alternatively equal to or greater than about 5%, alternatively equal to or greater than about 10%, alternatively equal to or greater than about 15%, alternatively equal to or greater than about 20%, alternatively equal to or greater than about 25%, alternatively equal to or greater than about 30%, alternatively equal to or greater than about 35%, alternatively equal to or greater than about 40%, alternatively equal to or greater than about 45%, alternatively equal to or greater than about 50%, alternatively equal to or greater than about 55%, alternatively equal to or greater than about 60%, alternatively equal to or greater than about 65%, alternatively equal to or greater than about 70%, alternatively equal to or greater than about 75%, alternatively equal to or greater than about 80%, alternatively equal to or greater than about 85%, alternatively equal to or greater than about 90%, alternatively equal to or greater than about 95%, alternatively equal to or greater than about 99%, or alternatively about 100% lower than the target amount of the amine-based additive. In some aspects, the amount of amine-based additive in the WSF can be greater than the target amount of the amine-based additive. For example, during a drilling operation, the WSF may encounter different formation layers that require different levels of inhibition (e.g., require different concentrations of amine-based shale inhibitor), and as such the WSF may have an amount of amine-based shale inhibitor that is greater than the amount required in a specific portion of the subterranean formation. As another example, during a drilling operation, the WSF may encounter different metal surfaces that require different concentrations of amine-based corrosion inhibitor, and as such the WSF may have an amount of amine-based corrosion inhibitor that is greater than the amount required in a specific portion of the subterranean formation. As will be appreciated by one of skill in the art, and with the help of this disclosure, the amount of amine-based additive (e.g., amine-based shale inhibitor; amine-based corrosion inhibitor) in the WSF may be increased over time, for example as a result of encountering more reactive formations.

In some aspects, the amount of amine-based additive (e.g., amine-based shale inhibitor; amine-based corrosion inhibitor) in the WSF can be less than the target amount of the amine-based additive by a threshold amount. For purposes of the disclosure herein, the threshold amount of amine-based additive is defined as the difference between the amount (e.g., actual amount, measured amount) of amine-based additive in the WSF and the target amount of the amine-based additive. Further, for purposes of the disclosure herein, the threshold amount of amine-based additive refers to the amount of amine-based additive that is "missing" from the WSF (e.g., the amount of amine-based additive that has been depleted from the WSF, for example by being lost to the formation) and which requires supplementation of amine-based additive into the WSF, in order to provide for a WSF having the target amount of the amine-based additive.

In aspects where the amount of amine-based additive (e.g., amine-based shale inhibitor; amine-based corrosion inhibitor) in the WSF is less than the target amount of the amine-based additive by an amount that is equal to or greater than a threshold amount, the WSF may require further processing prior to being used in a wellbore servicing operation (e.g., supplemental amine-based additive may be added to the WSF, in order to provide for a WSF having the target amount of the amine-based additive).

As will be appreciated by one of skill in the art, and with the help of this disclosure, the threshold amount of amine-based additive (e.g., amine-based shale inhibitor; amine-based corrosion inhibitor) that dictates whether a WSF requires addition of supplemental amine-based additive or not may depend on a variety of factors, such as the type of wellbore servicing operation, the composition of the WSF, the type and/or configuration of the wellbore, the type of subterranean formation, the subterranean formation conditions (e.g., temperature, pressure, etc.), and the like, or combinations thereof.

The threshold amount of amine-based additive (e.g., amine-based shale inhibitor; amine-based corrosion inhibitor) can be expressed as a percentage (%) of the target amount of the amine-based additive. For example, the threshold amount of amine-based additive can be equal to or greater than about 1%, alternatively equal to or greater than about 5%, alternatively equal to or greater than about 10%, alternatively equal to or greater than about 15%, alternatively equal to or greater than about 20%, alternatively equal to or greater than about 25%, alternatively equal to or greater than about 30%, alternatively equal to or greater than about 35%, alternatively equal to or greater than about 40%, alternatively equal to or greater than about 45%, alternatively equal to or greater than about 50%, alternatively equal to or greater than about 55%, alternatively equal to or greater than about 60%, alternatively equal to or greater than about 65%, alternatively equal to or greater than about 70%, alternatively equal to or greater than about 75%, alternatively equal to or greater than about 80%, alternatively equal to or greater than about 85%, alternatively equal to or greater than about 90%, alternatively equal to or greater than about 95%, alternatively equal to or greater than about 99%, or alternatively about 100% of the target amount of the amine-based additive.

In aspects where the amount of amine-based additive (e.g., amine-based shale inhibitor; amine-based corrosion inhibitor) in the WSF is less than the target amount of the amine-based additive by an amount that is lower than the threshold amount, the WSF may be used in a wellbore servicing operation without further processing (e.g., without adding supplemental amine-based additive to the WSF). For example, at least a portion of the WSF may be placed in the wellbore and/or subterranean formation where it may function as intended (e.g., prevent and/or reduce water uptake by water-reactive formations; prevent and/or reduce corrosion of metal surfaces).

In some aspects, the amount of amine-based additive (e.g., amine-based shale inhibitor; amine-based corrosion inhibitor) in the WSF can be greater than the target amount of the amine-based additive. In aspects where the amount of amine-based additive in the WSF is greater than the target amount of the amine-based additive, the WSF may be used in a wellbore servicing operation without further processing (e.g., without adjusting the amount of amine-based additive in the WSF). As will be appreciated by one of skill in the art, and with the help of this disclosure, the amount of amine-based additive in the WSF may become greater than the target amount of the amine-based additive owing to evaporation of water from the WSF, overtreatment of amine-based additive in the WSF (e.g., adding excess amine-based additive to the WSF), and the like, or combinations thereof.

In aspects where the amount of amine-based additive (e.g., amine-based shale inhibitor; amine-based corrosion inhibitor) in the WSF is less than about 1%, alternatively less than about 5%, alternatively less than about 10%, alternatively less than about 15%, alternatively less than about 20%, or alternatively less than about 25% lower than the target amount of the amine-based additive, the WSF may be used in a wellbore servicing operation without further processing (e.g., without adding supplemental amine-based additive to the WSF). As will be appreciated by one of skill in the art, and with the help of tis disclosure, when the amount of amine-based additive in the WSF varies by a relatively small amount (e.g., less than about 1%, alternatively less than about 5%, alternatively less than about 10%) from the target amount of the amine-based additive, at least a portion of such variance can be owed to experimental error factors, such as operator error, measuring errors, temperature variation, experimental noise, and the like, or combinations thereof, and in such cases it may not be necessary to adjust the amount of amine-based additive in the WSF.

In an aspect, a method of servicing a wellbore in a subterranean formation can include adjusting the amount of amine-based additive (e.g., amine-based shale inhibitor; amine-based corrosion inhibitor) in the WSF to provide for a WSF (e.g., an adjusted WSF, a corrected WSF, a supplemented WSF) having the target amount of the amine-based additive.

In aspects where the amount of amine-based amine-based additive (e.g., amine-based shale inhibitor; amine-based corrosion inhibitor) in the WSF varies by equal to or greater than the threshold amount from the target amount of the amine-based additive, the WSF can be contacted with an effective amount of supplemental amine-based additive to provide for the WSF having the target amount of the amine-based additive.

In an aspect, the effective amount of supplemental amine-based additive can be determined on-the-fly (e.g., in real-time); wherein the WSF having the target amount of the amine-based additive can be prepared on-location (e.g., on-site; at a wellbore site), by adding the effective amount of supplemental amine-based additive to the WSF. For purposes of the disclosure herein, the terms "on-the-fly" and "real-time" can be used interchangeably and collectively refer to an action that is performed during an ongoing wellbore servicing operation; wherein performing such action can result in changes to an ongoing wellbore servicing operation on a time scale of less than about 30 minutes, alternatively less than about 15 minutes, alternatively less than about 10 minutes, alternatively less than about 5 minutes, alternatively less than about 1 minute, alternatively less than about 30 seconds, alternatively less than about 15 seconds, alternatively less than about 10 seconds, alternatively less than about 5 seconds, or alternatively less than about 1 second.

For purposes of the disclosure herein, the term "real-time" refers to an action that is performed on a time scale that allows for feedback (e.g., real-time feedback) to an ongoing wellbore servicing operation, wherein the feedback affects the ongoing wellbore servicing operation. For example, real-time data, such as the measured (i.e., actual) amount of amine-based additive (e.g., amine-based shale inhibitor; amine-based corrosion inhibitor) in the WSF, can be provided about instantly (e.g., as soon as it is obtained) to a decision factor (e.g., an operator, a computing device), wherein the decision factor can decide or determine whether it is necessary to add supplemental amine-based additive to the WSF or not, on a time scale (i.e., about instantly, in real-time) that can affect the ongoing wellbore servicing operation. In some aspects, the computing device can be interfaced or networked with a spectrometer (e.g., colorimeter, portable colorimeter, UV-VIS spectrometer, portable UV-VIS spectrometer). In an aspect, the amount of amine-based additive present in a WSF can be tested on-the-fly during a wellbore servicing operation, and the WSF can be supplemented in real-time such that the wellbore servicing operation does not have to be halted, and thus costly unproductive time can be avoided or minimized.

As will be appreciated by one of skill in the art, and with the help of this disclosure, employing visual detection and/or spectroscopic detection with a portable spectrometer (e.g., portable colorimeter and/or portable UV-VIS spectrometer) of the absorption intensity for the detection solution can generally result in obtaining data regarding the amount of amine-based additive (e.g., amine-based shale inhibitor; amine-based corrosion inhibitor) in the WSF in real-time (as opposed to introducing a delay which may be significant by sending a WSF sample to be analyzed in a laboratory setting).

In an aspect, the effective amount of supplemental amine-based additive (e.g., amine-based shale inhibitor; amine-based corrosion inhibitor) can be determined in real-time; wherein the WSF having the target amount of the amine-based additive can be prepared in real-time, by adding the effective amount of supplemental amine-based additive to the WSF; and wherein the WSF having the target amount of the amine-based additive may be placed in the wellbore and/or subterranean formation where it may function as intended (e.g., prevent and/or reduce water uptake by water-reactive formations).

In an aspect, a method of servicing a wellbore in a subterranean formation can include (a) preparing a drilling fluid including a base fluid and an amine-based additive (e.g., amine-based shale inhibitor; amine-based corrosion inhibitor), wherein the amine-based additive is present in the drilling fluid in a target amount; (b) circulating the drilling fluid in the wellbore and/or subterranean formation to yield a circulated drilling fluid; (c) subjecting at least a portion of the circulated drilling fluid to solids removal to yield a substantially solids-free circulated drilling fluid; (d) contacting an aliquot of the solids-free circulated drilling fluid with an amine detector compound to form a detection solution; wherein the detection solution is characterized by at least one absorption peak wavelength ($\lambda_{max}$) in the range of from about 380 nm to about 760 nm; (e) detecting an absorption intensity for the detection solution at a wavelength within about ±20% of the at least one absorption peak wavelength; (f) comparing the absorption intensity of the detection solution at the wavelength within about ±20% of the at least one absorption peak wavelength with a target absorption intensity of the amine-based additive to determine the amount of amine-based additive in the circulated drilling fluid; (g) comparing the amount of amine-based additive in the circulated drilling fluid with the target amount of the amine-based additive, wherein the amount of amine-based additive in the circulated drilling fluid varies by equal to or greater than a threshold amount from the target amount of the amine-based additive; (h) responsive to (g), determining an amount of supplemental amine-based additive effective to provide for the circulated drilling fluid having the target amount of the amine-based additive, and contacting the circulated drilling fluid with the effective amount of supplemental amine-based additive on-the-fly; and (i) recycling at least a portion of the circulated drilling fluid to the wellbore and/or subterranean formation. In such aspect, the absorption intensity for the detection solution can be detected visually (e.g., visual detection) and/or with a spectrometer, such as a colorimeter, portable colorimeter, UV-VIS spectrometer, portable UV-VIS spectrometer, etc. (e.g., spectroscopic detection).

In an aspect, a method of servicing a wellbore in a subterranean formation can include (a) preparing a drilling fluid including a base fluid and an amine-based additive (e.g., amine-based shale inhibitor; amine-based corrosion inhibitor), wherein the amine-based additive is present in the drilling fluid in a target amount; (b) circulating the drilling fluid in the wellbore and/or subterranean formation to yield a circulated drilling fluid; (c) subjecting at least a portion of the circulated drilling fluid to solids removal to yield a substantially solids-free circulated drilling fluid; (d) contacting an aliquot of the solids-free circulated drilling fluid with ninhydrin to form a detection solution; wherein the detection solution is characterized by a first absorption peak wavelength (first $\lambda_{max}$) of about 400 nanometers (nm) and by a second absorption peak wavelength (second $\lambda_{max}$) of about 570 nm; and wherein the ninhydrin is contacted with the aliquot of the solids-free circulated drilling fluid in an amount of from about 1 mmol/liter to about 50 mmol/liter ninhydrin, based on the total volume of the detection solution; (e) detecting an absorption intensity for the detection solution at a wavelength within about ±20% of the first absorption peak wavelength and/or the second absorption peak wavelength; (f) comparing the absorption intensity of the detection solution at the wavelength within about ±20% of the first absorption peak wavelength and/or the second absorption peak wavelength with a target absorption intensity at the wavelength within about ±20% of the first absorption peak wavelength and/or the second absorption peak wavelength, respectively of the amine-based additive to determine the amount of amine-based additive in the circulated drilling fluid; (g) comparing the amount of amine-based additive in the circulated drilling fluid with the target amount of the amine-based additive, wherein the amount of amine-based additive in the circulated drilling fluid varies by equal to or greater than a threshold amount from the target amount of the amine-based additive; (h) responsive to (g), determining an amount of supplemental amine-based additive effective to provide for the circulated drilling fluid having the target amount of the amine-based additive, and contacting the circulated drilling fluid with the effective amount of supplemental amine-based additive in real-time; and (i) recycling at least a portion of the circulated drilling fluid to the wellbore and/or subterranean formation. In such aspect, the absorption intensity for the detection solution can be detected visually (e.g., visual detection) and/or with a spectrometer, such as a colorimeter, portable colorimeter, UV-VIS spectrometer, portable UV-VIS spectrometer, etc. (e.g., spectroscopic detection). In aspects where the absorption intensity for the detection solution is detected visually, the color of the detection solution can be purple. In aspects where the absorption intensity for the detection solution is detected spectroscopically, the detection solution can be subjected to ultraviolet-visible (UV-VIS) spectroscopy and/or colorimetry in a portable UV-VIS spectrometer and/or a portable colorimeter, respectively.

In an aspect, a method of servicing a wellbore in a subterranean formation can include (a) preparing a drilling fluid including a base fluid and an amine-based additive (e.g., amine-based shale inhibitor; amine-based corrosion inhibitor), wherein the amine-based additive is present in the drilling fluid in a target amount; (b) circulating the drilling fluid in the wellbore and/or subterranean formation to yield a circulated drilling fluid; (c) subjecting at least a portion of the circulated drilling fluid to solids removal to yield a substantially solids-free circulated drilling fluid; (d) contacting an aliquot of the solids-free circulated drilling fluid with an amine detector compound and an aqueous salt solution to form a detection solution; wherein the aqueous salt solution includes an inorganic salt and an organic carboxylate salt; wherein the WSF includes the amine-based additive; and wherein the detection solution is characterized by at least one absorption peak wavelength in the range of from about 380 nanometers (nm) to about 760 nm; (e) detecting an absorption intensity for the detection solution at a wavelength within about ±20% of the at least one absorption peak wavelength; (f) comparing the absorption intensity of the detection solution at the wavelength within about ±20% of the at least one absorption peak wavelength with a target absorption intensity of the amine-based additive to determine the amount of amine-based additive in the circulated drilling fluid; (g) comparing the amount of amine-based additive in the circulated drilling fluid with the target amount of the amine-based additive; (h) responsive to (g), determining an amount of supplemental amine-based additive effective to provide for the circulated drilling fluid having the target amount of the amine-based additive, and contacting the circulated drilling fluid with the effective amount of supplemental amine-based additive in real-time; and (i) recycling at least a portion of the circulated drilling fluid to the wellbore and/or subterranean formation. In such aspect, the aqueous salt solution can further include a POS; wherein the POS is characterized by a boiling point at ambient pressure of equal to or greater than about 105° C.; and wherein the POS is characterized by a flash point at ambient pressure of equal to or greater than about 105° C.

In an aspect, method of decreasing spectral variations in a WSF can include (a) providing an aliquot of a first WSF and an aliquot of a second WSF; wherein the first WSF and the second WSF include the same amine-based additive (e.g., amine-based shale inhibitor; amine-based corrosion inhibitor); wherein the first WSF and the second WSF include substantially the same amount of the amine-based additive; and wherein the first WSF and the second WSF are characterized by different pH and/or salinity when compared to each other; (b) decreasing spectral variations inducible by WSF components by contacting an aqueous salt solution with (i) the aliquot of the first WSF and an amine detector compound to form a first detection solution, and (ii) the aliquot of the second WSF and the amine detector compound to form a second detection solution; wherein the aqueous salt solution includes an inorganic salt and an organic carboxylate salt; and wherein each of the first detection solution and the second detection solution is independently characterized by at least one absorption peak wavelength in the range of from about 380 nanometers (nm) to about 760 nm; (c) detecting a first absorption intensity for the first detection solution and a second absorption intensity for the second detection solution at a wavelength within about ±20% of the at least one absorption peak wavelength; wherein the first absorption intensity is within +10% of the second absorption intensity; and (d) comparing the first absorption intensity and the second absorption intensity with a target absorption intensity of the amine-based additive to determine a first amount of amine-based additive in the first WSF and a second amount of amine-based additive in the second WSF, respectively. In aspects where the determined first amount of amine-based additive in the first WSF and/or the determined second amount of amine-based additive in the second WSF varies by equal to or greater than a threshold amount from the target amount of the amine-based additive; the first WSF and/or the second WSF, respectively, can be contacted with an effective amount of supplemental amine-based additive to provide for a corrected first WSF and/or a corrected second WSF, respectively, having the target amount of the amine-based additive. In such aspects, the method can further include (1) determining the effective amount of supplemental amine-based additive; (2) preparing the corrected first WSF and/or the corrected second WSF, respectively, having the target amount of the amine-based additive on-the-fly; and (3) placing at least a portion of the corrected first WSF and/or at least a portion of the corrected second WSF, respectively, having the target amount of the amine-based additive in a wellbore and/or subterranean formation. The aqueous salt solution can further include a POS; wherein the POS is characterized by a boiling point at ambient pressure of equal to or greater than about 105° C.; and wherein the POS is characterized by a flash point at ambient pressure of equal to or greater than about 105° C.

In an aspect, a method of servicing a wellbore in a subterranean formation can include (a) preparing a drilling fluid including a base fluid and an amine-based additive (e.g., amine-based shale inhibitor; amine-based corrosion inhibitor), wherein the amine-based additive is present in the drilling fluid in a target amount; (b) circulating the drilling fluid in the wellbore and/or subterranean formation to yield a circulated drilling fluid; (c) subjecting at least a portion of the circulated drilling fluid to solids removal to yield a substantially solids-free circulated drilling fluid; (d) contacting an aliquot of the solids-free circulated drilling fluid with an amine detector reagent and an aqueous salt solution to form a detection solution; wherein the amine detector reagent includes an amine detector compound and a POS; wherein the POS is characterized by a boiling point at ambient pressure of equal to or greater than about 105° C.; wherein the POS is characterized by a flash point at ambient pressure of equal to or greater than about 105° C.; wherein the aqueous salt solution includes an inorganic salt and an organic carboxylate salt; wherein the WSF includes the amine-based additive; and wherein the detection solution is characterized by at least one absorption peak wavelength in the range of from about 380 nanometers (nm) to about 760 nm; (e) detecting an absorption intensity for the detection solution at a wavelength within about ±20% of the at least one absorption peak wavelength; (f) comparing the absorption intensity of the detection solution at the wavelength within about ±20% of the at least one absorption peak wavelength with a target absorption intensity of the amine-based additive to determine the amount of amine-based additive in the circulated drilling fluid; (g) comparing the amount of amine-based additive in the circulated drilling fluid with the target amount of the amine-based additive; (h) responsive to (g), determining an amount of supplemental amine-based additive effective to provide for the circulated drilling fluid having the target amount of the amine-based additive, and contacting the circulated drilling fluid with the effective amount of supplemental amine-based additive in real-time; and (i) recycling at least a portion of the circulated drilling fluid to the wellbore and/or subterranean formation. In such aspect, the aqueous salt solution can further include a POS, wherein the POS in the amine detector reagent and the POS in the aqueous salt solution can be the same or different. In such aspect, the amine detector reagent can include a liquid ninhydrin reagent including ninhydrin and a polyethylene glycol as disclosed herein; wherein the liquid ninhydrin reagent may be characterized by a shelf life of equal to or greater than about 1 month; wherein the shelf life of the liquid ninhydrin reagent is defined as the time period over which the liquid ninhydrin reagent can provide for forming a detection solution with an absorption intensity within +10% of an original absorption intensity at a wavelength within about ±20% of the at least one absorption peak wavelength; and wherein the original absorption intensity is defined as the absorption intensity of an otherwise similar detection solution formed substantially at the same time of preparing the liquid ninhydrin reagent.

In an aspect, a method of decreasing spectral variations in a WSF can include (a) providing an aliquot of a WSF; wherein the WSF includes an amine-based additive (e.g., amine-based shale inhibitor; amine-based corrosion inhibitor); (b) decreasing spectral variations inducible by WSF components and/or caused by intensity decay over time by contacting the aliquot of the WSF with an aqueous salt solution and an amine detector reagent to form a detection solution; wherein the amine detector reagent includes an amine detector compound and a POS; wherein the POS is characterized by a boiling point at ambient pressure of equal to or greater than about 105° C.; wherein the POS is characterized by a flash point at ambient pressure of equal to or greater than about 105° C.; wherein the aqueous salt solution includes an inorganic salt and an organic carboxylate salt; and wherein the detection solution is characterized by at least one absorption peak wavelength in the range of from about 380 nanometers (nm) to about 760 nm; (c) detecting an absorption intensity for the detection solution at a wavelength within about ±20% of the at least one absorption peak wavelength; wherein the POS provides for decreasing absorption intensity variations caused by intensity decay over time; wherein the aqueous salt solution provides for decreasing absorption intensity variations between different WSFs that contain substantially the same amount of the amine-based additive; and wherein the different WSFs are characterized by different pH and/or salinity when compared to each other; and (d) comparing the amount of amine-based additive in the WSF with a target amount of the amine-based additive. In such aspect, the amine detector reagent can include a liquid ninhydrin reagent including ninhydrin and a polyethylene glycol as disclosed herein. In aspects where the determined amount of amine-based additive in the WSF varies by equal to or greater than a threshold amount from the target amount of the amine-based additive; the WSF may be contacted with an effective amount of supplemental amine-based additive to provide for a corrected WSF having the target amount of the amine-based additive. In an aspect, the method can further include (1) determining the effective amount of supplemental amine-based additive; (2) preparing the corrected WSF having the target amount of the amine-based additive on-the-fly; and (3) placing at least a portion of the corrected WSF having the target amount of the amine-based additive in a wellbore and/or subterranean formation.

In an aspect, a test system for the detection of an amine-based additive in a WSF can include (a) the WSF, wherein the WSF includes the amine-based additive; and (b) a test kit including (i) an aqueous salt solution; wherein the aqueous salt solution includes an inorganic salt and an organic carboxylate salt; wherein each of the inorganic salt and the organic carboxylate salt is independently present in the aqueous salt solution in an amount of from about 0.1 wt. % to less than about a saturation concentration of the respective salt in the aqueous salt solution, based on the total weight of the aqueous salt solution; and (ii) an amine detector compound; wherein the amine detector compound is configured to interact with the amine-based additive in the WSF and produce at least one absorption peak wavelength in the range of from about 380 nanometers (nm) to about 760 nm. In such aspect, the interaction of the amine detector compound with the amine-based additive in the WSF can provide for a visible color, wherein the test kit can further include a reference color chart configured to provide for the visual correlation of color and/or color intensity of the visible color with the amount of the amine-based additive in the WSF. In such aspect, the aqueous salt solution can further include a POS; wherein the POS is characterized by a boiling point at ambient pressure of equal to or greater than about 105° C.; wherein the POS is characterized by a flash point at ambient pressure of equal to or greater than about 105° C.; and wherein the POS is present in the aqueous salt solution in an amount of from about 1 wt. % to about 50 wt. %, based on the total weight of the aqueous salt solution. The test system can further include (1) a portable UV-VIS spectrometer and/or a portable colorimeter configured to detect an absorption intensity resulting from the interaction of the amine detector compound with the amine-based additive in the WSF, wherein the absorption intensity is detected at a wavelength within about ±20% of the at least one absorption peak wavelength; and (2) a calibration curve configured to provide for correlating the absorption intensity detected at a wavelength within about ±20% of the at least one absorption peak wavelength with the amount of the amine-based additive in the WSF. In such aspect, the WSF can be a drilling fluid, wherein the amine-based additive includes an amine-based shale inhibitor and/or an amine-based corrosion inhibitor.

In an aspect, a test system for the detection of an amine-based additive in a WSF can include (a) the WSF, wherein the WSF includes the amine-based additive; and (b) a test kit including (i) an amine detector reagent; wherein the amine detector reagent includes an amine detector compound and a POS; wherein the amine detector compound is present in the amine detector reagent in an amount of from about 1 mmol/liter to about 1 mol/liter, based on the total volume of the amine detector reagent; wherein the POS is characterized by a boiling point at ambient pressure of equal to or greater than about 105° C.; wherein the POS is characterized by a flash point at ambient pressure of equal to or greater than about 105° C.; wherein the amine detector compound is configured to interact with an amine-based additive in a WSF and produce at least one absorption peak wavelength in the range of from about 380 nanometers (nm) to about 760 nm; and wherein the amine detector reagent is configured to be contacted with the WSF at a volumetric ratio of amine detector reagent to WSF of from about 50:1 to about 1:5; and (ii) an aqueous salt solution; wherein the aqueous salt solution includes an inorganic salt, an organic carboxylate salt, and optionally a POS; wherein each of the inorganic salt and the organic carboxylate salt is independently present in the aqueous salt solution in an amount of from about 0.1 wt. % to less than about a saturation concentration of the respective salt in the aqueous salt solution, based on the total weight of the aqueous salt solution; wherein the POS in the amine detector reagent and the POS in the aqueous salt solution can be the same or different; and wherein the aqueous salt solution is configured to be contacted with the WSF at a volumetric ratio of aqueous salt solution to WSF of from about 500:1 to about 5:1. The test kit may either include (1) the amine detector reagent; or (2) the components of the amine detector reagent (e.g., amine detector compound, for example pre-measured or pre-weighed; POS, for example a pre-measured volume), wherein the components of the amine detector reagent may be combined to form the amine detector reagent at the location where it is intended to use the amine detector reagent, such as a well site. In such aspect, the interaction of the amine detector compound with the amine-based additive in the WSF provides for a visible color, wherein the test kit further includes a reference color chart configured to provide for the visual correlation of color and/or color intensity of the visible color with the amount of the amine-based additive in the WSF. In such aspect, the amine detector reagent can include a liquid ninhydrin reagent including ninhydrin and a polyethylene glycol as disclosed herein; wherein the liquid ninhydrin reagent may be characterized by a shelf life of equal to or greater than about 1 month; wherein the shelf life of the liquid ninhydrin reagent is defined as the time period over which the liquid ninhydrin reagent can provide for forming a detection solution with an absorption intensity within +10% of an original absorption intensity at a wavelength within about ±20% of the at least one absorption peak wavelength; and wherein the original absorption intensity is defined as the absorption intensity of an otherwise similar detection solution formed substantially at the same time of preparing the liquid ninhydrin reagent. The test system can further include (1) a portable UV-VIS spectrometer and/or a portable colorimeter configured to detect an absorption intensity resulting from the interaction of the amine detector compound with the amine-based additive in the WSF, wherein the absorption intensity is detected at a wavelength within about ±20% of the at least one absorption peak wavelength; and (2) a calibration curve configured to provide for correlating the absorption intensity detected at the wavelength within about ±20% of the at least one absorption peak wavelength with the amount of the amine-based additive in the WSF. In such aspect, the WSF can be a drilling fluid, wherein the amine-based additive includes an amine-based shale inhibitor and/or an amine-based corrosion inhibitor.

In an aspect, the method of servicing a wellbore in a subterranean formation including detecting an amine-based additive (e.g., an amine-based shale inhibitor and/or an amine-based corrosion inhibitor) in a WSF as disclosed herein may display advantages when compared with conventional methods of servicing a wellbore in a subterranean formation.

In an aspect, the method of detecting an amine-based shale inhibitor in a WSF as disclosed herein may advantageously provide for acquiring real-time data regarding the inhibitory properties of a WSF (e.g., a drilling fluid) with respect to shale formations; which in turn can result in real-time feedback that can allow for correcting the amount of amine-based shale inhibitor in the WSF. Having the ability to adjust in real-time the amount of amine-based shale inhibitor in the WSF can advantageously reduce the incidence of non-productive time.

In an aspect, the method of detecting an amine-based shale inhibitor in a WSF as disclosed herein may advantageously provide for effectively preventing and/or reducing water uptake by water-reactive formations, which in turn can decrease the risk and/or incidence of adverse events, such as viscosity build-up, bit balling, wellbore caving, wellbore ballooning, subterranean formation integrity loss, collapse of subterranean formation, etc.

In an aspect, the method of detecting an amine-based additive (e.g., an amine-based shale inhibitor and/or an amine-based corrosion inhibitor) in a WSF as disclosed herein may advantageously employ an aqueous salt solution, wherein the aqueous salt solution can provide for minimizing chemical interferences of WSF components (other than the amine-based additives), such as chemical interferences induced by salts, alkalinity agents, acidifying agents, etc., in the WSF. Further, the use of the aqueous salt solution as disclosed herein can advantageously provide for an increased accuracy in determining the concentration of the amine-based additives in the WSF, thereby providing for accurately controlling the concentration of the amine-based additives in the WSF and thus reducing the incidence of non-productive time.

In an aspect, the method of detecting an amine-based additive (e.g., an amine-based shale inhibitor and/or an amine-based corrosion inhibitor) in a WSF as disclosed herein may advantageously employ an amine detector reagent, wherein the amine detector reagent can provide for (1) red-shifting the generated color of the detection solution to correct for interfering additives that may cause a blue shift; (2) accelerating reactivity (and thus reducing the test time) of certain amines; (3) stabilizing the final product (i.e., dramatically reducing the fading kinetics of the colored test result); or (4) any combinations of (1)-(3).

In an aspect, the method of detecting an amine-based shale inhibitor and/or an amine-based corrosion inhibitor in a WSF as disclosed herein may advantageously provide for a more cost effective wellbore servicing operation. As will be appreciated by one of skill in the art, and with the help of this disclosure, adding a shale inhibitor and/or a corrosion inhibitor to a WSF increases the cost. The ability to accurately determine the concentration of amine-based shale inhibitor and/or an amine-based corrosion inhibitor in the WSF could advantageously prevent undue additions of shale inhibitor and/or corrosion inhibitor, respectively to the WSF, thereby lowering the cost. Additional advantages of the method of servicing a wellbore in a subterranean formation including detecting an amine-based additive (e.g., amine-based shale inhibitor; amine-based corrosion inhibitor) in a WSF as disclosed herein may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Figure 2:
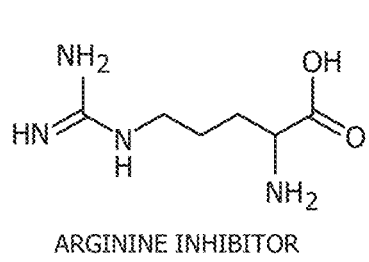
FIG. 2 displays pictures of arginine solutions before and after reaction with ninhydrin.
Figure 2:
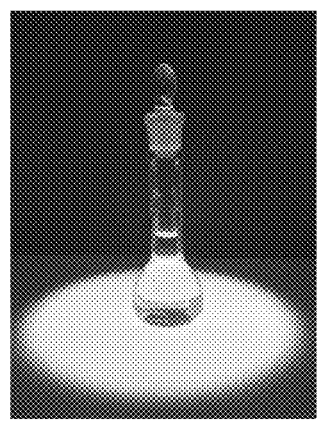
Figure 2:
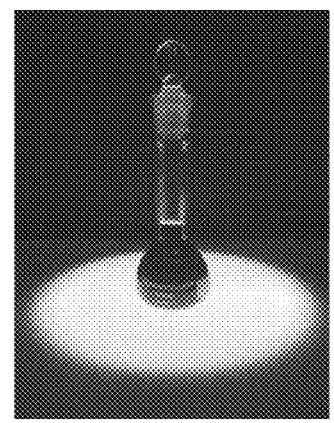

The detection of an amine-based shale inhibitor with ninhydrin was investigated. More specifically, the reaction between arginine and ninhydrin was investigated, as follows. 30 mg of arginine were added to 20 mL of deionized water, which resulted in a clear solution, as shown in FIG. 2 (center). Arginine is an amino acid having both primary and secondary amine groups, as shown in FIG. 2 (chemical structure on the left). 60 mg ninhydrin were added to the arginine solution, the resulting mixture was heated at 100° C. for 20 minutes, and the solution turned purple indicating a positive reaction, as shown in FIG. 2 (right).

Example 2

The detection of an amine-based shale inhibitor with ninhydrin was investigated. More specifically, the reaction between CLAYSEAL PLUS shale stabilizer and ninhydrin was investigated, as follows.

Figure 3:
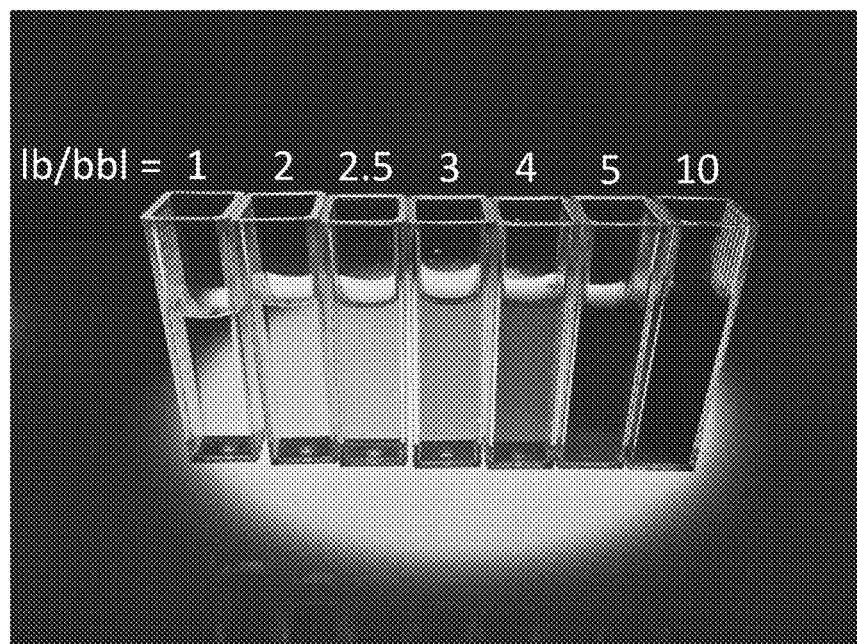
FIG. 3 displays pictures of amine-based shale inhibitor solutions of varying concentrations subsequent to reacting with ninhydrin.
Figure 4:
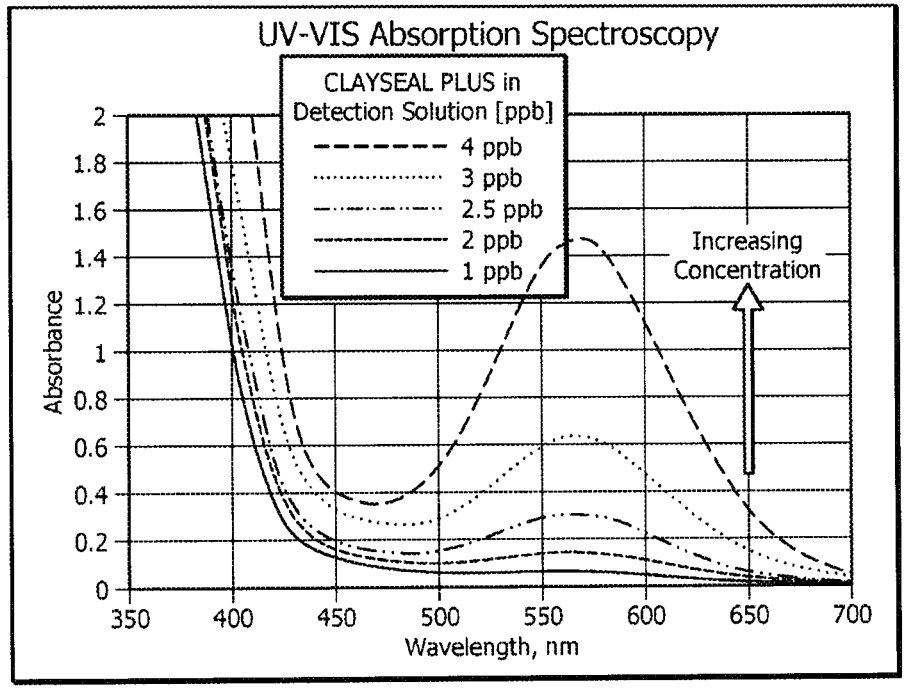
FIG. 4 displays a graph of absorbance intensity versus wavelength for amine-based shale inhibitor solutions of varying concentrations subsequent to reacting with ninhydrin.
Figure 5:
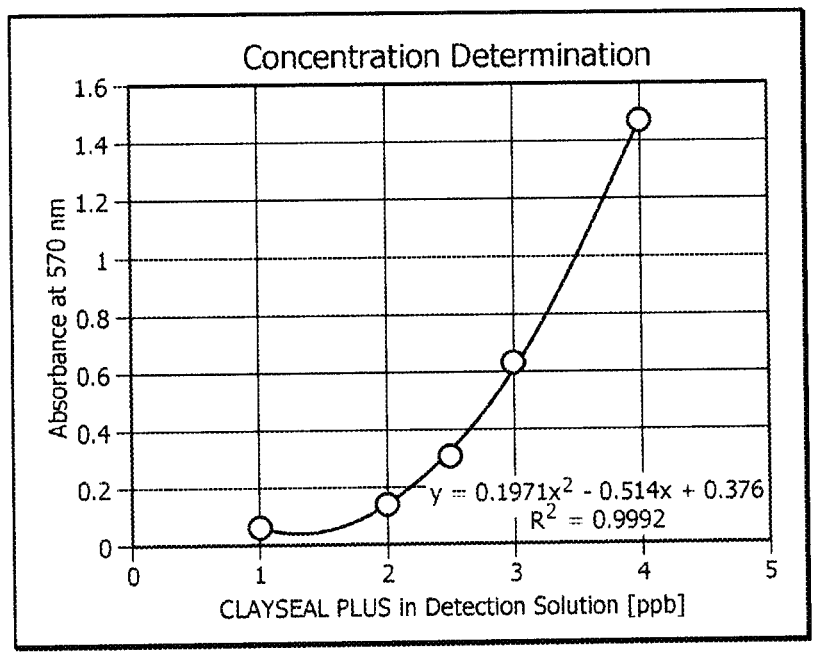
FIG. 5 displays a calibration curve graph correlating absorbance intensity to the concentration of amine-based shale inhibitor solutions.

CLAYSEAL PLUS shale stabilizer was dissolved in water at predetermined concentrations (1 lb/bbl, 2 lb/bbl, 2.5 lb/bbl, 3 lb/bbl, 4 lb/bbl, 5 lb/bbl and 10 lb/bbl). 10 mL of each solution was treated with 50 mg ninhydrin, and the solutions were heated to 95° C. for 45 minutes. The reaction mixtures developed a purple color, wherein the reaction mixtures with the highest concentrations of CLAYSEAL PLUS shale stabilizer developed the darkest color, as it can be seen in FIG. 3. Subsequently, each purple reaction mixture was analyzed by UV-VIS absorption spectroscopy. The UV-VIS absorption spectra revealed that these solutions (e.g., purple solutions) absorb strongly at 570 nm, as it can be seen in FIG. 4. The maximum absorption at 570 nm for each solution was then plotted as a function of the CLAYSEAL PLUS shale stabilizer concentration and the data are displayed in FIG. 5. There is a clear correlation between absorbance at 570 nm and the CLAYSEAL PLUS shale stabilizer concentration. The solutions with 5 lb/bbl and 10 lb/bbl maxed out the absorbance value of the spectrometer, and therefore are not plotted in FIG. 4 or 5.

Example 3

The detection of an amine-based shale inhibitor in a drilling fluid was investigated. More specifically, the detection with ninhydrin of CLAYSEAL PLUS shale stabilizer in drilling fluids was investigated, as follows. A series of drilling fluids were prepared according to Table 5 to include CLAYSEAL PLUS shale stabilizer in varying amounts.

TABLE 5

| Mud Formulation | | | | | | |
|---|---|---|---|---|---|---|
| Water, mL | 276.5 | 276.5 | 276.5 | 276.5 | 276.5 | 276.5 |
| Salt, g | 89.75 | 89.75 | 89.75 | 89.75 | 89.75 | 89.75 |
| Alkalinity Agent, g | 1 | 1 | 1 | 1 | 1 | 1 |
| Biopolymer, g | 8.25 | 8.25 | 8.25 | 8.25 | 8.25 | 8.25 |
| Fluid Loss Additive, g | 6 | 6 | 6 | 6 | 6 | 6 |
| CLAYSEAL PLUS shale stabilizer, g | 0 | 3 | 4 | 5 | 6 | 7 |
| Barite, g | 60 | 60 | 60 | 60 | 60 | 60 |

Figure 6:
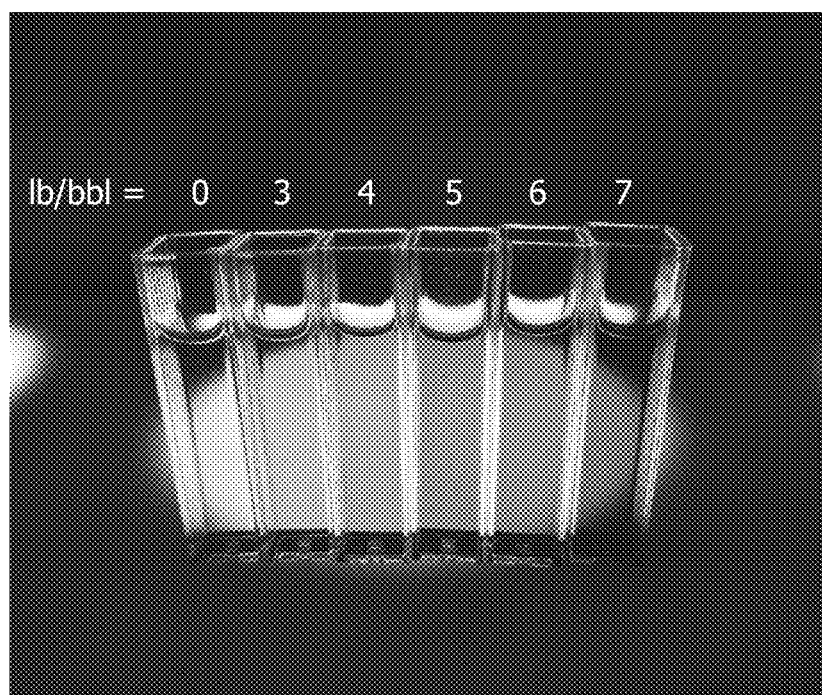
FIG. 6 displays pictures of other amine-based shale inhibitor solutions of varying concentrations subsequent to reacting with ninhydrin.
Figure 7:
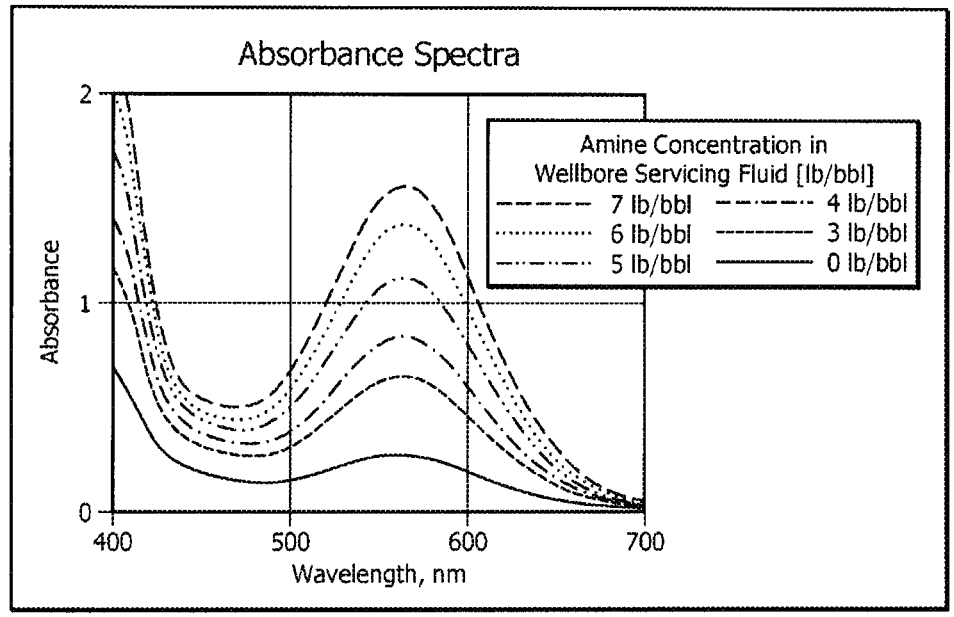
FIG. 7 displays another graph of absorbance intensity versus wavelength for amine-based shale inhibitor solutions of varying concentrations subsequent to reacting with ninhydrin.
Figure 8:
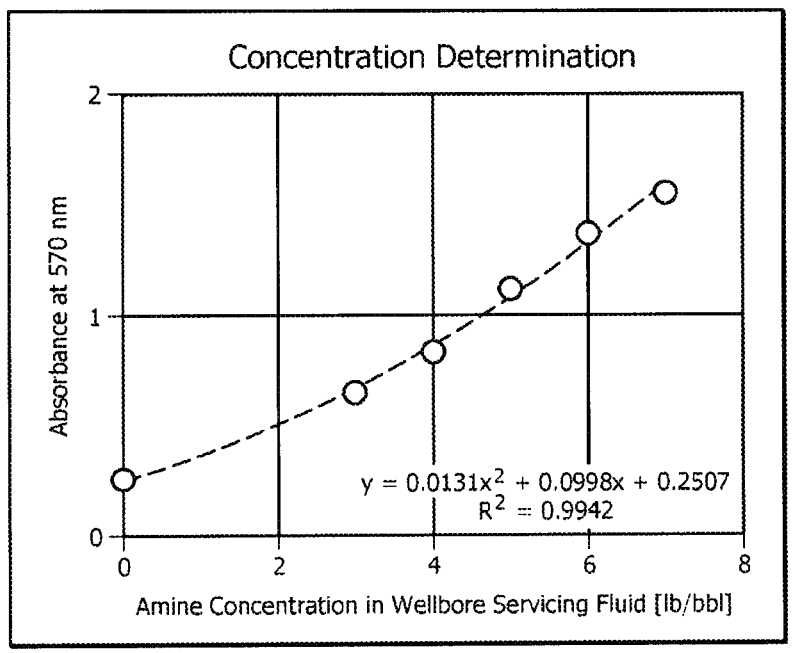
FIG. 8 displays another calibration curve graph correlating absorbance intensity to the concentration of amine-based shale inhibitor solutions.

A control drilling fluid was also prepared with no CLAYSEAL PLUS shale stabilizer (0 lb) as well. The drilling fluids were prepared and filtered through a standard API fluid loss cell. To perform the amine detection method for these drilling fluids, 13 mL of water was added to a 50 mL flask. To this flask 50 mg of ninhydrin were added. This mixture was then placed on a pre-heated stir plate and stirred for five minutes while heating to allow the ninhydrin to dissolve. After 5 minutes, 2 mL of mud filtrate was added to the flask containing the dissolved ninhydrin and the reaction mixture was stirred for 15 minutes while allowing the fluid to reach 95° C. Subsequently, the resulting fluid was cooled and analyzed either qualitatively (visually) or quantitatively (with absorption spectroscopy). The visual results of the detection method performed on each fluid are shown in FIG. 6. The absorbance spectra for each sample is shown in FIG. 7 and shows increasing absorbance at 570 nm with increasing the concentration of CLAYSEAL PLUS shale stabilizer in the drilling fluid. The absorbance at 570 nm of each sample was plotted against the CLAYSEAL PLUS shale stabilizer concentration and the resulting graph is displayed in FIG. 8. There is a clear increase in absorbance at 570 nm with an increase in CLAYSEAL PLUS shale stabilizer concentration. This experiment proves the detection method can be performed on common drilling fluid formulations.

Example 4

The detection of an amine-based shale inhibitor in a drilling fluid was investigated. More specifically, the detection with ninhydrin of CLAYSEAL PLUS shale stabilizer in drilling fluids was investigated, in the presence and in the absence of an aqueous salt solution, as follows. A series of drilling fluids were prepared according to Table 6 to include CLAYSEAL PLUS shale stabilizer; wherein the drilling fluids were used for preparing different detection solutions, also according to Table 6.

TABLE 6

| | Test # | | | | | |
|---|---|---|---|---|---|---|
| | 1 | 2 | 3 | 4 | 5 | 6 |
| Interference Type | Salinity | Salinity | Salinity + Alkalinity | Salinity | Salinity | Salinity + Alkalinity |
| Water, mL | 276.5 | 276.5 | 276.5 | 276.5 | 276.5 | 276.5 |
| Soda Ash, g | — | — | 0.5 | — | — | 0.5 |
| Sodium Hydroxide, g | — | — | 0.5 | — | — | 0.5 |
| Amine Inhibitor 1 (CLAYSEAL PLUS shale stabilizer), g | 7 | 7 | 7 | 7 | 7 | 7 |
| NaCl, g | 27.6 | — | 27.6 | 27.6 | — | 27.6 |
| CaCl$_2$, g | — | 27.6 | — | — | 27.6 | — |
| | Test Conditions | | | | | |
| Fresh Water, mL | 20 | 20 | 20 | — | — | — |
| Solvent 1, mL | — | — | — | 20 | 20 | 20 |
| Ninhydrin reagent, mL | 4 | 4 | 4 | 4 | 4 | 4 |
| Amine-Containing Fluid, mL | 1 | 1 | 1 | 1 | 1 | 1 |
| Reaction Time, min | 5 | 5 | 5 | 5 | 5 | 5 |

Figure 9A:
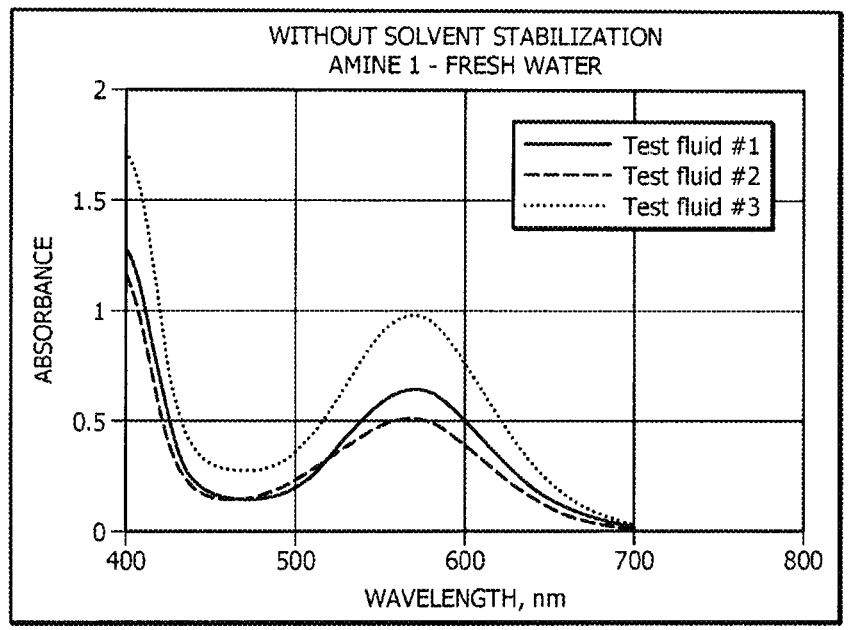
FIG. 9A displays a graph of absorbance intensity versus wavelength for amine-based shale inhibitor solutions of similar concentrations subsequent to reacting with ninhydrin in fresh water.
Figure 9B:
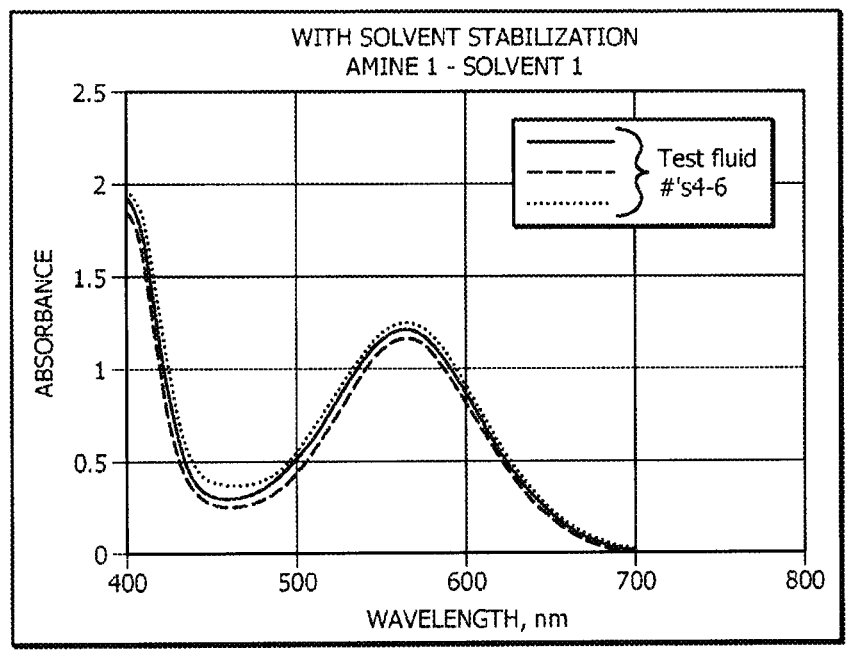
FIG. 9B displays a graph of absorbance intensity versus wavelength for amine-based shale inhibitor solutions of similar concentrations subsequent to reacting with ninhydrin in an aqueous salt solution.

Drilling fluids used for tests #1 and #4 are the same; drilling fluids used for tests #2 and #5 are the same; and drilling fluids used for tests #3 and #6 are the same. 20 mL fresh water were used to make the detection solution for tests #1-#3. 20 mL solvent 1 (aqueous salt solution #1) were used to make the detection solution for tests #4-#6. The composition of solvent 1 was: water 350 g, NaCl 35 g, and NaOAc 1.75 g. The detection solutions were prepared as follows. 20 mL of fresh water or solvent 1 were added to a 125 mL Erlenmeyer flask along with a stir bar. 4 mL of ninhyrin reagent were added under stirring; and the resulting mixture was brought to a boil. Upon boiling, 1 mL of amine-containing fluid (e.g., drilling fluid) was added and the reaction mixture; and the resulting solution was boiled for 5 minutes. As the data displayed in FIG. 9A show, without the use of the stabilizing solvent (i.e., detection solutions prepared with fresh water, tests #1-#3), three different absorbance spectra were acquired, even though each fluid (e.g., drilling fluid, as well as detection solution) had the same amine content. As the data displayed in FIG. 9B show, with the use of a stabilizing solvent (i.e., solvent 1 or aqueous salt solution #1), the same spectra were acquired for each fluid (absorbance intensity curves #4-#6) regardless of the composition of the drilling fluid (e.g., monovalent cations, divalent cations, alkalinity sources in the fluid).

Example 5

The detection of an amine-based shale inhibitor in a drilling fluid was investigated. More specifically, the detection with ninhydrin of BARASURE W-674 shale stabilizer in drilling fluids was investigated, in the presence and in the absence of an aqueous salt solution, as follows. A series of drilling fluids were prepared according to Table 7 to include BARASURE W-674 shale stabilizer; wherein the drilling fluids were used for preparing different detection solutions, also according to Table 7.

TABLE 7

| | Test fluid# | | | | | |
|---|---|---|---|---|---|---|
| | 7 | 8 | 9 | 10 | 11 | 12 |
| Interference Type | Salinity | Salinity | Salinity + Alkalinity | Salinity | Salinity | Salinity + Alkalinity |
| Water, mL | 276.5 | 276.5 | 276.5 | 276.5 | 276.5 | 276.5 |
| Soda Ash, g | — | — | 0.5 | — | — | 0.5 |
| Sodium Hydroxide, g | — | — | 0.5 | — | — | 0.5 |
| Amine Inhibitor 2 (BARASURE W-674 shale stabilizer), g | 7 | 7 | 7 | 7 | 7 | 7 |
| NaCl, g | 27.6 | — | 27.6 | 27.6 | — | 27.6 |
| CaCl$_2$, g | — | 27.6 | — | — | 27.6 | — |
| | Test Conditions | | | | | |
| Fresh Water, mL | 25 | 25 | 25 | — | — | — |
| Solvent 2, mL | — | — | — | 25 | 25 | 25 |

TABLE 7-continued

| | Test fluid# | | | | | |
|---|---|---|---|---|---|---|
| | 7 | 8 | 9 | 10 | 11 | 12 |
| Ninhydrin reagent, mL | 1 | 1 | 1 | 1 | 1 | 1 |
| Amine-Containing Fluid, mL | 0.5 | 0.5 | 0.5 | 0.5 | 0.5 | 0.5 |
| Reaction Time, min | 15 | 15 | 5 | 5 | 5 | 5 |
| Post Reaction Dilution Volume, mL | — | — | — | 50 | 50 | 50 |

Figure 10A:
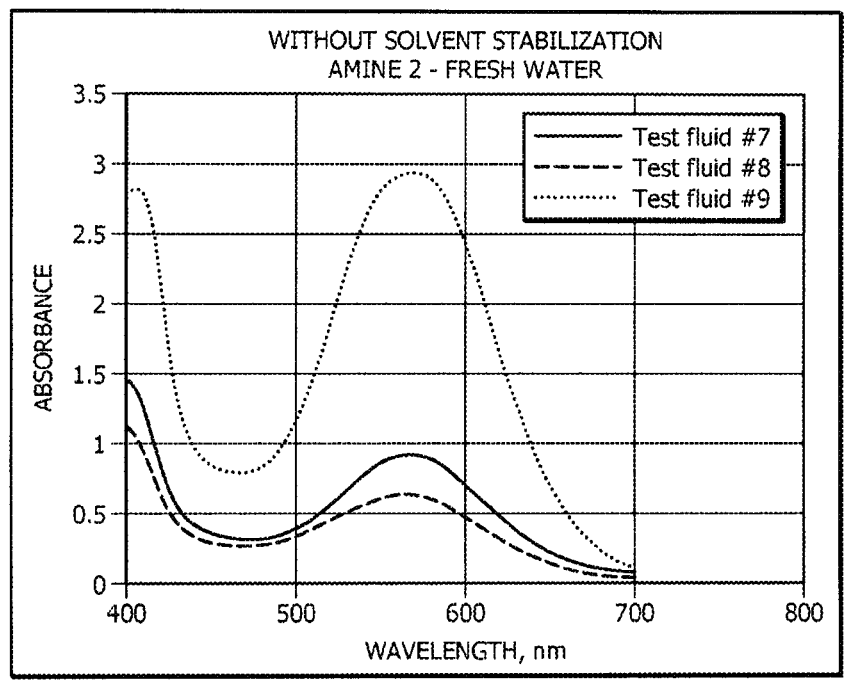
FIG. 10A displays another graph of absorbance intensity versus wavelength for amine-based shale inhibitor solutions of similar concentrations subsequent to reacting with ninhydrin in fresh water.
Figure 10B:
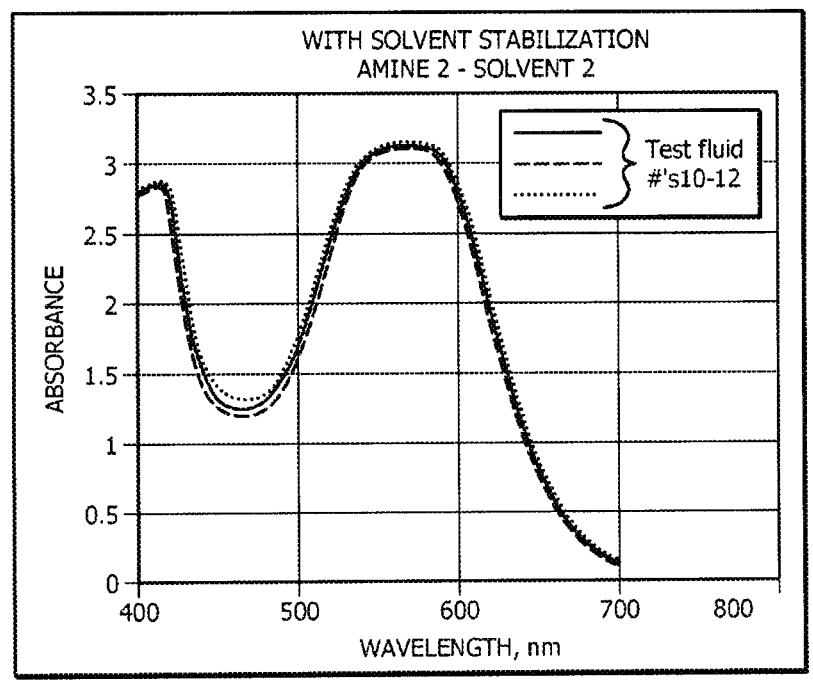
FIG. 10B displays another graph of absorbance intensity versus wavelength for amine-based shale inhibitor solutions of similar concentrations subsequent to reacting with ninhydrin in an aqueous salt solution.

Drilling fluids used for tests #7 and #10 are the same; drilling fluids used for tests #8 and #11 are the same; and drilling fluids used for tests #9 and #12 are the same. 25 mL fresh water were used to make the detection solution for tests #7-#9. 25 mL solvent 2 (aqueous salt solution #2) were used to make the detection solution for test fluids #10-#12. The composition of solvent 1 was: water 350 g, NaCl 35 g, NaOAc 10 g, and PEG-200 100 g. The detection solutions were prepared as follows. 25 mL of fresh water or solvent were added to a 125 mL Erlenmeyer flask along with a stir bar. 1 mL of ninhyrin reagent was added under stirring; and the resulting mixture was brought to a boil. Upon boiling, 0.5 mL of amine-containing fluid were added and the reaction mixture; and the resulting solution was boiled for 5 minutes. For the detection solutions used in tests #7 and #8, little color had formed at the 5 minutes mark, therefore these detection solutions were allowed to boil for 15 minutes. For the detection solutions used in tests #10-#12, a very dark color was generated in 5 minutes, therefore these fluids were diluted up to 50 mL of total volume with fresh water. As the data displayed in FIG. 10A show, without the use of the stabilizing solvent (i.e., detection solutions prepared with fresh water, test fluids #7-#9), three different absorbance spectra were acquired, even though each fluid (e.g., drilling fluid, as well as detection solution) had the same amine content. As the data displayed in FIG. 10B show, with the use of a stabilizing solvent (i.e., solvent 2 or aqueous salt solution #2), the same spectra were acquired for each fluid (absorbance intensity curves #10-#12) regardless of the composition of the drilling fluid (e.g., monovalent cations, divalent cations, alkalinity sources in the fluid).

Example 6

The detection of an amine-based shale inhibitor in a synthetic filtrate (as a comparison for a drilling fluid) was investigated. More specifically, the detection with various amounts of ninhydrin of CLAYSEAL PLUS shale stabilizer in a synthetic filtrate was investigated, as follows. The synthetic filtrate was prepared according to Table 8.

TABLE 8

| Synthetic Filtrate Composition | |
|---|---|
| Fresh Water, mL | 276.5 |
| NaCl, g | 72 |
| KCl, g | 17.75 |
| Caustic Soda, g | 0.5 |
| Soda Ash, g | 0.5 |
| Amine Inhibitor 1 (CLAYSEAL PLUS shale stabilizer), g | 2 |

The synthetic filtrate prepared according to Table 8 was used for making a detection solution and recording an absorbance spectrum according to Table 9.

TABLE 9

| | |
|---|---|
| Solvent | 13 mL fresh water |
| Test Reagent | Dry ninhydrin; variable amount |
| Test Fluid | 2 mL synthetic filtrate |
| Procedure for Making the Detection Solution and recording Absorbance Intensity: | Add 13 mL solvent and weighed amount of test reagent to a flask. Heat and stir mixture in flask for 5 minutes. Add 2 mL of test fluid to flask and boil for 15 minutes. Cool flask in water bath. Acquire spectrum. |

Figure 11:
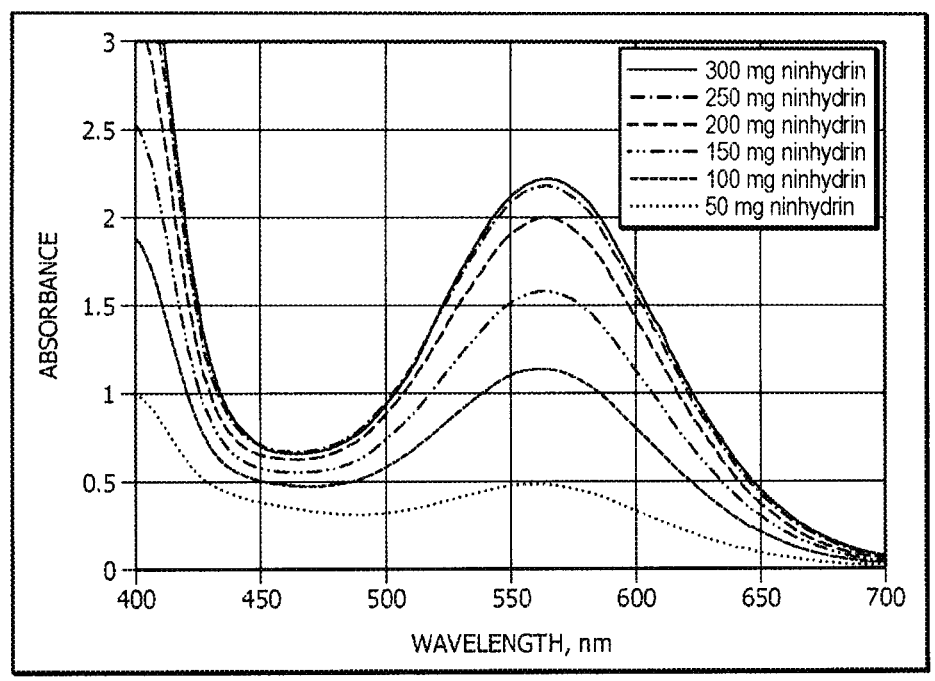
FIG. 11 displays a graph of absorbance intensity versus wavelength for amine-based shale inhibitor solutions of similar concentrations subsequent to reacting with varying amounts of ninhydrin in fresh water.

The absorbance spectra was acquired for varying amounts of ninhydrin, from 50 mg to 300 mg, and the data are displayed in FIG. 11. FIG. 11 indicates that the absorption intensity doesn't vary in a linear manner with the concentration, and some error could arise from having to measure mg levels of ninhydrin. As will be appreciated by one of skill in the art, and with the help of this disclosure, it is impractical for a mud engineer to measure milligram quantities, such as milligram quantities of ninhydrin. Further, and as will be appreciated by one of skill in the art, and with the help of this disclosure, the use of an analytical balance is not a viable option for field applications. Therefore, it may be beneficial to replace the use of solid ninhydrin with a pre-dosed liquid ninhydrin reagent, wherein the liquid ninhydrin reagent could provide for more accurately controlling the amount of ninhydrin delivered into the detection solution, wherein the liquid ninhydrin reagent could be more accurately measured by a field engineer with a relatively simple syringe.

Example 7

The detection of an amine-based shale inhibitor in a test fluid (as a comparison for a drilling fluid) was investigated. More specifically, the stability of a liquid ninhydrin reagent over time was investigated. The test fluid was prepared according to Table 10.

TABLE 10

| Test Fluid | |
|---|---|
| Fresh Water, mL | 350 |
| Amine Inhibitor 1 (CLAYSEAL PLUS shale stabilizer), g | 7 |

The test fluid prepared according to Table 10 was used for making a detection solution and recording an absorbance intensity values according to Table 11.

TABLE 11

| Test Protocol | |
|---|---|
| Solvent | 20 mL NaCl/NaOAc brine (100 g NaCl and 5 g NaOAc in 1 L fresh water) |
| Test Reagent (Liquid Ninhydrin Reagent) | 4 mL of PEG-200/Ninhydrin (5 g ninhydrin/100 mL PEG-200) |

TABLE 11-continued

| | Test Protocol |
|---|---|
| Test Fluid | 1 mL of test fluid |
| Procedure for Making the Detection Solution and recording Absorbance Intensity: | Add 20 mL solvent and test reagent to a flask. Heat and stir mixture in flask until visibly boiling. Add 1 mL of test fluid to flask and boil for 10 minutes. Cool flask in water bath. Measure 600 nm Absorbance Intensity. |

Figure 12:
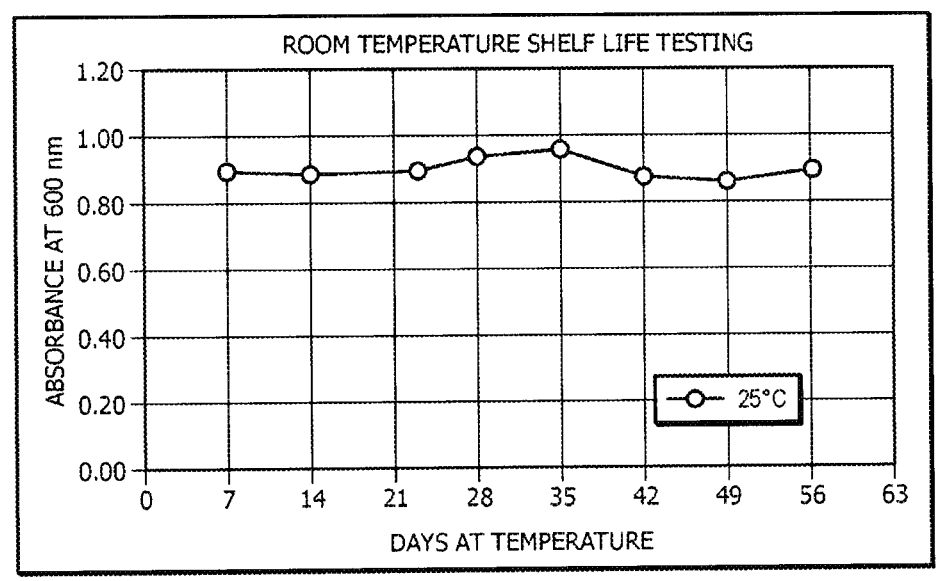
FIG. 12 displays a graph of absorbance stability over time for a liquid ninhydrin reagent including a polar organic solvent (POS).

The data in FIG. 12 indicate that the liquid ninhydrin reagent (e.g., ninhydrin dissolved in PEG-200) is stable at least up to 2 months, thereby making the liquid ninhydrin reagent a viable option for ninhydrin delivery in the field, wherein the liquid ninhydrin reagent can be relatively easily measured volumetrically.

Example 8

The detection of an amine-based shale inhibitor in a test fluid was investigated. More specifically, the detection of amines in test fluids containing BARASURE W-674 shale stabilizer was investigated, by using either solid ninhydrin, or a liquid ninhydrin reagent, as follows. A series of test fluids were prepared according to Table 12 to include BARASURE W-674 shale stabilizer; wherein the test fluids were used for preparing different detection solutions, also according to Table 12.

TABLE 12

| | Test fluid # | | |
|---|---|---|---|
| | 13 | 14 | 15 |
| Water, mL | 350 | 350 | 350 |
| Amine Inhibitor 2 (BaraSure W-674), g | 7 | 7 | 7 |
| Test Conditions | | | |
| Solvent, mL | 25 | 25 | 20 |
| Dry Ninhydrin, mg | 50 | 50 | — |
| Ninhydrin-PEG Reagent (50 mg/5 mL), mL | — | — | 5 |
| Amine-Containing Fluid, mL | 0.5 | 0.5 | 0.5 |
| Reaction Time, min | 5 | 10 | 5 |

Figure 13A:
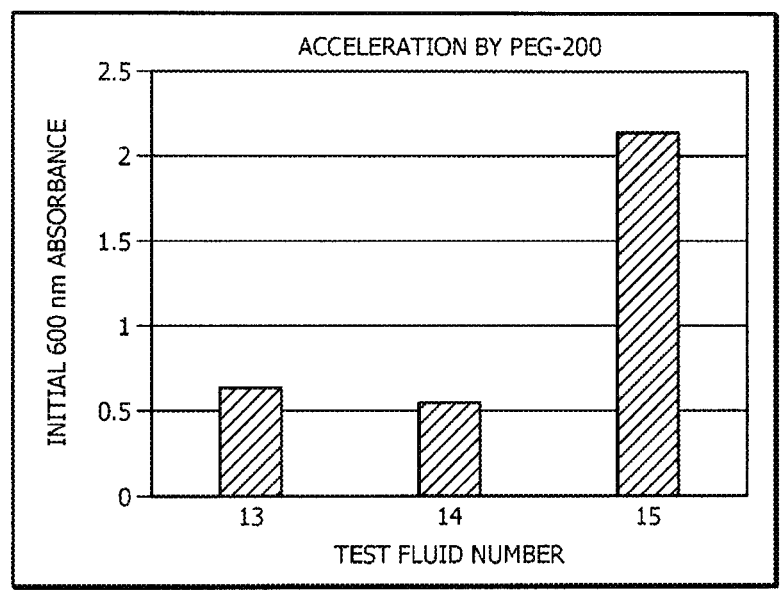
FIG. 13A displays a graph of absorbance for amine-based shale inhibitor solutions of similar concentrations subsequent to reacting with a ninhydrin added as a dry material versus a liquid ninhydrin reagent including a POS.
Figure 13B:
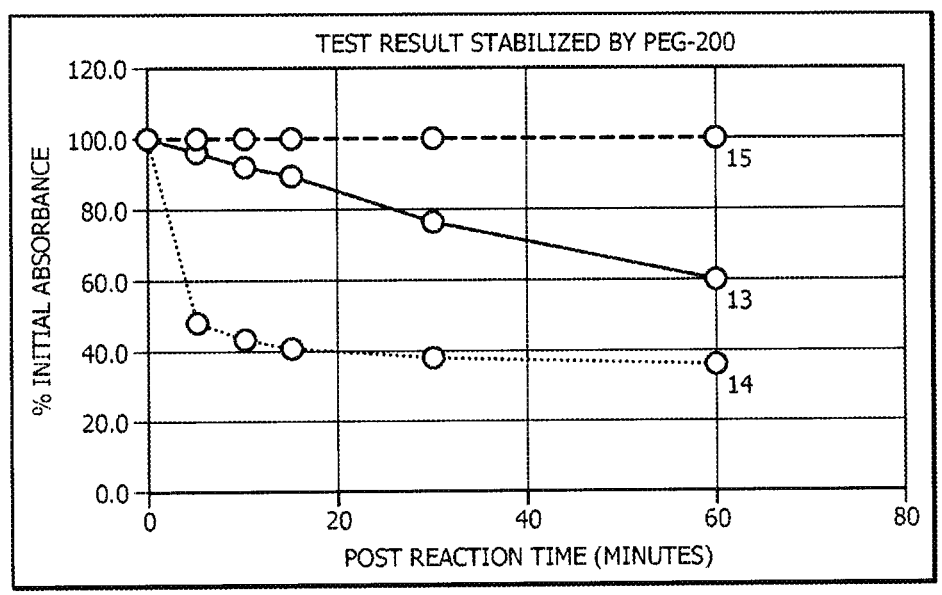
FIG. 13B displays a graph of absorbance stability over time for detection solutions using ninhydrin added as a dry material versus a liquid ninhydrin reagent including a POS.

The solvent composition was: water 350 g, NaCl 35 g, and NaOAc 1.75 g. 25 mL or 20 mL of solvent were added to a 125 mL Erlenmeyer flask along with a stir bar, according to the formulations in Table 12. 50 mg of dry ninhydrin was added to the mixture used for test fluids #13 and #14. 5 mL of a 50 mg/5 mL solution of dry ninhydrin dissolved in PEG-200 was added to the mixture used to test fluid #15. The resulting mixtures were brought to a boil. Upon boiling, 0.5 mL of amine-containing fluid was added and the reaction mixture; and the resulting solution was boiled for 5 minutes. The absorbance intensity for the detection solutions used to test fluids #13-#15 was recorded at 600 nm, and the data are displayed in FIG. 13A. With the use of PEG-200 as a carrier solvent for ninhydrin (test fluid #15), the reaction was accelerated by the presence of PEG-200 in the reaction mixture, as evident by the much higher absorption value obtained by the fluid in test #15, as displayed in FIG. 13A. The absorbance intensity at 600 nm was observed over time for each of the solutions used to test fluids #13-#15, and the data are displayed in FIG. 13B. FIG. 13B indicates that the use of PEG-200 as a carrier for ninhydrin provides a stabilization effect of the colored test result, as seen from the data for test fluid #15. The absorptions of test fluids #13 and #14 began to decay rapidly, whereas the initial absorption of test fluid #15 was maintained completely up to the 60 minute mark.

Additional Disclosure

A first aspect, which is a method of detecting an amine-based additive in a wellbore servicing fluid (WSF) comprising: (a) contacting an aliquot of the WSF with an amine detector compound to form a detection solution; wherein the WSF comprises the amine-based additive; and wherein the detection solution is characterized by at least one absorption peak wavelength in the range of from about 380 nanometers (nm) to about 760 nm; (b) detecting an absorption intensity for the detection solution at a wavelength within about ±20% of the at least one absorption peak wavelength; (c) comparing the absorption intensity of the detection solution at the wavelength within about ±20% of the at least one absorption peak wavelength with a target absorption intensity of the amine-based additive to determine the amount of amine-based additive in the WSF; and (d) comparing the amount of amine-based additive in the WSF with a target amount of the amine-based additive.

A second aspect, which is the method of the first aspect, wherein the detection solution is characterized by a visible color.

A third aspect, which is the method of the second aspect, wherein the aliquot of the WSF is further characterized by a visible color, and wherein the visible color and/or color intensity of the detection solution is different from the visible color and/or color intensity of the aliquot of the WSF.

A fourth aspect, which is the method of any one of the first through the third aspects, wherein (b) detecting an absorption intensity for the detection solution at a wavelength within about ±20% of the at least one absorption peak wavelength further comprises subjecting at least a portion of the detection solution to ultraviolet-visible (UV-VIS) spectroscopy and/or colorimetry to yield the absorption intensity of the detection solution at the wavelength within about ±20% of the at least one absorption peak wavelength.

A fifth aspect, which is the method of the fourth aspect, wherein at least a portion of the detection solution is analyzed in a portable UV-VIS spectrometer and/or a portable colorimeter.

A sixth aspect, which is the method of any one of the first through the fifth aspects, wherein (c) comparing the absorption intensity of the detection solution at the wavelength within about ±20% of the at least one absorption peak wavelength with a target absorption intensity of the amine-based additive comprises optically comparing the color and/or color intensity of the detection solution with a target color and/or color intensity, respectively.

A seventh aspect, which is the method of the sixth aspect, wherein determining the amount of amine-based additive in the WSF further comprises using a calibration curve that correlates absorption intensity at the wavelength within about ±20% of the at least one absorption peak wavelength with the amount of the amine-based additive.

An eighth aspect, which is the method of any one of the first through the seventh aspects, wherein determining the amount of amine-based additive in the WSF further comprises visually comparing a visually observed color and/or color intensity of the detection solution with a reference color chart that correlates color and/or color intensity, respectively, with the amount of the amine-based additive.

A ninth aspect, which is the method of any one of the first through the eighth aspects, wherein the amount of amine-based additive in the WSF varies by less than a threshold amount from the target amount of the amine-based additive, and wherein at least a portion of the WSF is placed in a wellbore and/or subterranean formation.

A tenth aspect, which is the method of the ninth aspect, wherein the WSF is placed in a wellbore and/or subterranean formation prior to determining the amount of amine-based additive in the WSF.

An eleventh aspect, which is the method of any one of the first through the ninth aspects, wherein the WSF is placed in a wellbore and/or subterranean formation subsequent to determining the amount of amine-based additive in the WSF.

A twelfth aspect, which is the method of any one of the first through the eighth aspects, wherein the amount of amine-based additive in the WSF varies by equal to or greater than a threshold amount from the target amount of the amine-based additive, and wherein the WSF is contacted with an effective amount of supplemental amine-based additive to provide for the WSF having the target amount of the amine-based additive.

A thirteenth aspect, which is the method of the twelfth aspect further comprising determining the effective amount of supplemental amine-based additive and preparing the WSF having the target amount of the amine-based additive on-the-fly.

A fourteenth aspect, which is the method of any one of the twelfth and the thirteenth aspects further comprising placing at least a portion of the WSF having the target amount of the amine-based additive in a wellbore and/or subterranean formation.

A fifteenth aspect, which is the method of any one of the first through the fourteenth aspects, wherein the WSF is recovered from a wellbore and/or subterranean formation, wherein at least a portion of the recovered WSF is subjected to a solids removal procedure to yield a substantially solids-free WSF, and wherein an aliquot of the substantially solids-free WSF is contacted with an amine detector compound to form the detection solution in (a).

A sixteenth aspect, which is the method of the fifteenth aspect, wherein the solids removal procedure is selected from the group consisting of filtration, sedimentation, decantation, centrifugation, screening, chemical dissolution, combinations thereof.

A seventeenth aspect, which is the method of any one of the first through the sixteenth aspects further comprising heating the detection solution prior to (b) detecting an absorption intensity for the detection solution at a wavelength within about ±20% of the at least one absorption peak wavelength.

An eighteenth aspect, which is the method of any one of the first through the seventeenth aspects, wherein the amine detector compound comprises ninhydrin, indane-1,2,3-trione, hydrindantin, quinhydrone, Dragendorff reagent, chloranil, N-halosuccinimide, N-bromosuccinimide, N-iodosuccinimide, a hydrazo compound, a diazonium salt, fluorescein, fluorescein halide, fluorescein chloride, or combinations thereof.

A nineteenth aspect, which is the method of any one of the first through the eighteenth aspects; wherein the amine-based additive comprises an amine-based shale inhibitor and/or an amine-based corrosion inhibitor; and wherein the amine-based additive comprises a primary amine functional group, a protonated primary amine functional group, a secondary amine functional group, a protonated secondary amine functional group, a tertiary amine functional group, a protonated tertiary amine functional group, or combinations thereof.

A twentieth aspect, which is the method of any one of the first through the nineteenth aspects, wherein the WSF comprises a drilling fluid.

A twenty-first aspect, which is a method of servicing a wellbore in a subterranean formation comprising (a) preparing a drilling fluid comprising a base fluid and an amine-based additive, wherein the amine-based additive is present in the drilling fluid in a target amount; (b) circulating the drilling fluid in the wellbore and/or subterranean formation to yield a circulated drilling fluid; (c) subjecting at least a portion of the circulated drilling fluid to solids removal to yield a substantially solids-free circulated drilling fluid; (d) contacting an aliquot of the solids-free circulated drilling fluid with an amine detector compound to form a detection solution; wherein the detection solution is characterized by at least one absorption peak wavelength in the range of from about 380 nanometers (nm) to about 760 nm; (e) detecting an absorption intensity for the detection solution at a wavelength within about ±20% of the at least one absorption peak wavelength; (f) comparing the absorption intensity of the detection solution at the wavelength within about ±20% of the at least one absorption peak wavelength with a target absorption intensity of the amine-based additive to determine the amount of amine-based additive in the circulated drilling fluid; and (g) comparing the amount of amine-based additive in the circulated drilling fluid with the target amount of the amine-based additive.

A twenty-second aspect, which is the method of the twenty-first aspect, wherein the detection solution is characterized by a visible color.

A twenty-third aspect, which is the method of the twenty-second aspect, wherein the aliquot of the WSF is further characterized by a visible color, and wherein the visible color and/or color intensity of the detection solution is different from the visible color and/or color intensity of the aliquot of the WSF.

A twenty-fourth aspect, which is the method of any one of the twenty-first through the twenty-third aspects, wherein the amount of amine-based additive in the circulated drilling fluid varies by less than a threshold amount from the target amount of the amine-based additive; and wherein at least a portion of the circulated drilling fluid is recycled to the wellbore and/or subterranean formation.

A twenty-fifth aspect, which is the method of any one of the twenty-first through the twenty-third aspects, wherein the amount of amine-based additive in the circulated drilling fluid varies by equal to or greater than a threshold amount from the target amount of the amine-based additive; wherein the circulated drilling fluid is contacted with an effective amount of supplemental amine-based additive to provide for the circulated drilling fluid having the target amount of the amine-based additive; and wherein at least a portion of the circulated drilling fluid is recycled to the wellbore and/or subterranean formation.

A twenty-sixth aspect, which is the method of the twenty-fifth aspect further comprising determining the effective amount of supplemental amine-based additive in real-time and preparing the circulated drilling fluid having the target amount of the amine-based additive on-the-fly; and wherein the amine-based additive comprises an amine-based shale inhibitor and/or an amine-based corrosion inhibitor.

A twenty-seventh aspect, which is a method of servicing a wellbore in a subterranean formation comprising (a) preparing a drilling fluid comprising a base fluid and an amine-based additive, wherein the amine-based additive is present in the drilling fluid in a target amount; (b) circulating the drilling fluid in the wellbore and/or subterranean formation to yield a circulated drilling fluid; (c) subjecting at least a portion of the circulated drilling fluid to solids removal to yield a substantially solids-free circulated drilling fluid; (d) contacting an aliquot of the solids-free circulated drilling fluid with ninhydrin to form a detection solution; wherein the detection solution is characterized by a first absorption peak wavelength of about 400 nanometers (nm) and by a second absorption peak wavelength of about 570 nm; and wherein the ninhydrin is contacted with the aliquot of the solids-free circulated drilling fluid in an amount of from about 0.01 mmol/liter to about 200 mmol/liter ninhydrin, based on the total volume of the detection solution; (e) detecting an absorption intensity for the detection solution at a wavelength within about ±20% of the first absorption peak wavelength and/or the second absorption peak wavelength; (f) comparing the absorption intensity of the detection solution at the wavelength within about ±20% of the first absorption peak wavelength and/or the second absorption peak wavelength with a target absorption intensity at the wavelength within about ±20% of the first absorption peak wavelength and/or the second absorption peak wavelength, respectively of the amine-based additive to determine the amount of amine-based additive in the circulated drilling fluid; and (g) comparing the amount of amine-based additive in the circulated drilling fluid with the target amount of the amine-based additive.

A twenty-eighth aspect, which is the method of the twenty-seventh aspect, wherein the detection solution is characterized by a visible color.

A twenty-ninth aspect, which is the method of the twenty-eighth aspect, wherein the aliquot of the WSF is further characterized by a visible color, and wherein the visible color and/or color intensity of the detection solution is different from the visible color and/or color intensity of the aliquot of the WSF.

A thirtieth aspect, which is the method of any one of the twenty-seventh through the twenty-ninth aspects, wherein (f) comparing the absorption intensity of the detection solution at the wavelength within about ±20% of the first absorption peak wavelength and/or the second absorption peak wavelength with a target absorption intensity of the amine-based additive comprises optically comparing the color and/or color intensity of the detection solution with a target color and/or color intensity, respectively; and wherein the color is purple.

A thirty-first aspect, which is the method of any one of the twenty-seventh through the thirtieth aspects, wherein (f) comparing the absorption intensity of the detection solution at the wavelength within about ±20% of the first absorption peak wavelength and/or the second absorption peak wavelength with a target absorption intensity of the amine-based additive further comprises subjecting at least a portion of the detection solution to ultraviolet-visible (UV-VIS) spectroscopy and/or colorimetry in a portable UV-VIS spectrometer and/or a portable colorimeter, respectively, to yield the absorption intensity of the detection solution at the wavelength within about ±20% of the first absorption peak wavelength and/or the second absorption peak wavelength.

A thirty-second aspect, which is the method of any one of the twenty-seventh through the thirty-first aspects, wherein the amount of amine-based additive in the circulated drilling fluid varies by equal to or greater than a threshold amount from the target amount of the amine-based additive; wherein the circulated drilling fluid is contacted with an effective amount of supplemental amine-based additive to provide for the circulated drilling fluid having the target amount of the amine-based additive; and wherein at least a portion of the circulated drilling fluid is recycled to the wellbore and/or subterranean formation.

A thirty-third aspect, which is the method of the thirty-second aspect further comprising determining the effective amount of supplemental amine-based additive and preparing the circulated drilling fluid having the target amount of the amine-based additive in real-time; wherein the amine-based additive comprises an amine-based shale inhibitor and/or an amine-based corrosion inhibitor.

Embodiment A1: A method of detecting an amine-based additive in a wellbore servicing fluid (WSF) comprising (a) contacting an aliquot of the WSF with an amine detector compound and an aqueous salt solution to form a detection solution; wherein the aqueous salt solution comprises an inorganic salt and an organic carboxylate salt; wherein the WSF comprises the amine-based additive; and wherein the detection solution is characterized by at least one absorption peak wavelength in the range of from about 380 nanometers (nm) to about 760 nm; (b) detecting an absorption intensity for the detection solution at a wavelength within about ±20% of the at least one absorption peak wavelength; (c) comparing the absorption intensity of the detection solution at the wavelength within about ±20% of the at least one absorption peak wavelength with a target absorption intensity of the amine-based additive to determine the amount of amine-based additive in the WSF; and (d) comparing the amount of amine-based additive in the WSF with a target amount of the amine-based additive.

Embodiment B1: The method of Embodiment A1, wherein the inorganic salt comprises an inorganic halide; an inorganic chloride, LiCl, NaCl, KCl, $CaCl_2$, $MgCl_2$, $ZnCl_2$; an inorganic bromide, LiBr, NaBr, KBr, $CaBr_2$, $MgBr_2$, $ZnBr_2$; an inorganic phosphate, $LiH_2PO_4$, $Li_2HPO_4$, $NaH_2PO_4$, $Na_2HPO_4$, $Na_3PO_4$, $KH_2PO_4$, $K_2HPO_4$, $K_3PO_4$, $Ca_3(PO_4)_2$, $Mg(H_2PO_4)_2xH_2O$, $MgHPO_4xH_2O$, $Mg_3(PO_4)_2 xH_2O$; an inorganic nitrate, $LiNO_3$, $NaNO_3$, $KNO_3$, $Ca(NO_3)_2$, $Mg(NO_3)_2$; an inorganic nitrite, $LiNO_2$, $NaNO_2$, $KNO_2$, $Ca(NO_2)_2$, $Mg(NO_2)_2$; an inorganic sulfate, $Li_2SO_4$, $Na_2SO_4$, $K_2SO_4$, $CaSO_4$, $MgSO_4$; an inorganic sulfite, $Li_2SO_3$, $Na_2SO_3$, $K_2SO_3$, $CaSO_3$; an inorganic sulfide, $Li_2S$, $Na_2S$, $K_2S$, CaS; an inorganic carbonate, $Na_2CO_3$, $K_2CO_3$; an inorganic bicarbonate, $NaHCO_3$, $KHCO_3$, $Mg(HCO_3)_2$, $Ca(HCO_3)_2$; or combinations thereof.

Embodiment C1: The method of any one of Embodiments A1 and B1, wherein the inorganic salt is present in the aqueous salt solution in an amount of from about 0.1 wt. % to less than about a saturation concentration of the inorganic salt in the aqueous salt solution, based on the total weight of the aqueous salt solution.

Embodiment D1: The method of any one of Embodiments A1 through C1, wherein the inorganic salt is present in the aqueous salt solution in an amount of from about 0.1 wt. % to about 27.5 wt. %, based on the total weight of the aqueous salt solution.

Embodiment E1: The method of any one of Embodiments A1 through D1, wherein the organic carboxylate salt comprises an acetate, lithium acetate, sodium acetate, potassium acetate, zinc acetate, aluminum acetate, cesium acetate; a formate, lithium formate, sodium formate, potassium formate, cesium formate; a citrate, lithium citrate, sodium citrate, potassium citrate, calcium citrate; a polyacrylate, lithium polyacrylate, sodium polyacrylate, potassium polyacrylate; a lactate, lithium lactate, sodium lactate, potassium lactate, calcium lactate, magnesium lactate; a propionate, sodium propionate, potassium propionate, calcium propionate, magnesium propionate; a butyrate, sodium butyrate, potassium butyrate, calcium butyrate, magnesium butyrate; a hydroxybutyrate, sodium hydroxybutyrate, potassium hydroxybutyrate, calcium hydroxybutyrate, magnesium hydroxybutyrate; a glycolate, sodium glycolate, potassium glycolate, calcium glycolate, magnesium glycolate; derivatives thereof, or combinations thereof.

Embodiment F1: The method of any one of Embodiments A1 through E1, wherein the organic carboxylate salt is present in the aqueous salt solution in an amount of from about 0.1 wt. % to less than about a saturation concentration of the organic carboxylate salt in the aqueous salt solution, based on the total weight of the aqueous salt solution.

Embodiment G1: The method of any one of Embodiments A1 through F1, wherein the organic carboxylate salt is present in the aqueous salt solution in an amount of from about 0.1 wt. % to about 30 wt. %, based on the total weight of the aqueous salt solution.

Embodiment H1: The method of any one of Embodiments A1 through G1, wherein the aqueous salt solution and the aliquot of the WSF are contacted with each other at a volumetric ratio of aqueous salt solution to WSF of from about 500:1 to about 5:1.

Embodiment I1: The method of any one of Embodiments A1 through H1, wherein the amine detector compound comprises ninhydrin, indane-1,2,3-trione, hydrindantin, quinhydrone, Dragendorff reagent, chloranil, N-halosuccinimide, N-bromosuccinimide, N-iodosuccinimide, a hydrazo compound, a diazonium salt, fluorescein, fluorescein halide, fluorescein chloride, or combinations thereof.

Embodiment J1: The method of any one of Embodiments A1 through I1, wherein the amine detector compound is contacted with the aliquot of the WSF and the aqueous salt solution in an amount of from about 0.01 mmol/liter to about 200 mmol/liter amine detector compound, based on the total volume of the detection solution.

Embodiment K1: The method of any one of Embodiments A1 through J1, wherein the aqueous salt solution further comprises a polar organic solvent (POS), wherein the POS is characterized by a flash point at ambient pressure of equal to or greater than about 105° C.

Embodiment L1: The method of Embodiment K1, wherein the POS is characterized by a boiling point at ambient pressure of equal to or greater than about 105° C.

Embodiment M1: The method of any one of Embodiments K1 and L1, wherein the POS comprises ethylene glycol; ethylene glycol monobutyl ether; diethylene glycol; diethylene glycol butyl ether; a polyethylene glycol characterized by the formula

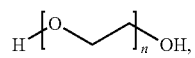

wherein n is an integer equal to or greater than about 3; glycerin; hexamethylphosphoramide; ethylene carbonate; propylene carbonate; sulfolane; derivatives thereof, or combinations thereof.

Embodiment N1: The method of any one of Embodiments K1 through M1, wherein the POS is present in the aqueous salt solution in an amount of from about 1 wt. % to about 50 wt. %, based on the total weight of the aqueous salt solution.

Embodiment O1: The method of any one of Embodiments A1 through N1, wherein the amine-based additive comprises an amine-based shale inhibitor, wherein the WSF is a drilling fluid, wherein the WSF is characterized by a pH of greater than about 7.5, and wherein the detection solution is characterized by a pH of less than about 7.

Embodiment P1: The method of any one of Embodiments A1 through O1, wherein (b) detecting an absorption intensity for the detection solution at a wavelength within about ±20% of the at least one absorption peak wavelength further comprises subjecting at least a portion of the detection solution to ultraviolet-visible (UV-VIS) spectroscopy and/or colorimetry to yield the absorption intensity of the detection solution at the wavelength within about ±20% of the at least one absorption peak wavelength.

Embodiment Q1: The method of Embodiment P1, wherein at least a portion of the detection solution is analyzed in a portable UV-VIS spectrometer and/or a portable colorimeter, respectively.

Embodiment R1: The method of any one of Embodiments A1 through O1, wherein (c) comparing the absorption intensity of the detection solution at the wavelength within about ±20% of the at least one absorption peak wavelength with a target absorption intensity of the amine-based additive comprises optically comparing the color and/or color intensity of the detection solution with a target color and/or color intensity, respectively.

Embodiment S1: The method of Embodiment R1, wherein determining the amount of amine-based additive in the WSF further comprises using a calibration curve that correlates absorption intensity at the wavelength within about ±20% of the at least one absorption peak wavelength with the amount of the amine-based additive.

Embodiment T1: The method of Embodiment R1, wherein the detection solution is characterized by a visible color; and wherein determining the amount of amine-based additive in the WSF further comprises visually comparing a visually observed color and/or color intensity of the detection solution with a reference color chart that correlates color and/or color intensity, respectively, with the amount of the amine-based additive.

Embodiment U1: The method of any one of Embodiments A1 through T1, wherein the WSF is recovered from a wellbore and/or subterranean formation, wherein at least a portion of the recovered WSF is subjected to a solids removal procedure to yield a substantially solids-free WSF, and wherein an aliquot of the substantially solids-free WSF is contacted with the amine detector compound and the aqueous salt solution to form the detection solution in (a).

Embodiment V1: The method of any one of Embodiments A1 through U1 further comprising heating the detection solution prior to (b) detecting an absorption intensity for the detection solution at a wavelength within about ±20% of the at least one absorption peak wavelength.

Embodiment W1: The method of any one of Embodiments A1 through V1, wherein the aqueous salt solution provides for an increased accuracy of (b) detecting an absorption intensity for the detection solution at a wavelength within about ±20% of the at least one absorption peak wavelength, when compared to the accuracy of detecting an absorption intensity for an otherwise similar detection solution lacking the aqueous salt solution at the same wavelength within about ±20% of the at least one absorption peak wavelength.

Embodiment X1: A method of servicing a wellbore in a subterranean formation comprising (a) preparing a drilling fluid comprising a base fluid and an amine-based shale inhibitor, wherein the amine-based shale inhibitor is present in the drilling fluid in a target amount; (b) circulating the drilling fluid in the wellbore and/or subterranean formation to yield a circulated drilling fluid; (c) subjecting at least a portion of the circulated drilling fluid to solids removal to yield a substantially solids-free circulated drilling fluid; (d) contacting an aliquot of the solids-free circulated drilling fluid with an amine detector compound and an aqueous salt solution to form a detection solution; wherein the aqueous salt solution comprises an inorganic salt and an organic carboxylate salt; wherein the WSF comprises the amine-based shale inhibitor; and wherein the detection solution is characterized by at least one absorption peak wavelength in the range of from about 380 nanometers (nm) to about 760 nm; (e) detecting an absorption intensity for the detection solution at a wavelength within about ±20% of the at least one absorption peak wavelength; (f) comparing the absorption intensity of the detection solution at the wavelength within about ±20% of the at least one absorption peak wavelength with a target absorption intensity of the amine-based shale inhibitor to determine the amount of amine-based shale inhibitor in the circulated drilling fluid; and (g) comparing the amount of amine-based shale inhibitor in the circulated drilling fluid with the target amount of the amine-based shale inhibitor.

Embodiment Y1: The method of Embodiment X1, where the amount of amine-based shale inhibitor in the circulated drilling fluid varies by equal to or greater than a threshold amount from the target amount of the amine-based shale inhibitor, (h) contacting the circulated drilling fluid with an effective amount of supplemental amine-based shale inhibitor to provide for the circulated drilling fluid having the target amount of the amine-based shale inhibitor; and (i) recycling at least a portion of the circulated drilling fluid having the target amount of the amine-based shale inhibitor to the wellbore and/or subterranean formation.

Embodiment Z1: The method of Embodiment Y1, wherein step (h) is performed in real-time.

Embodiment AA1: The method of any one of Embodiments X1 through Z1, wherein the amine detector compound comprises ninhydrin; and wherein ninhydrin is contacted with the aliquot of the WSF and the aqueous salt solution in an amount of from about 0.01 mmol/liter to about 200 mmol/liter ninhydrin, based on the total volume of the detection solution.

Embodiment BB1: The method of Embodiment AA1, wherein (f) comparing the absorption intensity of the detection solution at the wavelength within about ±20% of the at least one absorption peak wavelength with a target absorption intensity of the amine-based shale inhibitor comprises optically comparing the color and/or color intensity of the detection solution with a target color and/or color intensity, respectively; and wherein the color is purple.

Embodiment CC1: The method of any one of Embodiments X1 through BB1, wherein the aqueous salt solution provides for decreasing absorption intensity variations between different WSFs that contain substantially the same amount of the amine-based shale inhibitor; and wherein the different WSFs are characterized by different pH and/or salinity when compared to each other.

Embodiment DD1: A method of decreasing spectral variations in a wellbore servicing fluid (WSF) comprising (a) providing an aliquot of a first WSF and an aliquot of a second WSF; wherein the first WSF and the second WSF comprise the same amine-based additive; wherein the first WSF and the second WSF comprise substantially the same amount of the amine-based additive; and wherein the first WSF and the second WSF are characterized by different pH and/or salinity when compared to each other; (b) decreasing spectral variations inducible by WSF components by contacting an aqueous salt solution with (i) the aliquot of the first WSF and an amine detector compound to form a first detection solution, and (ii) the aliquot of the second WSF and the amine detector compound to form a second detection solution; wherein the aqueous salt solution comprises an inorganic salt and an organic carboxylate salt; and wherein each of the first detection solution and the second detection solution is independently characterized by at least one absorption peak wavelength in the range of from about 380 nanometers (nm) to about 760 nm; (c) detecting a first absorption intensity for the first detection solution and a second absorption intensity for the second detection solution at a wavelength within about ±20% of the at least one absorption peak wavelength; wherein the first absorption intensity is within +10% of the second absorption intensity; and (d) comparing the first absorption intensity and the second absorption intensity with a target absorption intensity of the amine-based additive to determine a first amount of amine-based additive in the first WSF and a second amount of amine-based additive in the second WSF, respectively.

Embodiment EE1: The method of Embodiment DD1, wherein the determined first amount of amine-based additive in the first WSF is within +5% of the determined second amount of amine-based additive in the second WSF.

Embodiment FF1: The method of any one of Embodiments DD1 and EE1 further comprising comparing the determined first amount of amine-based additive in the first WSF and/or the determined second amount of amine-based additive in the second WSF with a target amount of the amine-based additive.

Embodiment GG1: The method of Embodiment FF1, wherein the determined first amount of amine-based additive in the first WSF and/or the determined second amount of amine-based additive in the second WSF varies by less than a threshold amount from the target amount of the amine-based additive, and wherein at least a portion of the first WSF and/or at least a portion of the second WSF, respectively, is placed in a wellbore and/or subterranean formation.

Embodiment HH1: The method of any one of Embodiments FF1 and GG1, wherein the determined first amount of amine-based additive in the first WSF and/or the determined second amount of amine-based additive in the second WSF varies by equal to or greater than a threshold amount from the target amount of the amine-based additive, and wherein the first WSF and/or the second WSF, respectively, is contacted with an effective amount of supplemental amine-based additive to provide for a corrected first WSF and/or a corrected second WSF, respectively, having the target amount of the amine-based additive.

Embodiment II1: The method of Embodiment HH1 further comprising determining the effective amount of supplemental amine-based additive and preparing the corrected first WSF and/or the corrected second WSF, respectively, having the target amount of the amine-based additive on-the-fly.

Embodiment JJ1: The method of any one of Embodiments HH1 and II1 further comprising placing at least a portion of the corrected first WSF and/or at least a portion of the corrected second WSF, respectively, having the target amount of the amine-based additive in a wellbore and/or subterranean formation.

Embodiment KK1: A test kit for the detection of an amine-based additive in a wellbore servicing fluid (WSF) comprising (i) an aqueous salt solution; wherein the aqueous salt solution comprises an inorganic salt and an organic carboxylate salt; wherein each of the inorganic salt and the organic carboxylate salt is independently present in the aqueous salt solution in an amount of from about 0.1 wt. % to less than about a saturation concentration of the respective salt in the aqueous salt solution, based on the total weight of the aqueous salt solution; and (ii) an amine detector compound; wherein the amine detector compound is configured to interact with an amine-based additive in a WSF and produce at least one absorption peak wavelength in the range of from about 380 nanometers (nm) to about 760 nm.

Embodiment LL1: The test kit of Embodiment KK1, wherein the interaction of the amine detector compound with the amine-based additive in the WSF provides for a visible color, wherein the test kit further comprises a reference color chart configured to provide for the visual correlation of color and/or color intensity of the visible color with the amount of the amine-based additive in the WSF.

Embodiment MM1: The test kit of any one of Embodiments KK1 and LL1, wherein the aqueous salt solution further comprises a polar organic solvent (POS); wherein the POS is characterized by a boiling point at ambient pressure of equal to or greater than about 105° C.; wherein the POS is characterized by a flash point at ambient pressure of equal to or greater than about 105° C.; and wherein the POS is present in the aqueous salt solution in an amount of from about 1 wt. % to about 50 wt. %, based on the total weight of the aqueous salt solution.

Embodiment NN1: A test system for the detection of an amine-based additive in a wellbore servicing fluid (WSF) comprising (a) the WSF; wherein the WSF comprises the amine-based additive; and (b) a test kit comprising (i) an aqueous salt solution; wherein the aqueous salt solution comprises an inorganic salt and an organic carboxylate salt; wherein each of the inorganic salt and the organic carboxylate salt is independently present in the aqueous salt solution in an amount of from about 0.1 wt. % to less than about a saturation concentration of the respective salt in the aqueous salt solution, based on the total weight of the aqueous salt solution; and (ii) an amine detector compound; wherein the amine detector compound is configured to interact with the amine-based additive in the WSF and produce at least one absorption peak wavelength in the range of from about 380 nanometers (nm) to about 760 nm.

Embodiment OO1: The test system of Embodiment NN1, wherein the aqueous salt solution further comprises a polar organic solvent (POS); wherein the POS is characterized by a boiling point at ambient pressure of equal to or greater than about 105° C.; wherein the POS is characterized by a flash point at ambient pressure of equal to or greater than about 105° C.; and wherein the POS is present in the aqueous salt solution in an amount of from about 1 wt. % to about 50 wt. %, based on the total weight of the aqueous salt solution.

Embodiment PP1: The test system of any one of Embodiments NN1 and OO1 further comprising a portable UV-VIS spectrometer and/or a portable colorimeter configured to detect an absorption intensity resulting from the interaction of the amine detector compound with the amine-based additive in the WSF, wherein the absorption intensity is detected at a wavelength within about ±20% of the at least one absorption peak wavelength.

Embodiment QQ1: The test system of Embodiment PP1 further comprising a calibration curve configured to provide for correlating the absorption intensity detected at a wavelength within about ±20% of the at least one absorption peak wavelength with the amount of the amine-based additive in the WSF.

Embodiment RR1: The test system of any one of Embodiments NN1 through QQ1, wherein the interaction of the amine detector compound with the amine-based shale inhibitor in the WSF provides for a visible color, wherein the test kit further comprises a reference color chart configured to provide for the visual correlation of color and/or color intensity of the visible color with the amount of the amine-based additive in the WSF.

Embodiment SS1: The test system of any one of Embodiments NN1 through RR1, wherein the WSF is a drilling fluid, and wherein the amine-based additive comprises an amine-based shale inhibitor and/or an amine-based corrosion inhibitor.

Embodiment A2: A method of detecting an amine-based additive in a wellbore servicing fluid (WSF) comprising (a) contacting an aliquot of the WSF with an amine detector reagent and an aqueous medium to form a detection solution; wherein the amine detector reagent comprises an amine detector compound and a polar organic solvent (POS); wherein the POS is characterized by a flash point at ambient pressure of equal to or greater than about 105° C.; wherein the WSF comprises the amine-based additive; and wherein the detection solution is characterized by at least one absorption peak wavelength in the range of from about 380 nanometers (nm) to about 760 nm; (b) detecting an absorption intensity for the detection solution at a wavelength within about ±20% of the at least one absorption peak wavelength; (c) comparing the absorption intensity of the detection solution at the wavelength within about ±20% of the at least one absorption peak wavelength with a target absorption intensity of the amine-based additive to determine the amount of amine-based additive in the WSF; and (d) comparing the amount of amine-based additive in the WSF with a target amount of the amine-based additive.

Embodiment B2: The method of Embodiment A2, wherein the POS is characterized by a boiling point at ambient pressure of equal to or greater than about 105° C.

Embodiment C2: The method of any one of Embodiments A2 and B2, wherein the POS comprises ethylene glycol; ethylene glycol monobutyl ether; diethylene glycol; diethylene glycol butyl ether; a polyethylene glycol characterized by the formula

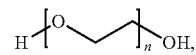

wherein n is an integer from about 3 to about 25; glycerin; hexamethylphosphoramide; propylene carbonate; sulfolane; derivatives thereof, or combinations thereof.

Embodiment D2: The method of any one of Embodiments A2 through C2, wherein the amine detector compound comprises ninhydrin, indane-1,2,3-trione, hydrindantin, quinhydrone, Dragendorff reagent, chloranil, N-halosuccinimide, N-bromosuccinimide, N-iodosuccinimide, a hydrazo compound, a diazonium salt, fluorescein, fluorescein halide, fluorescein chloride, or combinations thereof.

Embodiment E2: The method of any one of Embodiments A2 through D2, wherein the amine detector compound is present in the amine detector reagent in an amount of from about 1 mmol/liter to less than about a saturation concentration of the amine detector compound in the amine detector reagent, based on the total volume of the amine detector reagent.

Embodiment F2: The method of any one of Embodiments A2 through E2, wherein the amine detector compound is present in the amine detector reagent in an amount of from about 1 mmol/liter to about 1 mol/liter, based on the total volume of the amine detector reagent.

Embodiment G2: The method of any one of Embodiments A2 through F2, wherein the amine detector reagent is contacted with the aliquot of the WSF and the aqueous medium in an amount effective to provide for a concentration of the amine detector compound in the detection solution of from about 0.01 mmol/liter to about 200 mmol/liter, based on the total volume of the detection solution.

Embodiment H2: The method of any one of Embodiments A2 through G2, wherein the amine detector reagent and the aliquot of the WSF are contacted with each other at a volumetric ratio of amine detector reagent to WSF of from about 50:1 to about 1:5.

Embodiment I2: The method of any one of Embodiments A2 through H2, wherein the detection solution is characterized by an initial absorption intensity ($A_0$) of the detection solution at the wavelength within about ±20% of the at least one absorption peak wavelength; wherein $A_0$ is defined as the absorption intensity of the detection solution substantially at the time of forming the detection solution ($t_0=0$ minutes); wherein the absorption intensity ($A_t$) of the detection solution at the wavelength within about ±20% of the at least one absorption peak wavelength is measured at a time t elapsed from the time of forming the detection solution; and wherein $A_t$ is within +10% of $A_0$.

Embodiment J2: The method of Embodiment I2, wherein the time t is equal to or greater than about 0.5 minutes.

Embodiment K2: The method of any one of Embodiments I2 and J2, wherein the time t is equal to or greater than about 60 minutes; and wherein $A_t$ is within +5% of $A_0$.

Embodiment L2: The method of any one of Embodiments A2 through K2, wherein the aqueous medium comprises fresh water, tap water, potable water, non-potable water, untreated water, partially treated water, treated water, produced water, city water, well-water, surface water, an aqueous solution, an aqueous salt solution, sea water, or combinations thereof.

Embodiment M2: The method of Embodiment L2, wherein the aqueous salt solution comprises an inorganic salt and an organic carboxylate salt; wherein the inorganic salt is present in the aqueous salt solution in an amount of from about 0.1 wt. % to less than about a saturation concentration of the inorganic salt in the aqueous salt solution, based on the total weight of the aqueous salt solution; and wherein the organic carboxylate salt is present in the aqueous salt solution in an amount of from about 0.1 wt. % to less than about a saturation concentration of the organic carboxylate salt in the aqueous salt solution, based on the total weight of the aqueous salt solution.

Embodiment N2: The method of Embodiment M2, wherein the inorganic salt comprises an inorganic halide; an inorganic chloride, LiCl, NaCl, KCl, $CaCl_2$, $MgCl_2$, $ZnCl_2$; an inorganic bromide, LiBr, NaBr, KBr, $CaBr_2$, $MgBr_2$, $ZnBr_2$; an inorganic phosphate, $LiH_2PO_4$, $Li_2HPO_4$, $NaH_2PO_4$, $Na_2HPO_4$, $Na_3PO_4$, $KH_2PO_4$, $K_2HPO_4$, $K_3PO_4$, $Ca_3(PO_4)_2$, $Mg(H_2PO_4)_2 xH_2O$, $MgHPO_4 xH_2O$, $Mg_3(PO_4)_2 xH_2O$; an inorganic nitrate, $LiNO_3$, $NaNO_3$, $KNO_3$, $Ca(NO_3)_2$, $Mg(NO_3)_2$; an inorganic nitrite, $LiNO_2$, $NaNO_2$, $KNO_2$, $Ca(NO_2)_2$, $Mg(NO_2)_2$; an inorganic sulfate, $Li_2SO_4$, $Na_2SO_4$, $K_2SO_4$, $CaSO_4$, $MgSO_4$; an inorganic sulfite, $Li_2SO_3$, $Na_2SO_3$, $K_2SO_3$, $CaSO_3$; an inorganic sulfide, $Li_2S$, $Na_2S$, $K_2S$, CaS; an inorganic carbonate, $Na_2CO_3$, $K_2CO_3$; an inorganic bicarbonate, $NaHCO_3$, $KHCO_3$, $Mg(HCO_3)_2$, $Ca(HCO_3)_2$; or combinations thereof.

Embodiment O2: The method of any one of Embodiments M2 and N2, wherein the organic carboxylate salt comprises an acetate, lithium acetate, sodium acetate, potassium acetate, zinc acetate, aluminum acetate, cesium acetate; a formate, lithium formate, sodium formate, potassium formate, cesium formate; a citrate, lithium citrate, sodium citrate, potassium citrate, calcium citrate; a polyacrylate, lithium polyacrylate, sodium polyacrylate, potassium polyacrylate; a lactate, lithium lactate, sodium lactate, potassium lactate, calcium lactate, magnesium lactate; a propionate, sodium propionate, potassium propionate, calcium propionate, magnesium propionate; a butyrate, sodium butyrate, potassium butyrate, calcium butyrate, magnesium butyrate; a hydroxybutyrate, sodium hydroxybutyrate, potassium hydroxybutyrate, calcium hydroxybutyrate, magnesium hydroxybutyrate; a glycolate, sodium glycolate, potassium glycolate, calcium glycolate, magnesium glycolate; derivatives thereof, or combinations thereof.

Embodiment P2: The method of any one of Embodiments A2 through O2, wherein the aqueous medium and the aliquot of the WSF are contacted with each other at a volumetric ratio of aqueous medium to WSF of from about 500:1 to about 5:1.

Embodiment Q2: The method of any one of Embodiments M2 through P2, wherein the aqueous salt solution further comprises a POS; wherein the POS is present in the aqueous salt solution in an amount of from about 1 wt. % to about 50 wt. %, based on the total weight of the aqueous salt solution; and wherein the POS of the amine detector reagent and the POS of the aqueous salt solution are the same or different.

Embodiment R2: The method of any one of Embodiments A2 through Q2, wherein (b) detecting an absorption intensity for the detection solution at a wavelength within about ±20% of the at least one absorption peak wavelength further comprises subjecting at least a portion of the detection solution to ultraviolet-visible (UV-VIS) spectroscopy and/or colorimetry to yield the absorption intensity of the detection solution at the wavelength within about ±20% of the at least one absorption peak wavelength.

Embodiment S2: The method of Embodiment R2, wherein at least a portion of the detection solution is analyzed in a portable UV-VIS spectrometer and/or a portable colorimeter, respectively.

Embodiment T2: The method of any one of Embodiments A2 through S2, wherein (c) comparing the absorption intensity of the detection solution at the wavelength within about ±20% of the at least one absorption peak wavelength with a target absorption intensity of the amine-based additive comprises optically comparing the color and/or color intensity of the detection solution with a target color and/or color intensity, respectively.

Embodiment U2: The method of Embodiment T2, wherein determining the amount of amine-based additive in the WSF further comprises using a calibration curve that correlates absorption intensity at the wavelength within about ±20% of the at least one absorption peak wavelength with the amount of the amine-based additive.

Embodiment V2: The method of Embodiment T2, wherein the detection solution is characterized by a visible color; and wherein determining the amount of amine-based additive in the WSF further comprises visually comparing a visually observed color and/or color intensity of the detection solution with a reference color chart that correlates color and/or color intensity, respectively, with the amount of the amine-based additive.

Embodiment W2: The method of any one of Embodiments A2 through V2, wherein the WSF is recovered from a wellbore and/or subterranean formation, wherein at least a portion of the recovered WSF is subjected to a solids removal procedure to yield a substantially solids-free WSF, and wherein an aliquot of the substantially solids-free WSF is contacted with the amine detector reagent and the aqueous medium to form the detection solution in (a).

Embodiment X2: The method of any one of Embodiments A2 through W2 further comprising heating the detection solution prior to (b) detecting an absorption intensity for the detection solution at a wavelength within about ±20% of the at least one absorption peak wavelength.

Embodiment Y2: A method of servicing a wellbore in a subterranean formation comprising (a) preparing a drilling fluid comprising a base fluid and an amine-based shale inhibitor, wherein the amine-based shale inhibitor is present in the drilling fluid in a target amount; (b) circulating the drilling fluid in the wellbore and/or subterranean formation to yield a circulated drilling fluid; (c) subjecting at least a portion of the circulated drilling fluid to solids removal to yield a substantially solids-free circulated drilling fluid; (d) contacting an aliquot of the solids-free circulated drilling fluid with an amine detector reagent and an aqueous salt solution to form a detection solution; wherein the amine detector reagent comprises an amine detector compound and a polar organic solvent (POS); wherein the POS is characterized by a flash point at ambient pressure of equal to or greater than about 105° C.; wherein the aqueous salt solution comprises an inorganic salt and an organic carboxylate salt; wherein the WSF comprises the amine-based shale inhibitor; and wherein the detection solution is characterized by at least one absorption peak wavelength in the range of from about 380 nanometers (nm) to about 760 nm; (e) detecting an absorption intensity for the detection solution at a wavelength within about ±20% of the at least one absorption peak wavelength; (f) comparing the absorption intensity of the detection solution at the wavelength within about ±20% of the at least one absorption peak wavelength with a target absorption intensity of the amine-based shale inhibitor to determine the amount of amine-based shale inhibitor in the circulated drilling fluid; and (g) comparing the amount of amine-based shale inhibitor in the circulated drilling fluid with the target amount of the amine-based shale inhibitor.

Embodiment Z2: The method of Embodiment Y2, wherein the POS is characterized by a boiling point at ambient pressure of equal to or greater than about 105° C.

Embodiment AA2: The method of any one of Embodiments Y2 and Z2, where the amount of amine-based shale inhibitor in the circulated drilling fluid varies by equal to or greater than a threshold amount from the target amount of the amine-based shale inhibitor, (h) contacting the circulated drilling fluid with an effective amount of supplemental amine-based shale inhibitor to provide for the circulated drilling fluid having the target amount of the amine-based shale inhibitor; and (i) recycling at least a portion of the circulated drilling fluid having the target amount of the amine-based shale inhibitor to the wellbore and/or subterranean formation.

Embodiment BB2: The method of Embodiment AA2, wherein step (h) is performed in real-time.

Embodiment CC2: The method of any one of Embodiments Y2 through BB2, wherein the detection solution is characterized by an initial absorption intensity ($A_0$) of the detection solution at the wavelength within about ±20% of the at least one absorption peak wavelength; wherein $A_0$ is defined as the absorption intensity of the detection solution substantially at the time of forming the detection solution ($t_0=0$ minutes); wherein the absorption intensity ($A_t$) of the detection solution at the wavelength within about ±20% of the at least one absorption peak wavelength is measured at a time t elapsed from the time of forming the detection solution; wherein the time t is equal to or greater than about 60 minutes; and wherein $A_t$ is within +5% of $A_0$.

Embodiment DD2: The method of Embodiment CC2, wherein the POS provides for decreasing absorption intensity variations over the time t.

Embodiment EE2: The method of any one of Embodiments Y2 through DD2, wherein the amine detector reagent is a liquid ninhydrin reagent; wherein the amine detector compound comprises ninhydrin; wherein the liquid ninhydrin reagent is contacted with the aliquot of the WSF and the aqueous salt solution in an amount effective to provide for a concentration of ninhydrin in the detection solution of from about 0.01 mmol/liter to about 200 mmol/liter, based on the total volume of the detection solution.

Embodiment FF2: The method of Embodiment EE2, wherein (f) comparing the absorption intensity of the detection solution at the wavelength within about ±20% of the at least one absorption peak wavelength with a target absorption intensity of the amine-based shale inhibitor comprises optically comparing the color and/or color intensity of the detection solution with a target color and/or color intensity, respectively; and wherein the color is purple.

Embodiment GG2: The method of any one of Embodiments Y2 through FF2, wherein the aqueous salt solution provides for decreasing absorption intensity variations between different WSFs that contain substantially the same amount of the amine-based shale inhibitor; and wherein the different WSFs are characterized by different pH and/or salinity when compared to each other.

Embodiment HH12: A method of decreasing spectral variations in a wellbore servicing fluid (WSF) comprising (a) providing an aliquot of a WSF; wherein the WSF comprises an amine-based additive; (b) decreasing spectral variations inducible by WSF components and/or caused by intensity decay over time by contacting the aliquot of the WSF with an aqueous salt solution and an amine detector reagent to form a detection solution; wherein the amine detector reagent comprises an amine detector compound and a polar organic solvent (POS); wherein the POS is characterized by a boiling point at ambient pressure of equal to or greater than about 105° C.; wherein the POS is characterized by a flash point at ambient pressure of equal to or greater than about 105° C.; wherein the aqueous salt solution comprises an inorganic salt and an organic carboxylate salt; and wherein the detection solution is characterized by at least one absorption peak wavelength in the range of from about 380 nanometers (nm) to about 760 nm; (c) detecting an absorption intensity for the detection solution at a wavelength within about ±20% of the at least one absorption peak wavelength; wherein the POS provides for decreasing absorption intensity variations caused by intensity decay over time; wherein the aqueous salt solution provides for decreasing absorption intensity variations between different WSFs that contain substantially the same amount of the amine-based additive; and wherein the different WSFs are characterized by different pH and/or salinity when compared to each other; and (d) comparing the amount of amine-based additive in the WSF with a target amount of the amine-based additive.

Embodiment II2: The method of Embodiment HH2, wherein the determined amount of amine-based additive in the WSF varies by equal to or greater than a threshold amount from the target amount of the amine-based additive, and wherein the WSF is contacted with an effective amount of supplemental amine-based additive to provide for a corrected WSF having the target amount of the amine-based additive.

Embodiment JJ2: The method of Embodiment II2 further comprising determining the effective amount of supplemental amine-based additive and preparing the corrected WSF having the target amount of the amine-based additive on-the-fly.

Embodiment KK2: The method of any one of Embodiments II2 and JJ2 further comprising placing at least a portion of the corrected WSF having the target amount of the amine-based additive in a wellbore and/or subterranean formation.

Embodiment LL2: A test kit for the detection of an amine-based additive in a wellbore servicing fluid (WSF) comprising (i) an amine detector reagent; wherein the amine detector reagent comprises an amine detector compound and a polar organic solvent (POS); wherein the amine detector compound is present in the amine detector reagent in an amount of from about 1 mmol/liter to about 1 mol/liter, based on the total volume of the amine detector reagent; wherein the POS is characterized by a boiling point at ambient pressure of equal to or greater than about 105° C.; wherein the POS is characterized by a flash point at ambient pressure of equal to or greater than about 105° C.; wherein the amine detector compound is configured to interact with an amine-based additive in a WSF and produce at least one absorption peak wavelength in the range of from about 380 nanometers (nm) to about 760 nm; and (ii) an optional aqueous medium.

Embodiment MM2: The test kit of Embodiment LL2, wherein the amine detector reagent is configured to be contacted with the WSF at a volumetric ratio of amine detector reagent to WSF of from about 50:1 to about 1:5.

Embodiment NN2: The test kit of any one of Embodiments LL2 and MM2, wherein the aqueous medium, when present, comprises an aqueous salt solution; wherein the aqueous salt solution comprises an inorganic salt and an organic carboxylate salt; wherein each of the inorganic salt and the organic carboxylate salt is independently present in the aqueous salt solution in an amount of from about 0.1 wt. % to less than about a saturation concentration of the respective salt in the aqueous salt solution, based on the total weight of the aqueous salt solution; and wherein the aqueous salt solution is configured to be contacted with the WSF at a volumetric ratio of aqueous salt solution to WSF of from about 500:1 to about 5:1.

Embodiment OO2: The test kit of any one of Embodiments LL2 through NN2, wherein the interaction of the amine detector compound with the amine-based additive in the WSF provides for a visible color, wherein the test kit further comprises a reference color chart configured to provide for the visual correlation of color and/or color intensity of the visible color with the amount of the amine-based additive in the WSF.

Embodiment PP2: The test kit of any one of Embodiments LL2 through OO2, wherein the amine detector reagent is characterized by a shelf life of equal to or greater than about 7 days; wherein the shelf life of the amine detector reagent is defined as the time period over which the amine detector reagent can provide for forming a detection solution with an absorption intensity within +10% of an original absorption intensity at a wavelength within about ±20% of the at least one absorption peak wavelength; and wherein the original absorption intensity is defined as the absorption intensity of an otherwise similar detection solution formed substantially at the same time of preparing the amine detector reagent.

Embodiment QQ2: A test system for the detection of an amine-based additive in a wellbore servicing fluid (WSF) comprising (a) the WSF; wherein the WSF comprises the amine-based additive; and (b) a test kit comprising (i) an amine detector reagent; wherein the amine detector reagent comprises an amine detector compound and a polar organic solvent (POS); wherein the amine detector compound is present in the amine detector reagent in an amount of from about 1 mmol/liter to about 1 mol/liter, based on the total volume of the amine detector reagent; wherein the POS is characterized by a boiling point at ambient pressure of equal to or greater than about 105° C.; wherein the POS is characterized by a flash point at ambient pressure of equal to or greater than about 105° C.; wherein the amine detector compound is configured to interact with the amine-based additive in the WSF and produce at least one absorption peak wavelength in the range of from about 380 nanometers (nm) to about 760 nm; and (ii) an aqueous salt solution; wherein the aqueous salt solution comprises an inorganic salt and an organic carboxylate salt; wherein each of the inorganic salt and the organic carboxylate salt is independently present in the aqueous salt solution in an amount of from about 0.1 wt. % to less than about a saturation concentration of the respective salt in the aqueous salt solution, based on the total weight of the aqueous salt solution.

Embodiment RR2: The test system of Embodiment QQ2, wherein the aqueous salt solution further comprises a POS; wherein the POS is present in the aqueous salt solution in an amount of from about 1 wt. % to about 50 wt. %, based on the total weight of the aqueous salt solution; and wherein the POS of the amine detector reagent and the POS of the aqueous salt solution are the same or different.

Embodiment SS2: The test system of any one of Embodiments QQ2 and RR2 further comprising a portable UV-VIS spectrometer and/or a portable colorimeter configured to detect an absorption intensity resulting from the interaction of the amine detector compound with the amine-based additive in the WSF, wherein the absorption intensity is detected at a wavelength within about ±20% of the at least one absorption peak wavelength.

Embodiment TT2: The test system of Embodiment SS2 further comprising a calibration curve configured to provide for correlating the absorption intensity detected at the wavelength within about ±20% of the at least one absorption peak wavelength with the amount of the amine-based additive in the WSF.

Embodiment UU2: The test system of any one of Embodiments QQ2 through TT2, wherein the interaction of the amine detector compound with the amine-based shale inhibitor in the WSF provides for a visible color, wherein the test kit further comprises a reference color chart configured to provide for the visual correlation of color and/or color intensity of the visible color with the amount of the amine-based additive in the WSF.

Embodiment VV2: The test system of any one of Embodiments QQ2 through UU2, wherein the WSF is a drilling fluid, and wherein the amine-based additive comprises an amine-based shale inhibitor and/or an amine-based corrosion inhibitor.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

For purposes of the disclosure herein, the term "comprising" includes "consisting" or "consisting essentially of." Further, for purposes of the disclosure herein, the term "including" includes "comprising," "consisting," or "consisting essentially of."

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of detecting an amine-based additive in a wellbore servicing fluid (WSF) comprising:
   (a) contacting an aliquot of the WSF with an amine detector compound and an aqueous salt solution to form a detection solution; wherein the aqueous salt solution comprises an inorganic salt and an organic carboxylate salt; wherein the WSF comprises the amine-based additive; and wherein the detection solution is characterized by at least one absorption peak wavelength in the range of from about 380 nanometers (nm) to about 760 nm;
   (b) detecting an absorption intensity for the detection solution at a wavelength within about ±20% of the at least one absorption peak wavelength;
   (c) comparing the absorption intensity of the detection solution at the wavelength within about ±20% of the at least one absorption peak wavelength with a target absorption intensity of the amine-based additive to determine the amount of amine-based additive in the WSF; and
   (d) comparing the amount of amine-based additive in the WSF with a target amount of the amine-based additive wherein (b) detecting an absorption intensity for the detection solution at a wavelength within about +20% of the at least one absorption peak wavelength further comprises subjecting at least a portion of the detection solution to ultraviolet-visible (UV-VIS) spectroscopy and/or colorimetry to yield the absorption intensity of the detection solution at the wavelength within about +20% of the at least one absorption peak wavelength.

2. The method of claim 1, wherein the inorganic salt comprises an inorganic halide; an inorganic chloride, LiCl, NaCl, KCl, $CaCl_2$, $MgCl_2$, $ZnCl_2$; an inorganic bromide, LiBr, NaBr, KBr, $CaBr_2$, $MgBr_2$, $ZnBr_2$; an inorganic phosphate, $LiH_2PO_4$, $Li_2HPO_4$, $NaH_2PO_4$, $Na_2HPO_4$, $Na_3PO_4$, $KH_2PO_4$, $K_2HPO_4$, $K_3PO_4$, $Ca_3(PO_4)_2$, $Mg(H_2PO_4)_2xH_2O$, $MgHPO_4xH_2O$, $Mg_3(PO_4)_2xH_2O$; an inorganic nitrate, $LiNO_3$, $NaNO_3$, $KNO_3$, $Ca(NO_3)_2$, $Mg(NO_3)_2$; an inorganic nitrite, $LiNO_2$, $NaNO_2$, $KNO_2$, $Ca(NO_2)_2$, $Mg(NO_2)_2$; an inorganic sulfate, $Li_2SO_4$, $Na_2SO_4$, $K_2SO_4$, $CaSO_4$, $MgSO_4$; an inorganic sulfite, $Li_2SO_3$, $Na_2SO_3$, $K_2SO_3$, $CaSO_3$; an inorganic sulfide, $Li_2S$, $Na_2S$, $K_2S$, CaS; an inorganic carbonate, $Na_2CO_3$, $K_2CO_3$; an inorganic bicarbonate, $NaHCO_3$, $KHCO_3$, $Mg(HCO_3)_2$, $Ca(HCO_3)_2$; or combinations thereof.

3. The method of claim 1, wherein the inorganic salt is present in the aqueous salt solution in an amount of from about 0.1 wt. % to less than about a saturation concentration of the inorganic salt in the aqueous salt solution, based on the total weight of the aqueous salt solution.

4. The method of claim 1, wherein the organic carboxylate salt comprises an acetate, lithium acetate, sodium acetate, potassium acetate, zinc acetate, aluminum acetate, cesium acetate; a formate, lithium formate, sodium formate, potassium formate, cesium formate; a citrate, lithium citrate, sodium citrate, potassium citrate, calcium citrate; a polyacrylate, lithium polyacrylate, sodium polyacrylate, potassium polyacrylate; a lactate, lithium lactate, sodium lactate, potassium lactate, calcium lactate, magnesium lactate; a propionate, sodium propionate, potassium propionate, calcium propionate, magnesium propionate; a butyrate, sodium butyrate, potassium butyrate, calcium butyrate, magnesium butyrate; a hydroxybutyrate, sodium hydroxybutyrate, potassium hydroxybutyrate, calcium hydroxybutyrate, magnesium hydroxybutyrate; a glycolate, sodium glycolate, potassium glycolate, calcium glycolate, magnesium glycolate; derivatives thereof, or combinations thereof.

5. The method of claim 1, wherein the organic carboxylate salt is present in the aqueous salt solution in an amount of from about 0.1 wt. % to less than about a saturation concentration of the organic carboxylate salt in the aqueous salt solution, based on the total weight of the aqueous salt solution.

6. The method of claim 1, wherein the aqueous salt solution and the aliquot of the WSF are contacted with each other at a volumetric ratio of aqueous salt solution to WSF of from about 500:1 to about 5:1.

7. The method of claim 1, wherein the amine detector compound comprises ninhydrin, indane-1,2,3-trione, hydrindantin, quinhydrone, Dragendorff reagent, chloranil, N-halosuccinimide, N-bromosuccinimide, N-iodosuccinimide, a hydrazo compound, a diazonium salt, fluorescein, fluorescein halide, fluorescein chloride, or combinations thereof, and wherein the amine detector compound is contacted with the aliquot of the WSF and the aqueous salt solution in an amount of from about 0.01 mmol/liter to about 200 mmol/liter amine detector compound, based on the total volume of the detection solution.

8. The method of claim 1, wherein the aqueous salt solution further comprises a polar organic solvent (POS); wherein the POS is characterized by a flash point at ambient pressure of equal to or greater than about 105° C.; wherein the POS is characterized by a boiling point at ambient pressure of equal to or greater than about 105° C.; wherein the POS comprises ethylene glycol, ethylene glycol monobutyl ether, diethylene glycol, diethylene glycol butyl ether, a polyethylene glycol characterized by the formula

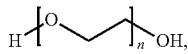

wherein n is an integer equal to or greater than about 3, glycerin, hexamethylphosphoramide, ethylene carbonate, propylene carbonate, sulfolane, derivatives thereof, or combinations thereof, and wherein the POS is present in the aqueous salt solution in an amount of from about 1 wt. % to about 50 wt. %, based on the total weight of the aqueous salt solution.

9. The method of claim 1, wherein the amine-based additive comprises an amine-based shale inhibitor, wherein the WSF is a drilling fluid, wherein the WSF is characterized by a pH of greater than about 7.5, and wherein the detection solution is characterized by a pH of less than about 7.

10. The method of claim 1, wherein at least a portion of the detection solution is analyzed in a portable UV-VIS spectrometer and/or a portable colorimeter, respectively.

11. The method of claim 1, wherein (c) comparing the absorption intensity of the detection solution at the wavelength within about ±20% of the at least one absorption peak wavelength with a target absorption intensity of the amine-based additive comprises optically comparing the color and/or color intensity of the detection solution with a target color and/or color intensity, respectively.

12. The method of claim 11, wherein determining the amount of amine-based additive in the WSF further comprises using a calibration curve that correlates absorption intensity at the wavelength within about ±20% of the at least one absorption peak wavelength with the amount of the amine-based additive.

13. The method of claim 11, wherein the detection solution is characterized by a visible color; and wherein determining the amount of amine-based additive in the WSF further comprises visually comparing a visually observed color and/or color intensity of the detection solution with a reference color chart that correlates color and/or color intensity, respectively, with the amount of the amine-based additive.

14. The method of claim 1, wherein the aqueous salt solution provides for an increased accuracy of (b) detecting an absorption intensity for the detection solution at a wavelength within about ±20% of the at least one absorption peak wavelength, when compared to the accuracy of detecting an absorption intensity for an otherwise similar detection solution lacking the aqueous salt solution at the same wavelength within about ±20% of the at least one absorption peak wavelength.

15. A method of servicing a wellbore in a subterranean formation comprising:
(a) preparing a drilling fluid comprising a base fluid and an amine-based shale inhibitor, wherein the amine-based shale inhibitor is present in the drilling fluid in a target amount;
(b) circulating the drilling fluid in the wellbore and/or subterranean formation to yield a circulated drilling fluid;
(c) subjecting at least a portion of the circulated drilling fluid to solids removal to yield a substantially solids-free circulated drilling fluid;
(d) contacting an aliquot of the solids-free circulated drilling fluid with an amine detector compound and an aqueous salt solution to form a detection solution; wherein the aqueous salt solution comprises an inorganic salt and an organic carboxylate salt; wherein the WSF comprises the amine-based shale inhibitor; and wherein the detection solution is characterized by at least one absorption peak wavelength in the range of from about 380 nanometers (nm) to about 760 nm;
(e) detecting an absorption intensity for the detection solution at a wavelength within about ±20% of the at least one absorption peak wavelength;
(f) comparing the absorption intensity of the detection solution at the wavelength within about ±20% of the at least one absorption peak wavelength with a target absorption intensity of the amine-based shale inhibitor to determine the amount of amine-based shale inhibitor in the circulated drilling fluid; and
(g) comparing the amount of amine-based shale inhibitor in the circulated drilling fluid with the target amount of the amine-based shale inhibitor wherein (e) detecting an absorption intensity for the detection solution at a wavelength within about +20% of the at least one absorption peak wavelength further comprises subjecting at least a portion of the detection solution to ultraviolet-visible (UV-VIS) spectroscopy and/or colorimetry to yield the absorption intensity of the detection solution at the wavelength within about +20% of the at least one absorption peak wavelength.

16. The method of claim 15, where the amount of amine-based shale inhibitor in the circulated drilling fluid varies by equal to or greater than a threshold amount from the target amount of the amine-based shale inhibitor, (h) contacting the circulated drilling fluid with an effective amount of supplemental amine-based shale inhibitor to provide for the circulated drilling fluid having the target amount of the amine-based shale inhibitor; and (i) recycling at least a portion of the circulated drilling fluid having the target amount of the amine-based shale inhibitor to the wellbore and/or subterranean formation.

17. The method of claim 15, wherein the aqueous salt solution provides for decreasing absorption intensity variations between different WSFs that contain substantially the same amount of the amine-based shale inhibitor; and wherein the different WSFs are characterized by different pH and/or salinity when compared to each other.

18. A method of decreasing spectral variations in a wellbore servicing fluid (WSF) comprising:
(a) providing an aliquot of a first WSF and an aliquot of a second WSF; wherein the first WSF and the second WSF comprise the same amine-based additive; wherein the first WSF and the second WSF comprise substantially the same amount of the amine-based additive; and wherein the first WSF and the second WSF are characterized by different pH and/or salinity when compared to each other;
(b) decreasing spectral variations inducible by WSF components by contacting an aqueous salt solution with (i) the aliquot of the first WSF and an amine detector compound to form a first detection solution, and (ii) the aliquot of the second WSF and the amine detector compound to form a second detection solution; wherein the aqueous salt solution comprises an inorganic salt and an organic carboxylate salt; and wherein each of the first detection solution and the second detection solution is independently characterized by at least one absorption peak wavelength in the range of from about 380 nanometers (nm) to about 760 nm;

(c) detecting a first absorption intensity for the first detection solution and a second absorption intensity for the second detection solution at a wavelength within about ±20% of the at least one absorption peak wavelength; wherein the first absorption intensity is within ±10% of the second absorption intensity; and (d) comparing the first absorption intensity and the second absorption intensity with a target absorption intensity of the amine-based additive to determine a first amount of amine-based additive in the first WSF and a second amount of amine-based additive in the second WSF, respectively wherein (c) detecting a first absorption intensity for the first detection solution and a second absorption intensity for the second detection solution at a wavelength within about +20% of the at least one absorption peak wavelength further comprises subjecting at least a portion of the first detection solution and the second detection solution to ultraviolet-visible (UV-VIS) spectroscopy and/or colorimetry to yield the first absorption intensity for the first detection solution and the second absorption intensity for the second detection solution at the wavelength within about +20% of the at least one absorption peak wavelength.

19. The method of claim 18, wherein the determined first amount of amine-based additive in the first WSF is within ±5% of the determined second amount of amine-based additive in the second WSF.

* * * * *